US012783970B2

(12) United States Patent
Lord et al.

(10) Patent No.: US 12,783,970 B2
(45) Date of Patent: Nov. 3, 2026

(54) SYSTEM AND METHODS FOR TRANSPORTING END USERS

(71) Applicant: Uber Technologies, Inc., San Francisco, CA (US)

(72) Inventors: Richard T. Lord, San Francisco, CA (US); Robert W. Lord, San Francisco, CA (US); Nathan P. Myhrvold, San Francisco, CA (US); Clarence T. Tegreene, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 19/031,757

(22) Filed: Jan. 18, 2025

(65) Prior Publication Data

US 2025/0238734 A1 Jul. 24, 2025

Related U.S. Application Data

(63) Continuation of application No. 18/732,596, filed on Jun. 3, 2024, now Pat. No. 12,400,157, which is a (Continued)

(51) Int. Cl.

| | |
|---|---|
| ***G06Q 50/40*** | (2024.01) |
| ***G06Q 10/06*** | (2023.01) |
| ***G06Q 10/0631*** | (2023.01) |

(52) U.S. Cl.

CPC ..... *G06Q 10/06* (2013.01); *G06Q 10/063114* (2013.01); *G06Q 10/06315* (2013.01); *G06Q 50/40* (2024.01)

(58) Field of Classification Search

CPC .. G06Q 10/06; G06Q 50/40; G06Q 10/06311; G06Q 10/083; G06Q 10/063114; G06Q 10/06315; G01C 21/3438

See application file for complete search history.

(56) References Cited

U.S. PATENT DOCUMENTS

| | | | | |
|---|---|---|---|---|
| 6,233,493 B1 * | 5/2001 | Cherneff | G06Q 10/06 | 700/95 |
| 6,952,807 B1 * | 10/2005 | Antosz | G06Q 10/06 | 715/810 |

(Continued)

OTHER PUBLICATIONS

Papadimitratos et al., Vehicular communication systems: Enabling technologies, applications, and future outlook on intelligent transportation, 2009, IEEE, p. 84-95 (Year: 2009).*

(Continued)

*Primary Examiner* — Mcdieunel Marc

(74) *Attorney, Agent, or Firm* — Mahamedi IP Law LLP

(57) ABSTRACT

Computationally implemented methods and systems that are designed for receiving one or more first directives that direct a transportation vehicle unit to transport a first end user; receiving, while the transportation vehicle unit is en route to or is transporting the first end user, one or more second directives that direct the transportation vehicle unit to transport a second end user while transporting the first end user, the transportation vehicle unit having been determined to be able to accommodate transport of the second end user while transporting the first end user; and verifying that compliance with the one or more second directives will not conflict with one or more obligations to transport the first end user by the transportation vehicle unit. In addition to the foregoing, other aspects are described in the claims, drawings, and text.

19 Claims, 28 Drawing Sheets

Related U.S. Application Data continuation of application No. 17/965,182, filed on Oct. 13, 2022, now Pat. No. 12,001,975, which is a continuation of application No. 16/849,984, filed on Apr. 15, 2020, now Pat. No. 11,669,785, which is a continuation of application No. 15/985,652, filed on May 21, 2018, now Pat. No. 10,657,468, which is a continuation of application No. 15/588,502, filed on May 5, 2017, now Pat. No. 10,002,333, which is a continuation of application No. 14/621,151, filed on Feb. 12, 2015, now Pat. No. 9,715,667, which is a continuation of application No. 14/619,812, filed on Feb. 11, 2015, now Pat. No. 9,552,559, which is a continuation-in-part of application No. 14/597,631, filed on Jan. 15, 2015, now Pat. No. 9,886,671, which is a continuation of application No. 14/596,904, filed on Jan. 14, 2015, now Pat. No. 9,483,744, which is a continuation-in-part of application No. 14/564,358, filed on Dec. 9, 2014, now Pat. No. 9,689,694, which is a continuation of application No. 14/563,134, filed on Dec. 8, 2014, now Pat. No. 9,671,239, which is a continuation-in-part of application No. 14/537,313, filed on Nov. 10, 2014, now Pat. No. 9,558,469, which is a continuation of application No. 14/536,967, filed on Nov. 10, 2014, now Pat. No. 9,792,574, which is a continuation-in-part of application No. 14/511,706, filed on Oct. 10, 2014, now Pat. No. 9,767,423, and a continuation of application No. 14/510,383, filed on Oct. 9, 2014, now Pat. No. 9,569,740, which is a continuation-in-part of application No. 14/476,042, filed on Sep. 3, 2014, now Pat. No. 9,488,484, which is a continuation of application No. 14/464,587, filed on Aug. 20, 2014, now Pat. No. 9,110,925, which is a continuation-in-part of application No. 14/456,627, filed on Aug. 11, 2014, now Pat. No. 9,534,912, which is a continuation of application No. 14/455,534, filed on Aug. 8, 2014, now Pat. No. 9,581,455, which is a continuation-in-part of application No. 14/329,451, filed on Jul. 11, 2014, now abandoned, which is a continuation of application No. 14/328,002, filed on Jul. 10, 2014, now Pat. No. 10,458,801, which is a continuation-in-part of application No. 14/318,182, filed on Jun. 27, 2014, now abandoned.

(60) Provisional application No. 61/989,394, filed on May 6, 2014.

(56) References Cited

U.S. PATENT DOCUMENTS

| | | | | |
|---|---|---|---|---|
| 2002/0156663 A1* | 10/2002 | Weber | G06Q 10/06375 705/7.11 |
| 2003/0101127 A1* | 5/2003 | Cornelius | G06Q 40/04 705/37 |
| 2005/0027585 A1* | 2/2005 | Wodtke | G06Q 10/06316 705/7.26 |
| 2007/0005236 A1* | 1/2007 | Peterkofsky | G06Q 10/083 701/422 |
| 2013/0262521 A1* | 10/2013 | Gupta | G06Q 10/1093 707/802 |
| 2014/0089054 A1* | 3/2014 | Knapp | G08B 21/18 705/7.35 |
| 2015/0199633 A1* | 7/2015 | Convertino | G06Q 10/06313 705/7.23 |
| 2017/0309186 A1* | 10/2017 | Lubeck | G01C 21/3667 |

OTHER PUBLICATIONS

Duchon et al., Distributed Cooperative On-Demand Transportation, 2011, IEEE, p. 1-5 (Year: 2011).*

Shemaili et al., Securing E-Seal real time tracking system for Internet of Things, 2013, IEEE, p. 65-69 (Year: 2008).*

Ayadi et al., An exact method for the multi-vehicle static demand responsive transport problem based on service quality: The case of one-to-one, 2014, IEEE, p. 308-313 (Year: 2014).*

* cited by examiner

SYSTEM AND METHODS FOR TRANSPORTING END USERS

CROSS-REFERENCE TO RELATED APPLICATIONS

This application is a continuation of U.S. patent application Ser. No. 17/965,182 filed Oct. 13, 2022, which is a continuation of U.S. patent application Ser. No. 16/849,984, filed Apr. 15, 2020, now U.S. Pat. No. 11,669,785, which is a continuation of U.S. patent application Ser. No. 15/985,652, filed May 21, 2018, now U.S. Pat. No. 10,657,468; which is a continuation of U.S. patent application Ser. No. 15/588,502, filed May 5, 2017, now U.S. Pat. No. 10,002,333; which is a continuation of U.S. patent application Ser. No. 14/621,151, filed Feb. 12, 2015, now U.S. Pat. No. 9,715,667; which is a continuation of U.S. patent application Ser. No. 14/619,812, filed Feb. 11, 2015, now U.S. Pat. No. 9,552,559; which is a continuation-in-part of U.S. patent application Ser. No. 14/597,631, filed Jan. 15, 2015, now U.S. Pat. No. 9,886,671; which is a continuation of U.S. patent application Ser. No. 14/596,904, filed Jan. 14, 2015, now U.S. Pat. No. 9,483,744; which is a continuation-in-part of U.S. patent application Ser. No. 14/564,358, filed Dec. 9, 2014, now U.S. Pat. No. 9,689,694; which is a continuation of U.S. patent application Ser. No. 14/563,134, filed Dec. 8, 2014, now U.S. Pat. No. 9,671,239; which is a continuation of U.S. patent application Ser. No. 14/537,313 filed Nov. 10, 2014, now U.S. Pat. No. 9,558,469; which is a continuation of U.S. patent application Ser. No. 14/536,967, filed Nov. 10, 2014, now U.S. Pat. No. 9,792,574; which is a continuation-in-part of U.S. patent application Ser. No. 14/511,706, filed Oct. 10, 2014, now U.S. Pat. No. 9,767,423; which is a continuation of U.S. patent application Ser. No. 14/510,383, filed Oct. 9, 2014, now U.S. Pat. No. 9,569,740; which is a continuation-in-part of U.S. patent application Ser. No. 14/476,042, filed Sep. 3, 2014, now U.S. Pat. No. 9,488,484; which is a continuation of U.S. patent application Ser. No. 14/474,587, filed Sep. 2, 2014, now U.S. Pat. No. 9,599,481; which is a continuation-in-part of U.S. patent application Ser. No. 14/456,627, filed Aug. 11, 2014, now U.S. Pat. No. 9,534,912; which is a continuation of U.S. patent application Ser. No. 14/455,534, filed Aug. 8, 2014, now U.S. Pat. No. 9,581,455; which is a continuation-in-part of U.S. patent application Ser. No. 14/329,451, filed Jul. 11, 2014; which is a continuation of U.S. patent application Ser. No. 14/328,002, filed Jul. 10, 2014, now U.S. Pat. No. 10,458,801; which is a continuation-in-part of U.S. patent application Ser. No. 14/318,182, filed Jun. 27, 2014; which claims the benefit of U.S. Provisional Patent Application No. 61/989,394; filed May 6, 2014; all of the aforementioned priority applications being hereby incorporated by reference in their respective entireties.

SUMMARY OF THE INVENTION

In one or more various aspects, a method includes, but is not limited to, receiving one or more first directives that direct a transportation vehicle unit to transport a first end user, receiving, while the transportation vehicle unit is en route to or is transporting the first end user, one or more second directives that direct the transportation vehicle unit to transport a second end user while transporting the first end user, the transportation vehicle unit having been determined to be able to accommodate transport of the second end user while transporting the first end user; and verifying that compliance with the one or more second directives will not conflict with one or more obligations to transport the first end user by the transportation vehicle unit. In various implementations, at least one of the above operations is performed by a machine or an article of manufacture. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for receiving one or more first directives that direct a transportation vehicle unit to transport a first end user, means for receiving, while the transportation vehicle unit is en route to or is transporting the first end user, one or more second directives that direct the transportation vehicle unit to transport a second end user while transporting the first end user, the transportation vehicle unit having been determined to be able to accommodate transport of the second end user while transporting the first end user; and means for verifying that compliance with the one or more second directives will not conflict with one or more obligations to transport the first end user by the transportation vehicle unit. In addition to the foregoing, other system aspects are described in the claims, drawings, and text forming a part of the disclosure set forth herein.

In one or more various aspects, a system includes, but is not limited to, circuitry for receiving one or more first directives that direct a transportation vehicle unit to transport a first end user, circuitry for receiving, while the transportation vehicle unit is en route to or is transporting the first end user, one or more second directives that direct the transportation vehicle unit to transport a second end user while transporting the first end user, the transportation vehicle unit having been determined to be able to accommodate transport of the second end user while transporting the first end user; and circuitry for verifying that compliance with the one or more second directives will not conflict with one or more obligations to transport the first end user by the transportation vehicle unit. In addition to the foregoing, other system aspects are described in the claims, drawings, and text forming a part of the disclosure set forth herein.

In one or more various aspects, a computer program product, comprising a signal bearing non-transitory storage medium, bearing one or more instructions including, but not limited to, receiving one or more first directives that direct a transportation vehicle unit to transport a first end user, receiving, while the transportation vehicle unit is en route to or is transporting the first end user, one or more second directives that direct the transportation vehicle unit to transport a second end user while transporting the first end user, the transportation vehicle unit having been determined to be able to accommodate transport of the second end user while transporting the first end user, and verifying that compliance with the one or more second directives will not conflict with one or more obligations to transport the first end user by the transportation vehicle unit. In addition to the foregoing, other computer program product aspects are described in the claims, drawings, and text forming a part of the disclosure set forth herein.

In one or more various aspects, a system includes, but is not limited to, a directive receiving module configured to receive, while a transportation vehicle unit is en route to or is transporting a first end user, one or more directives that direct the transportation vehicle unit to transport a second end user while transporting the first end user, the transportation vehicle unit having been determined to be able to accommodate transport of the second end user while transporting the first end user; a non-conflict confirming module configured to confirm that compliance with the one or more second directives will not conflict with one or more obligations to transport the first end user by the transportation vehicle unit; a memory, and one or more processors.

In one or more various aspects, a system includes, but is not limited to, circuitry for receiving, while a transportation vehicle unit is en route to or is transporting a first end user, one or more directives that direct the transportation vehicle unit to transport a second end user while transporting the first end user, the transportation vehicle unit having been determined to be able to accommodate transport of the second end user while transporting the first end user; and circuitry for confirming that compliance with the one or more second directives will not conflict with one or more obligations to transport the first end user by the transportation vehicle unit.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

DETAILED DESCRIPTION

Figure 1:
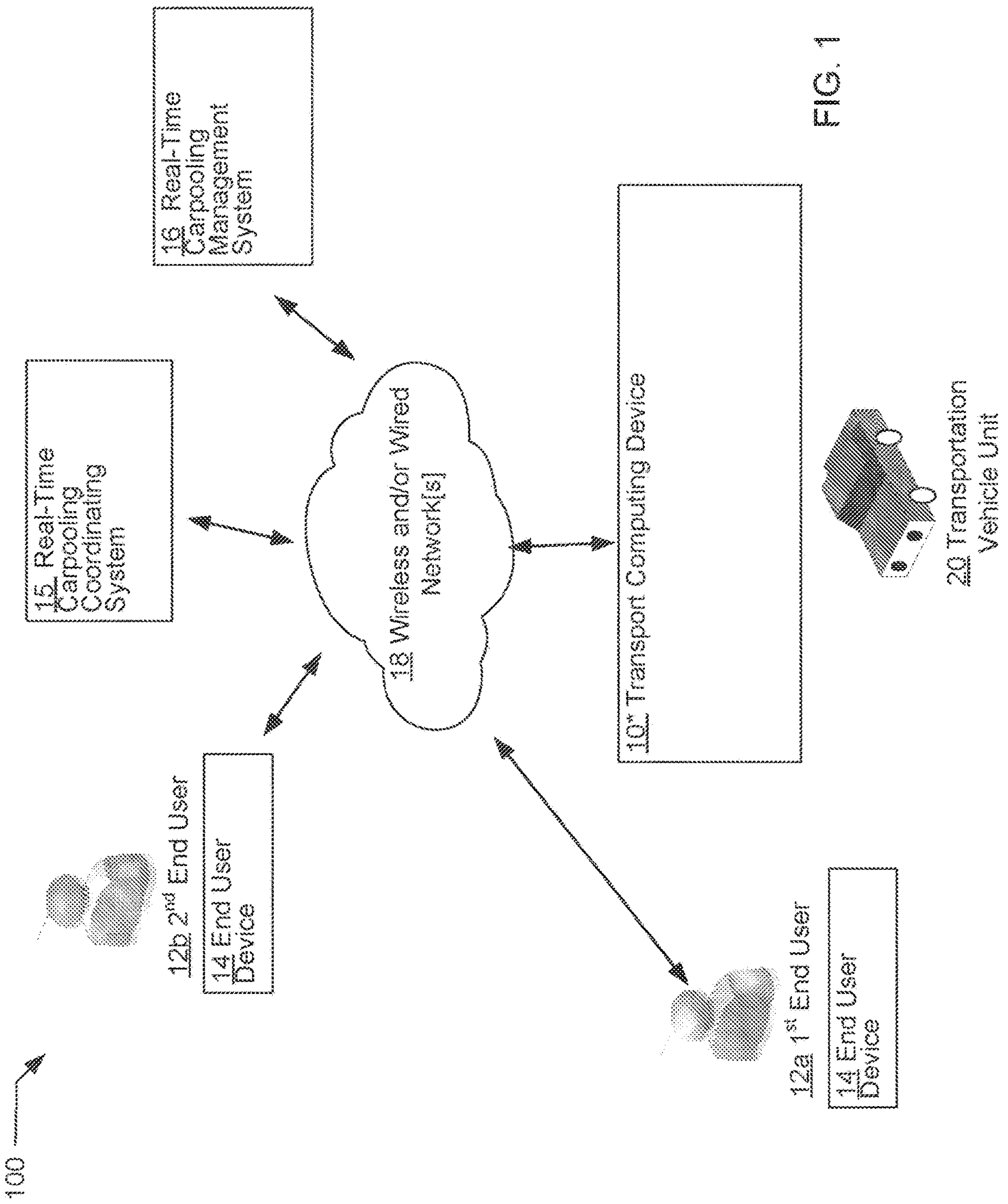
FIG. 1 illustrates a transport computing device 10* operating in an exemplary environment

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide one or more wearable computing devices for the environment illustrated in FIG. 1.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats-tools in the form of a high-level programming language (e.g., C, java, visual basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchanging/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-level_programming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional external linking devices (e.g., transistors), deoxyribonucleic acid (DNA), quantum devices, mechanical switches, optics, fluidics, pneumatics, optical devices (e.g., optical interference devices, molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language-functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d)

virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media holds or transmits device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein, "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include, but are not limited to, a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, application programs, one or more interaction devices (e.g., a touch pad, a touch screen, an antenna, etc.), and/or control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and application programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, application programs, one or more interaction devices (e.g., an antenna USB ports, acoustic ports, etc.), control systems including feedback loops and control motors (e.g., feedback for sensing or estimating position and/or velocity, control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Specific examples of operably couplable include, but are not limited, to physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Although one or more users may be shown and/or described herein as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

One of the newest trends in the field of transportation services particularly in urban settings is the development of transportation networking services provided by web-based companies such as Uber and Lyft that allow users to retain drivers/vehicles for transportation services through, for example, mobile applications. The increasingly popularity of such "ridesharing" services have already made some of the early entrants in this new field household names. As with many new technological ventures, the functionalities provided through such services are somewhat limited. However there appears to be ample opportunities for adding new and value adding functionalities to such services (as well as to more traditional transportation services such as Taxi services) in order to provide more robust transportation networking systems.

Generally, these types of online transportation services provide services and functionalities that are already provided by traditional taxi and limo companies but being provided through the latest technological innovations (e.g., using the Internet and mobile devices, such as Smartphones, in order to request transport services). One possible future avenue for growth is providing true ridesharing services (e.g., carpooling) where a group of nonaffiliated passengers (e.g., passengers or end users who do not have any social, business, and/or professional relationship with each other) are assigned to be transported by a single vehicle (note that "passengers" and "end users" will be used interchangeably herein, thus, they are synonymous unless indicated otherwise). There are already a few online carpooling services that provide some level of true carpooling services. However, these carpooling services generally provide basic carpooling services (e.g., providing a listing of vehicles/drivers that are scheduled to depart at a particular future time from one departure point and going to a particular destination point) that typically require arrangements in advance of a carpooling trip (e.g., taking a group of unaffiliated end users from one or more rendezvous locations to one or more destination locations).

Accordingly, network systems are proposed that coordinate matching of for-hire passenger vehicles (herein "transportation vehicle units") to prospective carpooling passengers (e.g., end users) in real-time (e.g., to assign a prospective passenger to a carpooling vehicle that is already en route to or is already transporting other passengers). In some cases, these network systems may be able to coordinate the matching of a transportation vehicle unit with one or more end users (e.g., passengers or customers) even when, for example, the transportation vehicle unit is already en route to or is already transporting one or more other end users. The matching of a transportation vehicle unit that may already be transporting passengers (e.g., "old" passengers) with "new" passengers may be based on a number of factors including space availability of the transportation vehicle unit to accommodate the new passengers, the current location of the transportation vehicle unit relative to the pick-up or rendezvous location for the new passengers (which may be the current location of the new passengers), the proximity of the destination of the new passengers to the destination of the old passengers, and so forth.

One drawback that these network systems (e.g., network servers) may have is that in some situations they may not always have the most up-to-date information related to current passenger transport obligations of transportation vehicle units. Thus, in order to ensure, for example, that a particular transportation vehicle unit will be able to transport one or more "new" end users without violating current passenger transport obligations of the transportation vehicle unit, systems and methods are provided herein that may be implemented locally at the transportation vehicle unit and that may be designed to, among other things, verify or confirm that one or more directives that direct the transportation vehicle unit, which is already en route to or is already transporting a first end user, to transport a second end user while transporting the first end user does not violate one or more obligations to transport the first end user (e.g., an obligation to transport the first end user to a destination location without significant delays).

In various embodiments, the verification or confirmation process may be performed by comparing the requirements for transporting the second end user to the requirements for transporting the first end user. In some embodiments, the systems and methods may be implemented by a transport computing device that may be associated with a transportation vehicle unit (which includes at least a transport vehicle such as a gas or electric powered vehicle and a human or robotic driver) that is already en route to secure the first end user or that is already transporting the first end user. In some cases, the transport computing device may be a mobile computing device such as a Smartphone or a tablet computer that executes specialized software, or maybe a dedicated computing device with, for example, specialized hardware, software, and/or firmware and specifically tailored to perform the various functions and operations to be described herein.

Referring now to FIG. 1, which illustrates a transport computing device 10* operating in an exemplary environment 100. In various embodiments, the various operations and functionalities to be described herein may be implemented by the transport computing device 10*, which in some cases, may be associated with a transportation vehicle unit 20. The transport computing device 10* may be designed to, among other things, receive one or more first directives that direct a transportation vehicle unit 20 to transport a first end user 12*a*; receive while the transportation vehicle unit 20 is en route to or is transporting the first end user 12*a*, one or more second directives that direct (e.g., instruct) the transportation vehicle unit 20 to transport a second end user 12*b* while transporting the first end user 12*a*, the transportation vehicle unit 20 having been determined (e.g., determined remotely by, for example, a real-time carpooling management system 16) to be able to accommodate transport of the second end user 12*b* while transporting the first end user 12*a*; and verify or confirm that compliance with the one or more second directives will not conflict with one or more obligations to transport the first end user 12*a* by the transportation vehicle unit 20.

Note that for purposes of the following description "*" represents a wildcard. Thus, references in the following description to, for example, "transport computing device 10*" may be in reference to the transport computing device 10' of FIG. 2A, as well as to the transport computing device 10" of FIG. 2B, which are two different implementations of the transport computing device 10* of FIG. 1.

Referring back to FIG. 1, in various embodiments, the transport computing vehicle unit 20 may be in communication with a variety of entities via one or more wireless and/or wired networks 18 including, for example, one or more end users 12* (via one or more end user devices 14 such as Smartphones), a real-time carpooling coordinating system 15, and/or a real-time carpooling management system 16. In this example illustration, the end users 12* (a first end user 12*a* and a second end user 12*b*) are unaffiliated parties needing transportation services. Note that for ease of illustration and explanation, only two end users, a first end user 12*a* and a second end user 12*b*, are illustrated in FIG. 1. However, those of ordinary skill in the art will recognize that in alternative embodiments many more end users 12* (as well as many more transportation vehicle units 20) may be included in the network environment of FIG. 1.

The real-time carpooling management system 16 may be one or more network servers that coordinates and matches one or more end users 12* to a transportation vehicle unit 20 for transport to their destinations. The matching operations performed by the real-time carpooling management system 16 may be as a result of making a determination as whether, for example, a particular transportation vehicle unit 20 is able to accommodate transport of one or more end users (e.g., the second end user 12*b*) when the particular transportation vehicle unit 20 is already en route to or is already transporting one or more other end users (e.g., the first end user 12*a*). A number of factors may be considered in determining whether the particular transportation vehicle unit 20 is able to accommodate transport of the one or more end users (the second end user 12*b*) while transporting one or more other end users (e.g., the first end user 12*a*) including, for example, whether there is sufficient available passenger space for the end users (e.g., the second end user 12*b*), whether the transportation vehicle unit 20 is in the proximate vicinity of the pickup location (e.g., rendezvous location which, in some cases, may be the current location) for the one or more end users (e.g., the second end user 12*b*), whether the transportation vehicle unit 20 will be traveling near to the destination location of the one or more end users (e.g., the second end user 12*b*), whether adding the one or more end users (e.g., the second end user 12*b*) will cause significant delay to the transport of the one or more other end users (e.g., the first end user 12*a*) in reaching the one or more other end users' destination(s), and so forth.

The one or more wireless and/or wired networks 18 may comprise of, for example, one or more of a local area network (LAN), metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, a Client/Server network, a virtual private network (VPN), and so forth. Note again that for ease of illustration and explanation, FIG. 1 does not illustrate multiple transportation vehicle units 20 being in communication with the real-time carpooling management system 16 nor more than two end users 12* being in communication with the real-time carpooling management system 16. However, for purposes of the following description, the real-time carpooling management system 16 may, in fact, be in communication with multiple transportation vehicle units 20 (via multiple transport computing devices 10*) and numerous end users 12*.

In some cases, the real-time carpooling management system 16, which may or may not be located overseas or across national borders, may communicate with a transportation vehicle unit 20 (via transport computing device 10*) through a real-time carpooling coordinating system 15, which may be a locally based network server(s). In order to try to match a prospective passenger, such as the second end user 12*b* of FIG. 1, to a transportation vehicle unit 20 for transport, the real-time carpooling management system 16 may check the current end user transport obligations (e.g., obligations for transporting other passengers such as the first end user 12*a* of FIG. 1) of the transportation vehicle unit 20. That is, a transportation vehicle unit 20 (via their own associated transport computing device 10*) may periodically or continuously provide its current outstanding obligations (including no obligation) for transporting end users to the real-time carpooling management system 16 (sometimes via the real-time carpooling coordinating system 15). By comparing the current end user transport obligations (e.g., an obligation to transport the first end user 12*a* of FIG. 1) of the transportation vehicle unit 20 with the requirements for transporting a prospective passenger (e.g., the second end user 12*b*) and determining that transport of the second end user 12*b* will not conflict with the obligation to transport the first end user 12*a*, the real-time carpooling management system 16 may match the prospective passenger (e.g., the second end user 12*b*) to the appropriate transportation vehicle unit 20. Note the phrase "real-time" is used herein because when, for example, a second end user 12*b* is being assigned to a transportation vehicle unit 20 for transport, the transportation vehicle unit 20 may already be en route to or is already transporting a first end user 12*a*.

Note, however, that in many situations the matching operations (that may be performed by the real-time carpooling management system 16) may be faulty because the real-time carpooling management system 16 may not have the most current information related to the current end user transport obligations of a transportation vehicle unit 20. This may be as a result of many factors including, for example, the reporting of current end user transport obligations by the transportation vehicle unit 20 may only be random or sporadic due to communication disruptions between the transportation vehicle unit 20 and the real-time carpooling management system 16, or failure of human drivers to record/report changes to end user transport obligations.

In order to facilitate understanding of the various concepts related to the processes and operations to be described herein, the following illustrative scenario is provided that shows how a transportation vehicle unit 20 may become obligated to transport a first end user 12*a* and how a second end user 12*b* (e.g., a prospective passenger) may be assigned to be transported by the same transportation vehicle unit 20 while transporting the first end user 12*a*, the assignment of the second end user 12*b* to the transportation vehicle unit 20 being executed while the transportation vehicle unit 20 is already en route to (e.g., traveling to a rendezvous location to secure the first end user 12*a*) or is already transporting the first end user 12*a* (note that this may include the span in time when the transportation vehicle unit 20 is at the rendezvous location awaiting for the arrival of the first end user 12*a*). When an end user, such as the first end user 12*a* of FIG. 1, seeks transportation services, a transport request may be transmitted by the first end user 12*a* using an end user device 14. The transport request may then be received by the real-time carpooling management system 16 (in some cases, via the real-time carpooling coordinating system 15). In various embodiments, the transport request that may be transmitted may be a request that specifically requests for a carpooling vehicle that may be used in order to transport other end users while transporting the first end user 12*a*. In some cases, the transportation vehicle unit 20 that may be assigned to transport the first end user 12*a* may only be permitted (e.g., as permitted by the first end user 12*a* or by a third party such as a ridesharing company) to transport other end users while transporting the first end user 12*a* only when certain conditions can be met (e.g., no significant delay, such as no more than 15 minute delay, for transporting the first end user 12*a* to his or her destination and as a result of the transportation vehicle unit 20 transporting other end users while transporting the first end user 12*a*).

The real-time carpooling management system 16 upon receiving the request from the first end user 12*a* may then assign a transportation vehicle unit 20 to transport the first end user 12*a* based on one or more factors including the current availability the transportation vehicle unit 20 (e.g., whether the transportation vehicle unit 20 is in-service or off-duty or whether it is in the proximate vicinity of the first end user 12*a*), and the current outstanding passenger transport obligations of the transportation vehicle unit 20. That is, based on the known obligations and status of the transportation vehicle units 20, the real-time carpooling management system 16 may determine that the transportation vehicle unit 20 should be assigned to transport the first end user 12*a*.

In any event, after determining/selecting the transportation vehicle units 20 for transporting the first end user 20, the real-time carpooling management system 16 may direct or instruct the selected transportation vehicle unit 20 to transport the first end user 12*a* by transmitting to a transport computing device 10* associated with the selected transportation vehicle unit 20 one or more first directives that direct (e.g., instruct) the selected transportation vehicle unit 20 to rendezvous with the first end user 12*a* at a first end user rendezvous location (which, in some cases, may be the location of the first end user 12*a* at the time when the first end user 12*a* requested transportation services). In some cases, the real-time carpooling management system 16 may transmit the one or more first directives to a transport computing device 10* associated with the transportation vehicle unit 20 indirectly through the real-time carpooling coordinating system 15.

The one or more first directives that may be transmitted to the transport computing device 10* may indicate a variety of information including a first end user rendezvous location for rendezvousing with the first end user 12*a*, a first end user destination location, carpooling preferences (alternatively, the carpooling preferences may be received separately from the one or more first directives), and so forth. Carpooling preferences may include, for example, the amount of travel delay that may be acceptable for a particular end user and as a result of transporting other end users, maximum number of drop-offs (e.g., passenger offload stops) permitted prior to a particular end user being dropped-off, and so forth. Upon the one or more first directives being received and accepted by the logic of the transport computing device 10*, the one or more directives may become one or more obligations for transporting the first end user 12*a*. After the one or more first directives are accepted, the real-time carpooling management system 16 may transmit (in some cases via the real-time carpooling coordinating system 15) a confirmation that the one or more first directives have been accepted.

While the transportation vehicle unit 20 is still en route to a first end user rendezvous location for rendezvousing with the first end user 12*a* or while the transportation vehicle unit 20 is transporting the first end user 12*a*, a second end user 12*b* may transmit a request for transportation services (which may or may not request specifically for carpooling services—e.g., share a ride with other end users) to the real-time carpooling management system 16. After determining that the transportation vehicle unit 20 is able to accommodate transport of the second end user 12*b* while transporting the first end user 12*a*, the real-time carpooling management system 16 may then transmit to the transport computing device 10* associated with the transportation vehicle unit 20 one or more second directives that direct the transportation vehicle unit 20 to pick-up and transport the second end user 12*b* while transporting the first end user 12*a*. The determination as to whether the transportation vehicle unit 20 may accommodate transport of the second end user 12*b* while transporting the first end user 12*a* may be based on one or more factors including, for example, a determination that the transportation vehicle unit 20 having sufficient space to accommodate the second end user 12*b*, a determination that the transportation vehicle unit 20 is in the proximate vicinity of the second end user 12*b*, a determination the transportation vehicle unit 20 will be traveling near to the destination location of the second end user 12*b* while transporting the first end user 12*a* or other end users, a determination that transport of the first end user 12*a* and the second end user 12*b* together will comply with the carpooling preferences of the first end user 12*a*, the second end user 12*b*, or a third party, and so forth.

The one or more second directives that are received by the transport computing device 10* may include a variety of information including end user information (e.g., identity and/or image of the second end user 12*b*), a rendezvous location for rendezvousing with the second end user 12*b*, a destination location for the second end user 12*b*, end user carpooling preferences of the second end user 12*b*, and so forth. After receiving the one or more second directives, the transport computing device 10* associated with the transportation vehicle unit 20 may verify or confirm that the one or more second directives do not conflict with one or more obligations to transport the first end user 12*a*. The verification or confirmation may be needed because the real-time carpooling management system 16 will often not have the most up-to-date status and obligation information related to the transportation vehicle unit 20. Instead, only the transport computing device 10* may have the most up-to-date status and passenger obligation information of the transportation vehicle unit 20.

The verification (e.g., confirmation) process may involve looking at a number of factors in order to confirm that the one or more second directives do not conflict with the one or more obligations to transport the first end user 12*a*. These factors may be the same factors considered by the real-time carpooling management system 16 in determining that the transportation vehicle unit 20 is able to accommodate transport of the second end user 12*b*. These factors include, for example, a determination that the transportation vehicle unit 20 having sufficient space to accommodate the second end user 12*b*, a determination that the transportation vehicle unit 20 is in the proximate vicinity of the second end user 12*b*, a determination the transportation vehicle unit 20 will be traveling near to the destination location of the second end user 12*b* while transporting the first end user 12*a* or other end users, a determination that transport of the first end user 12*a* and the second end user 12*b* together will comply with the carpooling preferences of the first end user 12*a*, the second end user 12*b*, or a third party, and so forth. In some cases, the verification or confirmation process may also include a determination of transport rate or rates (e.g., transport fees) for the first end user 12*a* and/or the second end user 12*b* that may be based on the transportation vehicle unit 20 transporting both the first end user 12*a* and the second end user 12*b*. A more detailed discussion related to the confirmation/verification procedures will be provided in the processes to be described herein.

Once the logic of the transport computing device 10* of the transportation vehicle unit 20 verifies or confirms that the one or more second directives do not conflict with the one or more obligations of the transportation vehicle unit 20 to transport the first end user 12*a*, the transport computing device 10* may transmit to, for example, the real-time carpooling management system 16 and/or to one or more end user devices 14 one or more confirmations that indicate that the transportation vehicle unit 20 will, in fact, be transporting the second end user 12*b*. If, on the other hand, the logic of the transport computing device 10* is unable to make the verification or confirmation, then the transport computing device 10* may transmit to the real-time carpooling management system 16 a notification that the transportation vehicle unit 20 is unable to accommodate transport of the second end user 12*b*.

After the logic of the transport computing device 10* of the transportation vehicle unit 20 verifies or confirms that the one or more second directives do not conflict with the one or more obligations of the transportation vehicle unit 20 to transport the first end user 12*a*, the transport computing device 10* may also present one or more instructive directives that direct (e.g., instructs) the transportation vehicle unit 20 to rendezvous with and transport the second end user 12*b*. In cases where the transportation vehicle unit 20 employs a human driver, the one or more instructive directives may be visually and/or audibly presented. In other cases where the transportation vehicle unit 20 employs a robotic driver system 450 (see FIG. 4E) the one or more instructive directives may be electronically presented to a navigation system 452 of the robotic driver system 450.

Figure 4A:
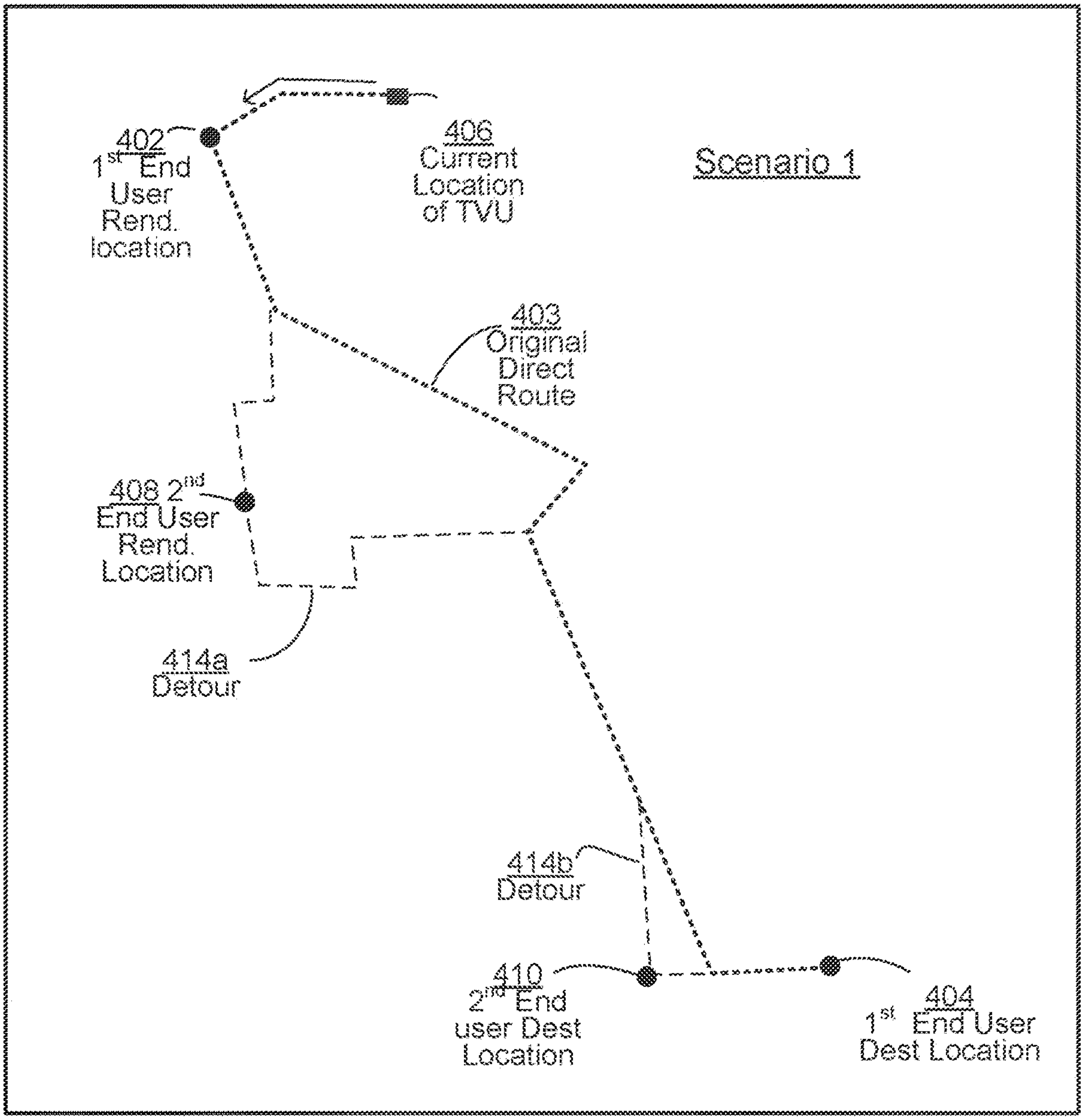
FIG. 4A illustrates an exemplary route that an example transportation vehicle unit 20 of FIG. 1 may use in order to transport carpooling passengers.

Turning now to FIGS. 4A to 4D, which illustrate various routes that the transportation vehicle unit 20 of FIG. 1 may use in order to transport the first end user 12*a* and the second end user 12*b* to their destination(s) (e.g., destination location(s)) for different example scenarios (e.g., scenario 1, scenario 2, scenario 3, and scenario 4). These scenarios may better facilitate understanding of the various concepts to be introduced with respect to the various operations and processes to be described herein. Referring particularly now to FIG. 4A, which illustrates a route that the transportation vehicle unit 20 of FIG. 1 may take in order to transport the first end user 12*a* and the second end user 12*b* to their destination locations (e.g., 1.sup.st end user destination location 404 and 2.sup.nd end user destination location 410) in accordance with scenario 1. In scenario 1, the transportation vehicle unit 20 is en route to rendezvous with the first end user 12*a* at a first end user rendezvous location 402 when it is assigned/selected to transport the second end user 12*b*.

As illustrated, the transportation vehicle unit (TVU) 20 is depicted as being currently en route to rendezvous with the first end user 12*a* at the first end user rendezvous location 402 and being currently located at current location 406 when it is selected for transport of the second end user 12*b*. FIG. 4A further illustrates an original direct route 403 that the TVU (e.g., transportation vehicle unit 20 of FIG. 1) could have taken to transport the first end user 12*a* from the first end user rendezvous location 402 to a first end user destination location 404 if the TVU was not selected for transporting the second end user 12*b*. However, because the TVU is selected to transport the second end user 12*b*, the TVU must take detour 414*a* in order to secure the second end user 12*b* from second end user rendezvous location 408 and take detour 414*b* to drop off the second end user 12*b* at a second end user destination location 410. As a result, the first end user 12*a* may be delayed in being transported to his/her destination location (e.g., first end user destination location 404). In various embodiments, the transport of the second end user 12*b* by the TVU may be permitted so long as the delay in transporting the first end user 12*a* is permitted by the first end user 12*a* and/or permitted by a third party such as a ridesharing company associated with the real-time carpooling management system 16.

Figure 4B:
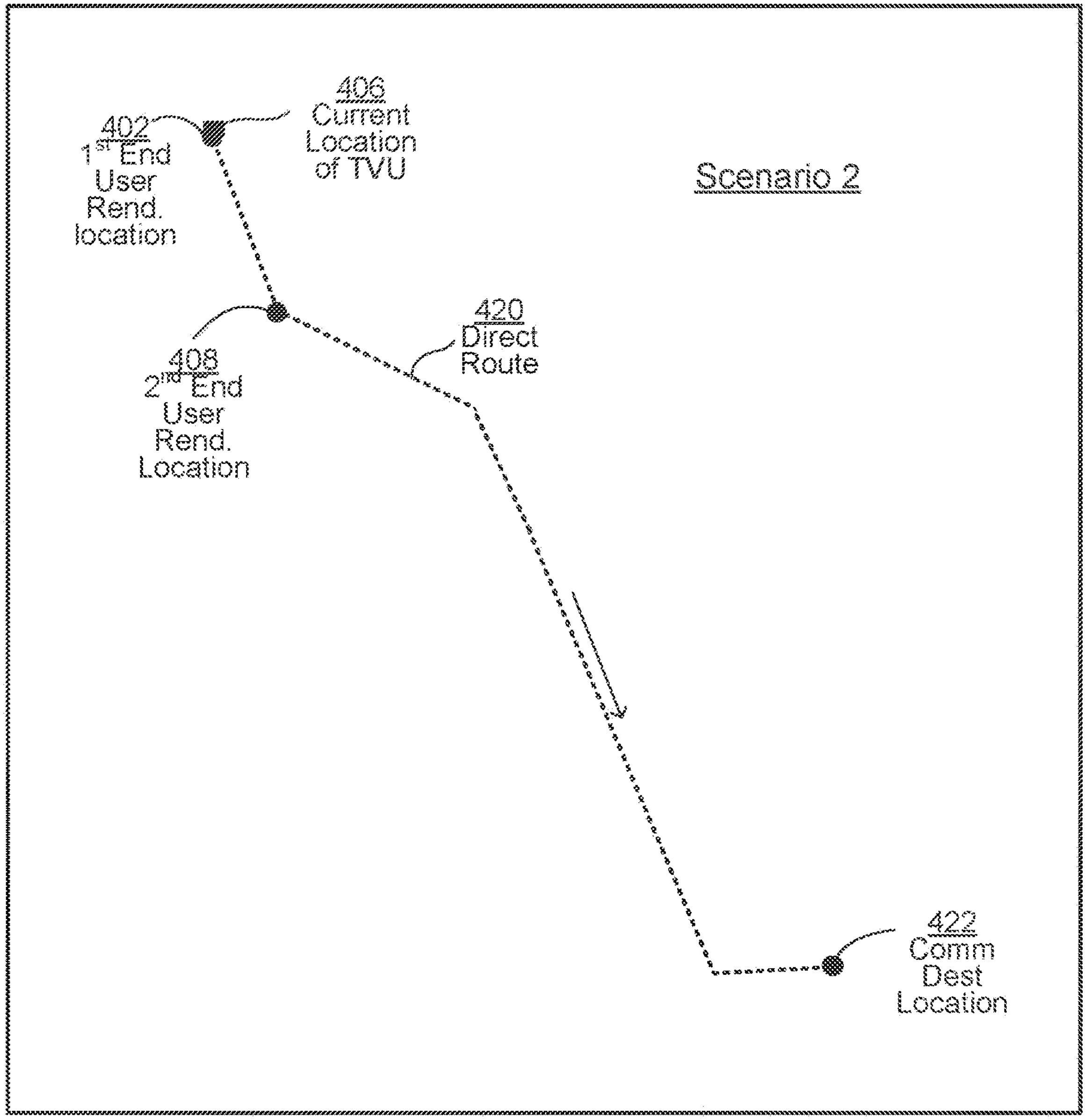
FIG. 4B illustrates another exemplary route that the example transportation vehicle unit 20 of FIG. 1 may use in order to transport carpooling passengers.

Turning now to FIG. 4B, which illustrates a scenario 2 in which the TVU (e.g., the transportation vehicle unit 20 of FIG. 1) uses a particular route (e.g., direct route 420) to transport the first end user 12*a* and the second end user 12*b* to a common destination location 422. In contrast to scenario 1 illustrated in FIG. 4A, in scenario 2 both the first end user

12*a* and the second end user 12*b* are scheduled to go to the same destination (e.g., common destination location 422). Further, the second end user rendezvous location 408 for rendezvousing with the second end user 12*b* is located along the direct route 420 for transporting the first end user 12*a* from a first end user rendezvous location 402 to the first end user's destination location (e.g., common destination location 422). In FIG. 4B, the TVU is currently located, at a point in time when the TVU (e.g., transportation vehicle unit 20) is selected for transport of the second end user 12*b*, at current location 406 that is the same as the first end user rendezvous location 402. Thus, in scenario 2, the first end user 12*a* will not incur a significant delay because the second end user rendezvous location 408 is located along the direct route 420 and the second end user 12*b* is going to the same common destination location 422 as the first end user 12*a*.

Scenario 2 reflects many true life situations. For example, scenario 2 may occur when a number of end users from the same general neighborhood are intent on attending the same sporting or concert event.

Figure 4C:
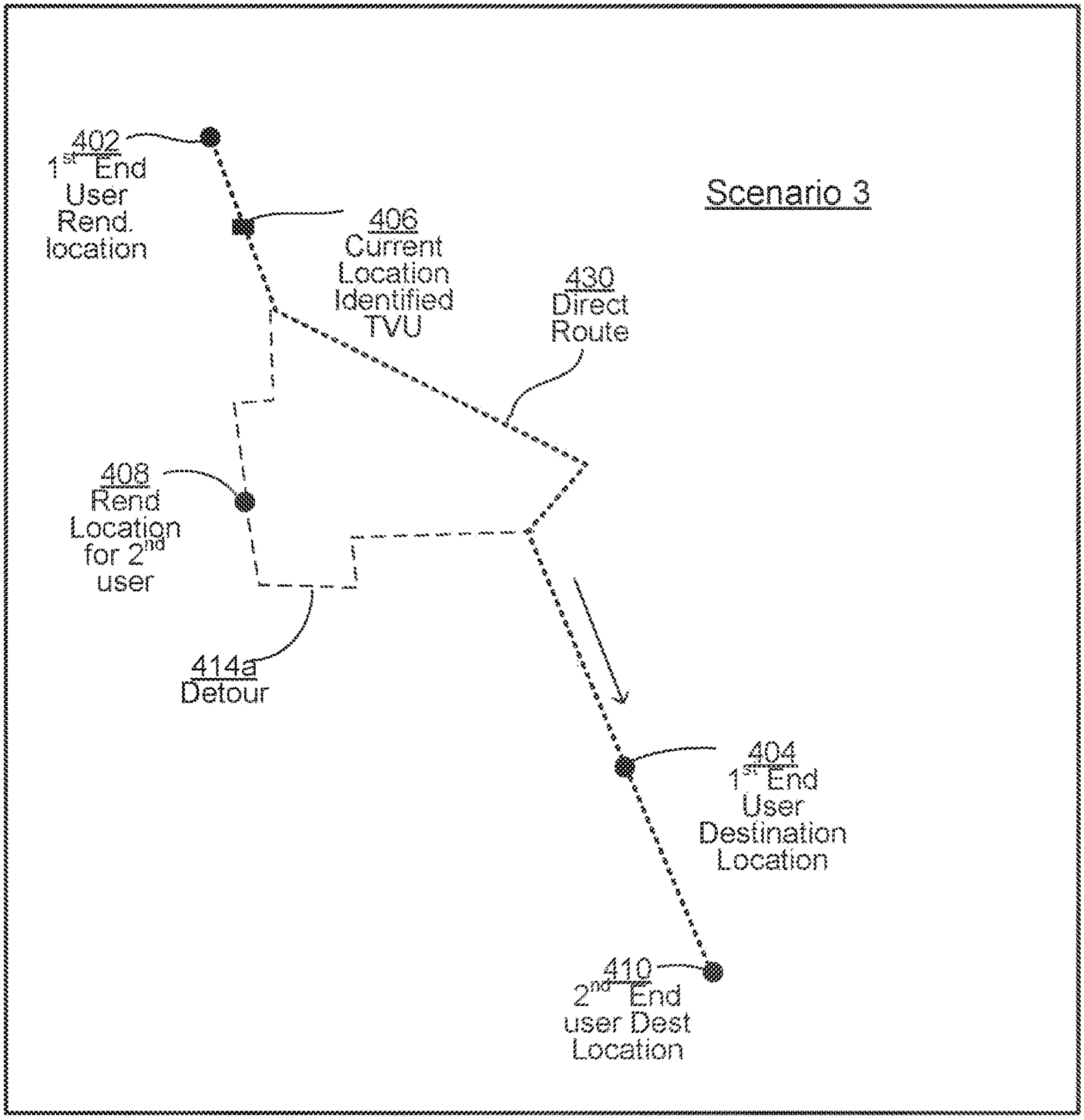
FIG. 4C illustrates another exemplary route that the example transportation vehicle unit 20 of FIG. 1 may use in order to transport carpooling passengers.

FIG. 4C illustrates a scenario 3 in which the TVU (e.g., the transportation vehicle unit 20 of FIG. 1) is already transporting the first end user 12*a* when the transportation vehicle unit 20 is selected or assigned (e.g., selected by the real-time carpooling management system 16) to transport the second end user 12*b*. As illustrated, when the transportation vehicle unit 20 is selected to transport the second end user 12*b*, the TVU is located at current location 406 along the direct route 430 from the first end user rendezvous location 402 to the first end user destination location 404 (which continues on to second end user destination location 410). In order to transport the second end user 12*b*, the TVU uses a detour 414*a* to secure the second end user 12*b* at rendezvous location 408. Note that in scenario 3, the second end user 12*b* is designated to be dropped off at second end user destination location 410, which is scheduled to occur after the first end user 12*a* has already been dropped off at a first end user destination location 404. Thus, the delay to transport of first end user 12*a* to his or her destination location (e.g., first end user destination location 404) as a result of the transportation vehicle unit 20 transporting the second end user 12*b* may be relatively minimal. That is, the only delay to the transport of the first end user 12*a* may be as a result of the transportation vehicle unit 20 being rerouted to rendezvous with the second end user 12*b* at the rendezvous location 408 using detour 414*a*.

Figure 4D:
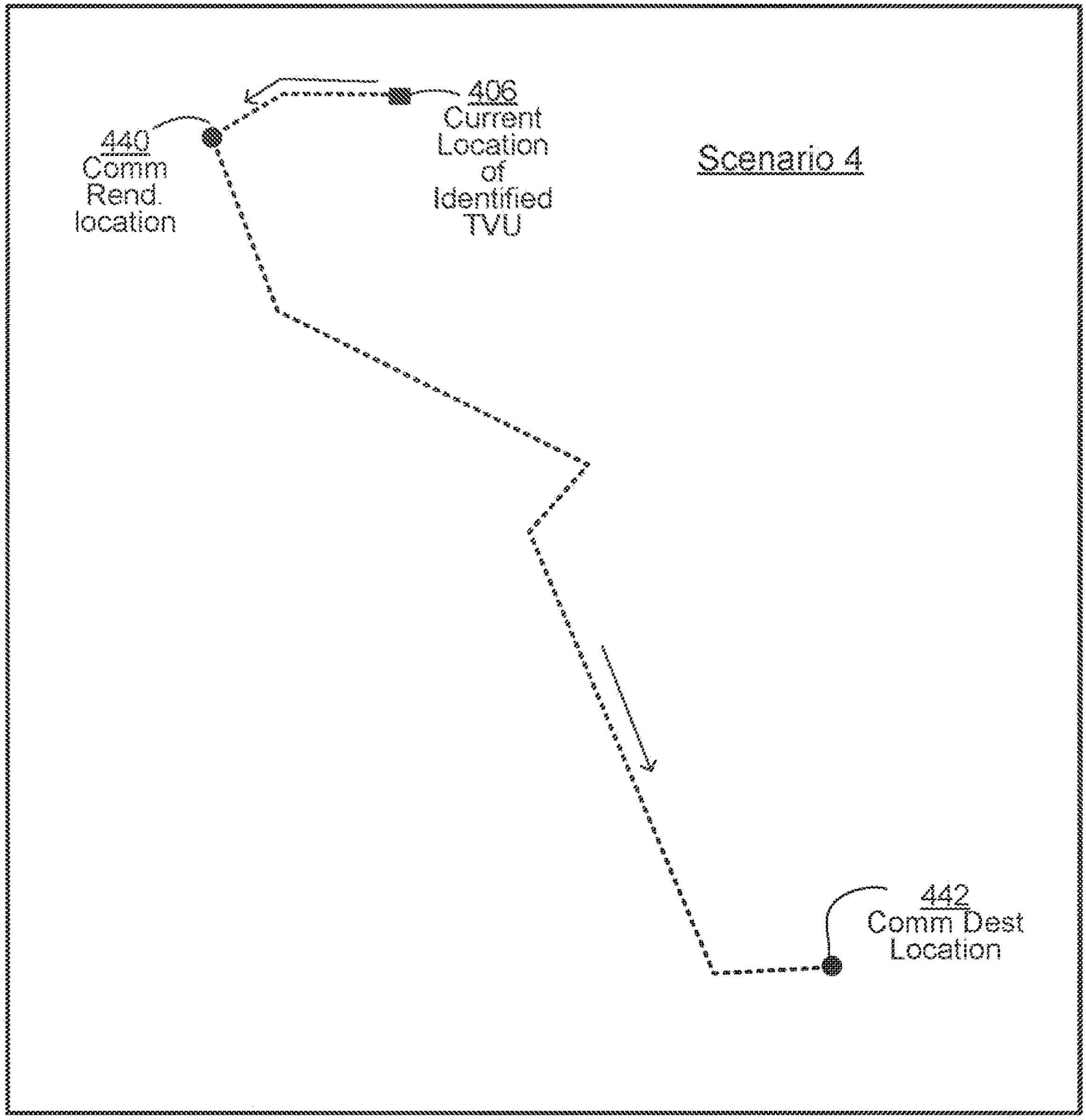
FIG. 4D illustrates another exemplary route that the example transportation vehicle unit 20 of FIG. 1 may use in order to transport carpooling passengers.

FIG. 4D illustrates a scenario 4 in which the TVU (e.g., the transportation vehicle unit 20 of FIG. 1) is to rendezvous with the first end user 12*a* and the second end user 12*b* at a common rendezvous location 440 and to transport the first end user 12*a* and the second end user 12*b* to a common destination location 442. Because there are no detours, there is little or no delay in transporting the first end user 12*a* to his/her destination (e.g., common destination location 442) except for any extended time that the TVU may have to stay at the common rendezvous location 440 in order to wait for the arrival of the second end user 12*b*. There are several real life situations in which such a scenario can occur. For example, at the end of a sporting event such as at a football game and a number of the spectators leaving the stadium with the intent to go to a popular bar/nightclub.

Figure 2A:
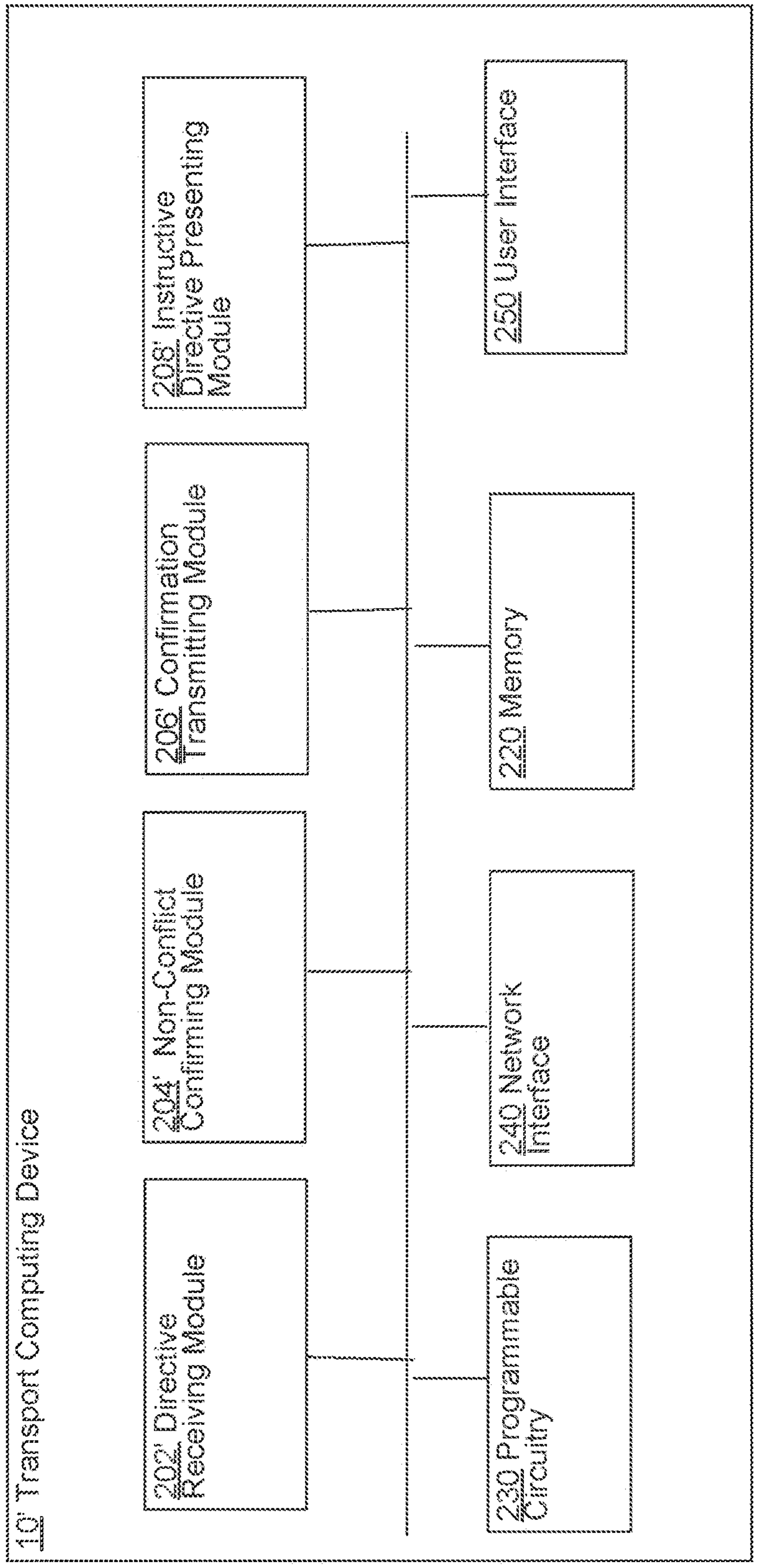
FIG. 2A shows a high-level block diagram of a particular implementation of the transport computing device 10* of FIG. 1 (illustrated as transport computing device 10').
Figure 2B:
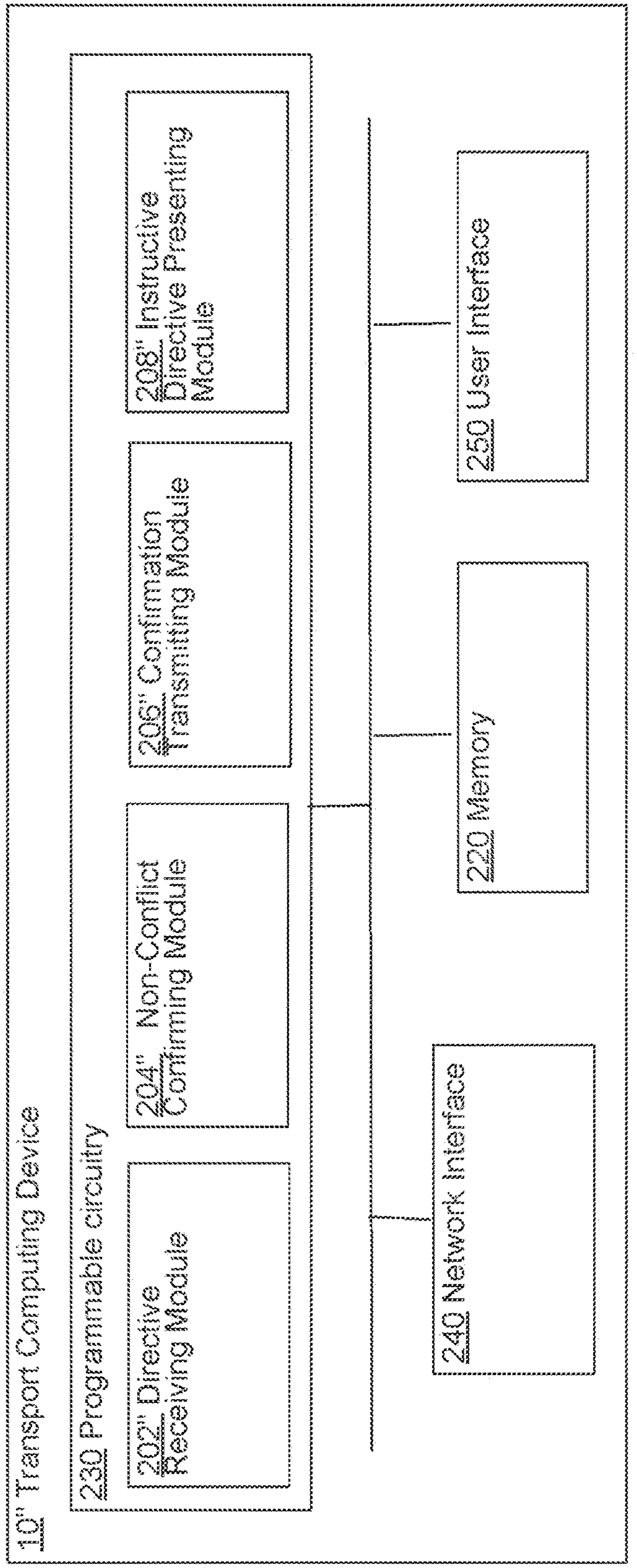
FIG. 2B shows another high-level block diagram of another implementation of the transport computing device 10* of FIG. 1 (illustrated as transport computing device 10").

Referring now to FIGS. 2A and 2B, which illustrate two block diagrams representing two different implementations of the transport computing device 10* of FIG. 1. In particular, and as will be further described herein, FIG. 2A illustrates a transport computing device 10' that is the "hardwired" or "hard" implementation of the transport computing device 10* of FIG. 1 that can implement the operations and processes to be described herein. The transport computing device 10' includes certain logic modules including a directive receiving module 202', a non-conflict confirming module 204', a confirmation transmitting module 206', and an instructive directive presenting module 208' that are implemented using purely hardware or circuitry components (e.g., application specific integrated circuit (or ASIC)). In contrast, FIG. 2B illustrates a transport computing device 10" that is the "soft" implementation of the transport computing device 10* of FIG. 1 in which certain logic modules including a directive receiving module 202", a non-conflict confirming module 204", a confirmation transmitting module 206", and an instructive directive presenting module 208" are implemented using programmable circuitry 230 (e.g., one or more processors 230 including one or more microprocessors, controllers, CPUs, GPUS, FPGAS, and/or other types of programmable circuitry) executing one or more programming instructions (e.g., software). Note that in some embodiments, the transport computing device 10" illustrated in FIG. 2B may be a general purposes computing device (e.g., a mobile computing device such as a Smartphone or tablet computer) that executes specialized computer readable instructions (e.g., software). In alternative embodiments, the transport computing device 10" may be a dedicated device designed specifically to execute the various operations and processes to be described herein.

The embodiments of the transport computing device 10* illustrated in FIGS. 2A and 2B (e.g., the transport computing device 10' of FIG. 2A and the transport computing device 10" of FIG. 2B) are two extreme implementations of the transport computing device 10* in which all of the logic modules (e.g., the directive receiving module 202', the non-conflict confirming module 204', the confirmation transmitting module 206", and the instructive directive presenting module 208') are implemented using purely hardware solutions (e.g., circuitry such as ASIC) as illustrated in FIG. 2A or in which all of the logic modules (e.g., the directive receiving module 202", the non-conflict confirming module 204", the confirmation transmitting module 206", and the instructive directive presenting module 208") are implemented using software solutions (e.g., programmable instructions being executed by programmable circuitry 230 such as field programmable gate array (FPGA) or one or more processors) as illustrated in FIG. 2B. Since there are many ways of combining hardware, software, and/or firmware in order to implement the various logic modules (e.g., the directive receiving module 202*, the non-conflict confirming module 204*, the confirmation transmitting module 206*, and the instructive directive presenting module 208"), only the two extreme implementations (e.g., the purely hardware solution as illustrated in FIG. 2A and the software solution of FIG. 2B) are illustrated here. It should be noted here that with respect to the "soft" implementation illustrated in FIG. 2B, hardware in the form of programmable circuitry such as one or more processors 230 (or FPGA) are still needed in order to execute the software (or firmware). Further details related to the two implementations of the transport computing device 10* illustrated in FIGS. 2A and 2B will be provided in greater detail below.

In some instances, one or more components may be referred to herein as "configured to," "configured by," "configurable to," "operable/operative to," "adapted/adaptable," "able to," "conformable/conformed to," "designed to," etc. Those skilled in the art will recognize that such terms (e.g., "configured to") generally encompass active-state components and/or inactive-state components and/or standby-state components, unless context requires otherwise.

Referring particularly now to FIG. 2A, which illustrates that the transport computing device 10', in addition to the directive receiving module 202', the non-conflict confirming module 204,' the confirmation transmitting module 206', and the instructive directive presenting module 208', may further include programmable circuitry 230 (e.g., one or more processors, controllers, and so forth), a network interface 240 (network interface card or NIC), memory 220, and/or a user interface 250. In various embodiments, memory 220 may comprise of volatile and/or non-volatile memory. In some embodiments, memory 220 may comprise of one or more of mass storage device, cache memory, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, the memory 220 may be employed to store a variety of programming instructions (e.g., software) and data including data indicating current end user transport obligations of the transportation vehicle unit 10', carpooling preferences of end users and/or third parties, and so forth.

Turning now to FIG. 2B, which illustrates a transport computing device 10" in which certain logic modules (the directive receiving module 202", the non-conflict confirming module 204", the confirmation transmitting module 206", and the instructive directive presenting module 208") are implemented using programmable circuitry 230 (e.g., one or more processors, one or more controllers, FPGAs, and/or other types of programmable circuitry). In addition, the transport computing device 10" may further include a memory 220, a network interface 240, and/or a user interface 250 similar to the transport computing device 10' of FIG. 2A.

In various embodiments the directive receiving module 202* of FIG. 2A or 2B (e.g., the directive receiving module 202' of FIG. 2A or the directive receiving module 202" of FIG. 2B) may be configured to, among other things, receive one or more first directives that direct the transportation vehicle unit 20 to transport a first end user 12*a*. The directive receiving module 202* may further be configured to receive, while the transportation vehicle unit 20 is en route to secure the first end user 12*a* or is transporting the first end user 12*a*, one or more second directives that direct the transportation vehicle unit 20 to transport a second end user 12*b* while transporting the first end user 12*a*, the transportation vehicle unit having been determined to be able to accommodate transport of the second end user 12*b* while transporting the first end user 12*a*. In contrast, the non-conflict confirming module 204* of FIG. 2A or 2B (e.g., the non-conflict confirming module 204' of FIG. 2A or the non-conflict confirming module 204" of FIG. 2B) may be configured to, among other things, verify or confirm that compliance with the one or more second directives will not conflict with one or more obligations to transport the first end user 12*a* by the transportation vehicle unit 20. Meanwhile, the confirmation transmitting module 206* of FIG. 2A or 2B may be configured to, among other things, transmit one or more confirmations that the one or more second directives have been accepted for execution by the transportation vehicle unit 20. On the other hand, the instructive directive presenting module 208* of FIG. 2A or 2B may be configured to, among other things, present, in response to verification or confirmation that compliance with the one or more second directives will not conflict with one or more obligations to transport the first end user 12*a* by the transportation vehicle unit 20, one or more instructive directives that direct the transportation vehicle unit 20 to transport the second end user 12*b*.

Figure 3A:
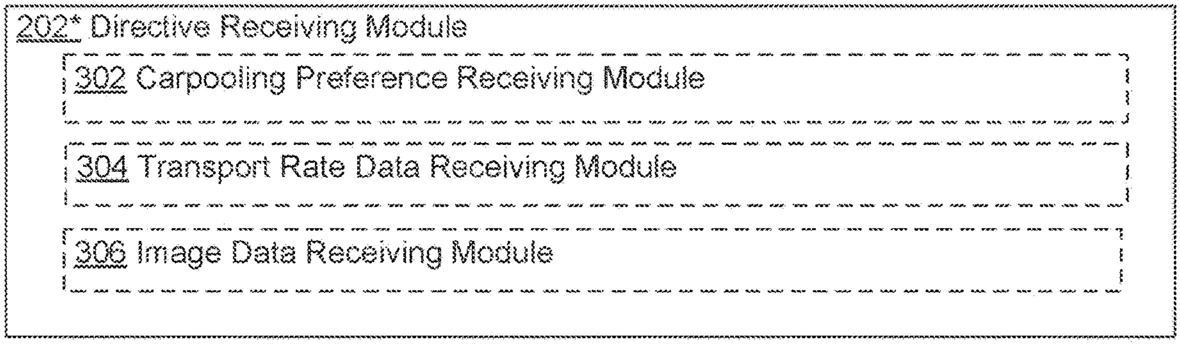
FIG. 3A shows another perspective of the directive receiving module 202* of FIGS. 2A and 2B (e.g., the directive receiving module 202' of FIG. 2A or the directive receiving module 202" of FIG. 2B) in accordance with various embodiments.

Referring now to FIG. 3A illustrating a particular implementation of the directive receiving module 202* (e.g., the directive receiving module 202' or the directive receiving module 202") of FIG. 2A or 2B. As illustrated, the directive receiving module 202* may include one or more sub-logic modules in various alternative implementations. For example, in various embodiments, the directive receiving module 202* may further include a carpooling preference receiving module 302, a transport rate data receiving module 304, and/or an image data receiving module 306. Specific details related to the directive receiving module 202* as well as the above-described sub-modules of the directive receiving module 202* will be provided below with respect to the operations and processes to be described herein.

Figure 3B:
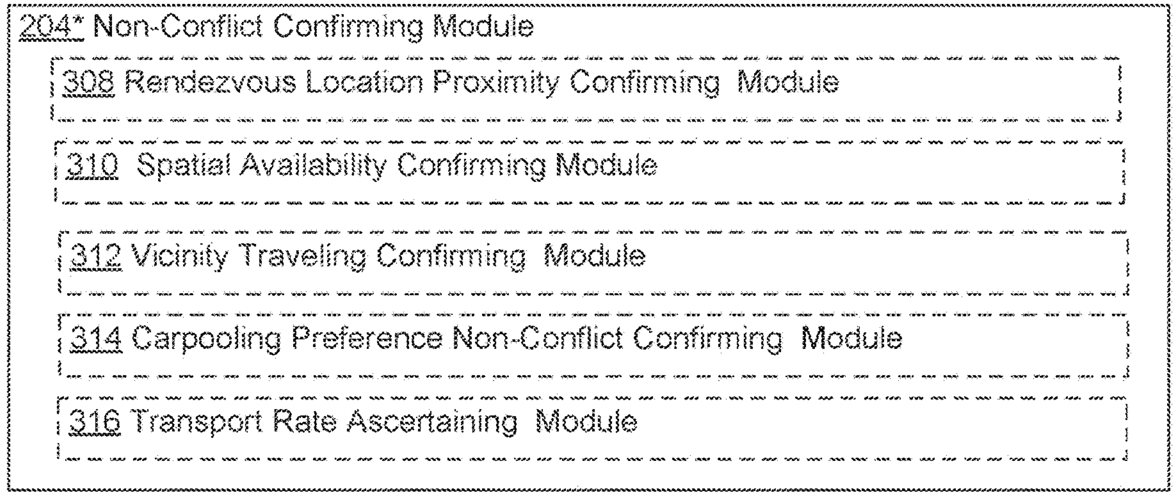
FIG. 3B shows another perspective of the non-conflict confirming module 204* of FIGS. 2A and 2B (e.g., the non-conflict confirming module 204' of FIG. 2A or the non-conflict confirming module 204" of FIG. 2B) in accordance with various embodiments.

FIG. 3B illustrates a particular implementation of the non-conflict confirming module 204* (e.g., the non-conflict confirming module 204' or the non-conflict confirming module 204") of FIG. 2A or 2B. As illustrated, the non-conflict confirming module 204* may include one or more sub-logic modules in various alternative implementations. For example, in various embodiments, the non-conflict confirming module 204* may further include a rendezvous location proximity confirming module 308, a spatial availability confirming module 310, a vicinity traveling confirming module 312, a carpooling preference non-conflict confirming module 314, and/or a transport rate ascertaining module 316. Specific details related to the non-conflict confirming module 204* as well as the above-described sub-module of the non-conflict confirming module 204*.

Figure 3C:
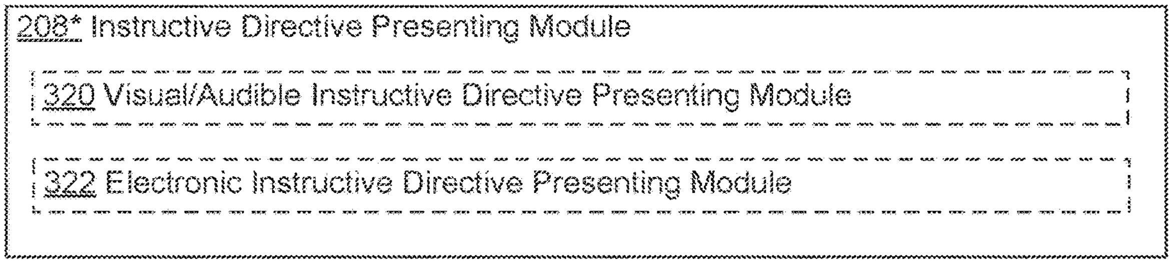
FIG. 3C shows another perspective of the instructive directive presenting module 208* of FIGS. 2A and 2B (e.g., the instructive directive presenting module 208' of FIG. 2A or the instructive directive presenting module 208" of FIG. 2B) in accordance with various embodiments.

FIG. 3C illustrates a particular implementation of the instructive directive presenting module 208* (e.g., instructive directive presenting module 208' or the instructive directive presenting module 208") of FIG. 2A or 2B. As illustrated, the instructive directive presenting module 208* may include one or more sub-logic modules in various alternative implementations. For example, in various embodiments, the instructive directive presenting module 208* may further include a visual/audible instructive directive presenting module 320 and/or an electronic instructive directive presenting module 322. Specific details related to the instructive directive presenting module 208" as well as the above-described sub-module of the instructive directive presenting module 208* will be provided below with respect to the operations and processes to be described herein.

Figure 4E:
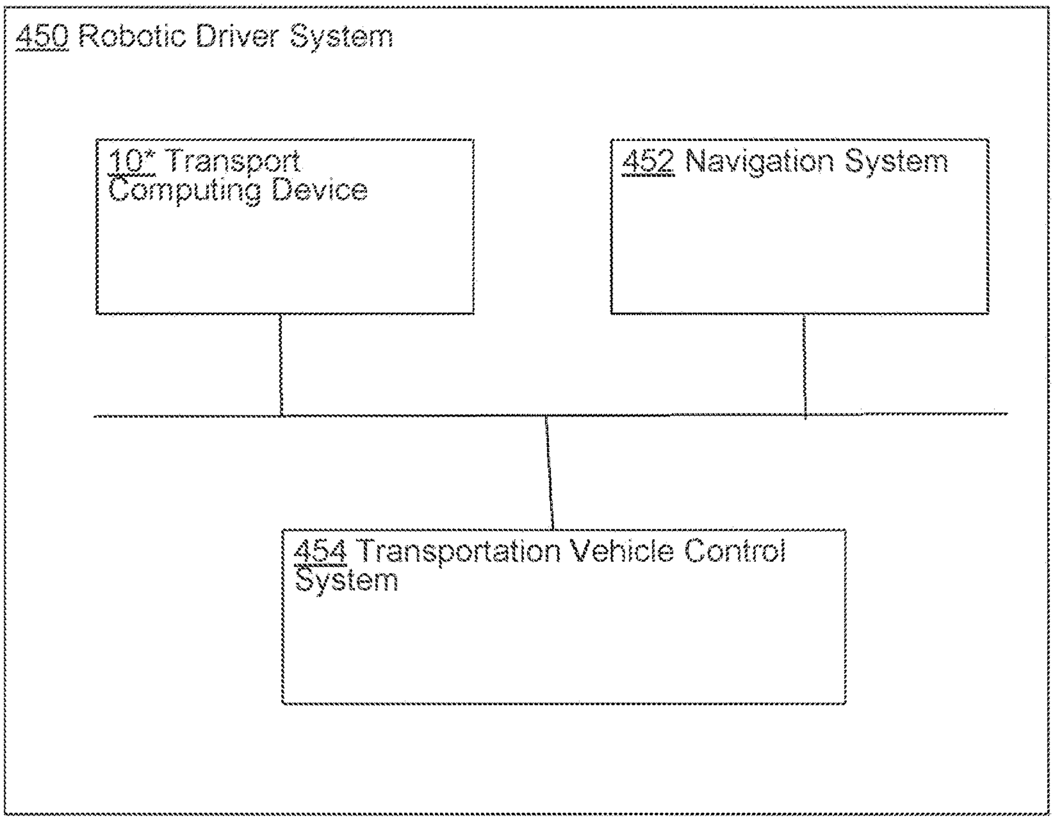
FIG. 4E illustrates an exemplary robotic driver system 450 that includes the transport computing device 10* of FIG. 2A or 2B.

Turning now to FIG. 4E, which illustrates a block diagram of a robotic driver system 450 that may be employed by a transportation vehicle unit 20. The robotic driver system 450 may be employed in order to replace a human driver and may include, among other things, a transport computing device 10* of FIG. 2A or 2B, a navigation system 452, and a transportation vehicle control system 454. The navigation system 452 may be designed to provide navigational functionalities (e.g., plans routes to a destination location from a starting location, keeps track of the location of the transportation vehicle unit 20 using GPS data, and so forth) while the transportation vehicle control system 454 may be employed to control the various driving components (e.g., steering, gas, brakes, transmission, and so forth) of the vehicle portion (e.g., gas or electric powered vehicle) of the transportation vehicle unit 20.

Figure 5:
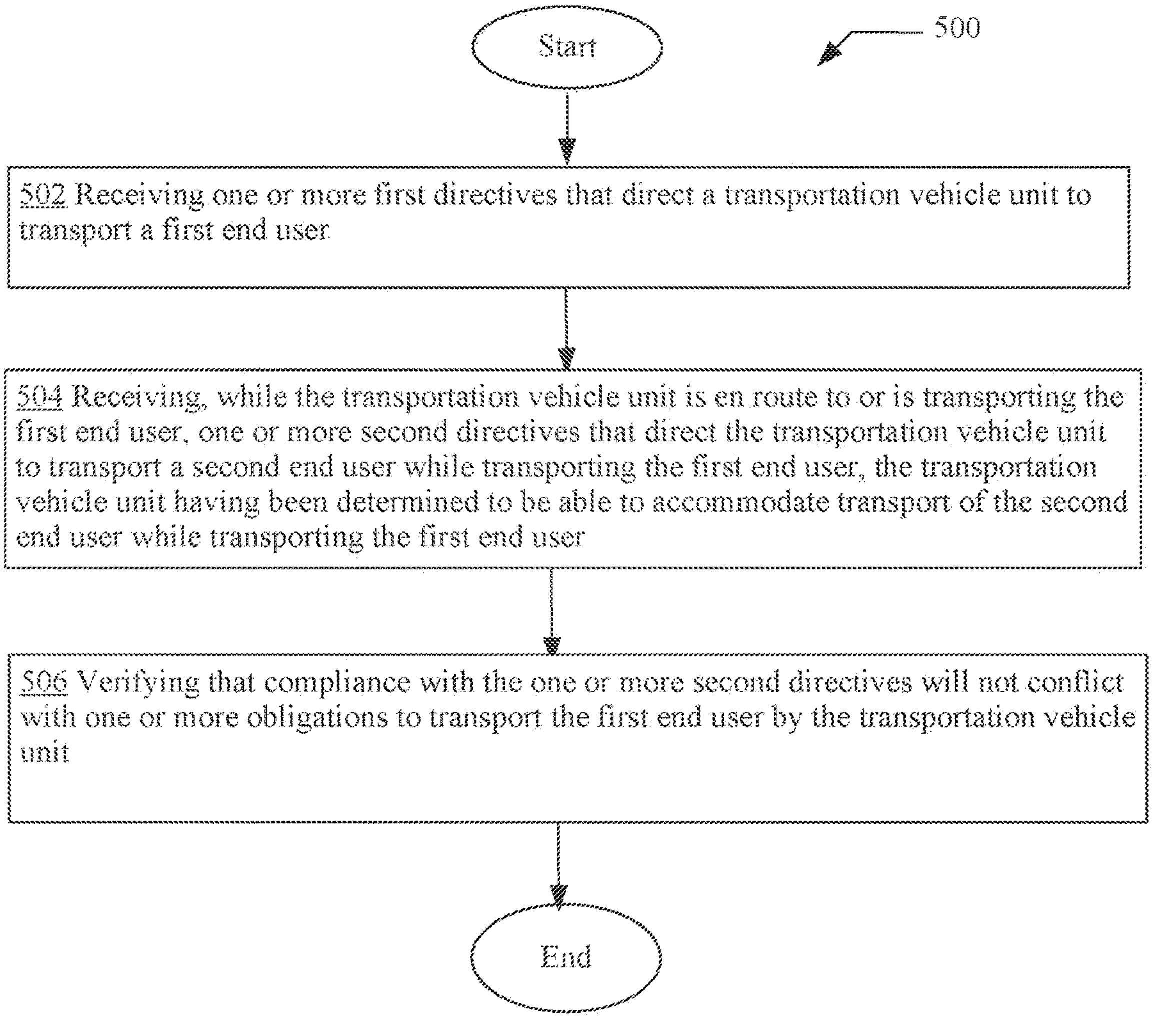
FIG. 5 is a high-level logic flowchart of a process, e.g., operational flow 500, according to some embodiments.

In the following, various operations associated with the above described transport computing device 10* (e.g., the transport computing device 10' of FIG. 2A or the transport computing device 10" of FIG. 2B) will be presented in accordance with various alternative embodiments. FIG. 5, for example, illustrates an operational flow 500 representing example computationally-implemented operations that may be implemented for, among other things, verifying that compliance with the one or more second directives that direct a transportation vehicle unit 20 to transport a second end user 12*b* will not conflict with one or more obligations to transport a first end user 12*a* by the transportation vehicle unit 20.

In FIG. 5 and in the following figures that include various examples of operational flows, discussions and explanations will be provided with respect to the transport computing device 10* described above and as illustrated in FIGS. 2A, 2B, 3A, 3B, and 3C, and/or with respect to other examples (e.g., as provided in FIGS. 1 and 4A, 4B, 4C, 4D, and 4E) and contexts. However, it should be understood that the operational flows may be executed in a number of other environments and contexts, and/or in modified versions of FIGS. 1, 2A, 2B, 3A, 3B, 3C, 4A, 4B, 4C, 4D, and/or 4E. Also, although the various operational flows are presented in the sequence(s) illustrated, it should be understood that the various operations may be performed in orders other than those which are illustrated, or may be performed concurrently.

Further, in FIG. 5 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 5 as well as the other operations to be described herein are performed by at least one of a machine, an article of manufacture, or a composition of matter unless indicated otherwise.

For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

In any event, after a start operation, the operational flow 500 of FIG. 5 may move to a first directive receiving operation 502 for receiving one or more first directives that direct a transportation vehicle unit to transport a first end user. For instance, and as illustration, the directive receiving module 202* of the transport computing device 10* of FIG. 2A or 2B (e.g., the directive receiving module 202' of FIG. 2A or the directive receiving module 202" of FIG. 2B) receiving one or more first directives that direct (e.g., instructs) a transportation vehicle unit 20 to transport a first end user 12*a*. As will be further described below, the one or more first directives that are received may provide various information including pickup location (e.g., rendezvous location) for rendezvousing with the first end user, the destination (e.g., destination location) for the first end user, carpooling preferences, and so forth. In various implementations, the one or more first directives may be received from a network entity (e.g., a real-time carpooling coordinating system 15 or a real-time carpooling management system 16 of FIG. 1) or may entered by a human driver (who may have picked-up a street fare—e.g., the first end user 12*a*) associated with the transportation vehicle unit 20.

Operational flow 500 may also include a second directive receiving operation 504 for receiving, while the transportation vehicle unit is en route to or is transporting the first end user, one or more second directives that direct the transportation vehicle unit to transport a second end user while transporting the first end user, the transportation vehicle unit having been determined to be able to accommodate transport of the second end user while transporting the first end user. For instance, the directive receiving module 202* (e.g., the directive receiving module 202' of FIG. 2A or the directive receiving module 202" of FIG. 2B) of the transport computing device 10* of FIG. 2A or 2B receiving, while the transportation vehicle unit 20 is en route to rendezvousing with the first end user 12*a* at a first end user rendezvous location or is transporting the first end user 12*a*, one or more second directives that direct (e.g., instruct) the transportation vehicle unit 20 to transport a second end user 12*b* while transporting the first end user 12*a*, the transportation vehicle unit 20 having been determined by, for example, the real-time carpooling management system 16 of FIG. 1, to be able to accommodate transport of the second end user 12*b* while the transportation vehicle unit 20 is transporting the first end user 12*a*. Note that for purposes of this description the phrase "en route to or is transporting the first end user" may also include the point or span in time in which the transportation vehicle unit 20*a* has reached a rendezvous location for rendezvousing with the first end user 12*a* and is waiting for the first end user 12*a* to reach the rendezvous location.

As further illustrated in FIG. 5, operational flow 500 may further include a non-conflict verifying operation 506 for verifying that compliance with the one or more second directives will not conflict with one or more obligations to transport the first end user by the transportation vehicle unit. For instance, the non-conflict confirming module 204* (e.g., the non-conflict confirming module 204' of FIG. 2A or the non-conflict confirming module 204" of FIG. 2B) of the transport computing device 10* of FIG. 2A or 2B verifying or confirming that compliance with the one or more second directives to transport the second end user 12*b* by the transportation vehicle unit 20 will not conflict with one or more obligations to transport the first end user 12*a* by the transportation vehicle unit 20. For example, verifying or confirming that the transportation vehicle unit 20 can still fulfill an obligation to transport the first end user 12*a* to a first end user destination location without significant delay even if the transportation vehicle unit 20 transports the second end user 12*b* while transporting the first end user 12*a*.

Figure 6A:
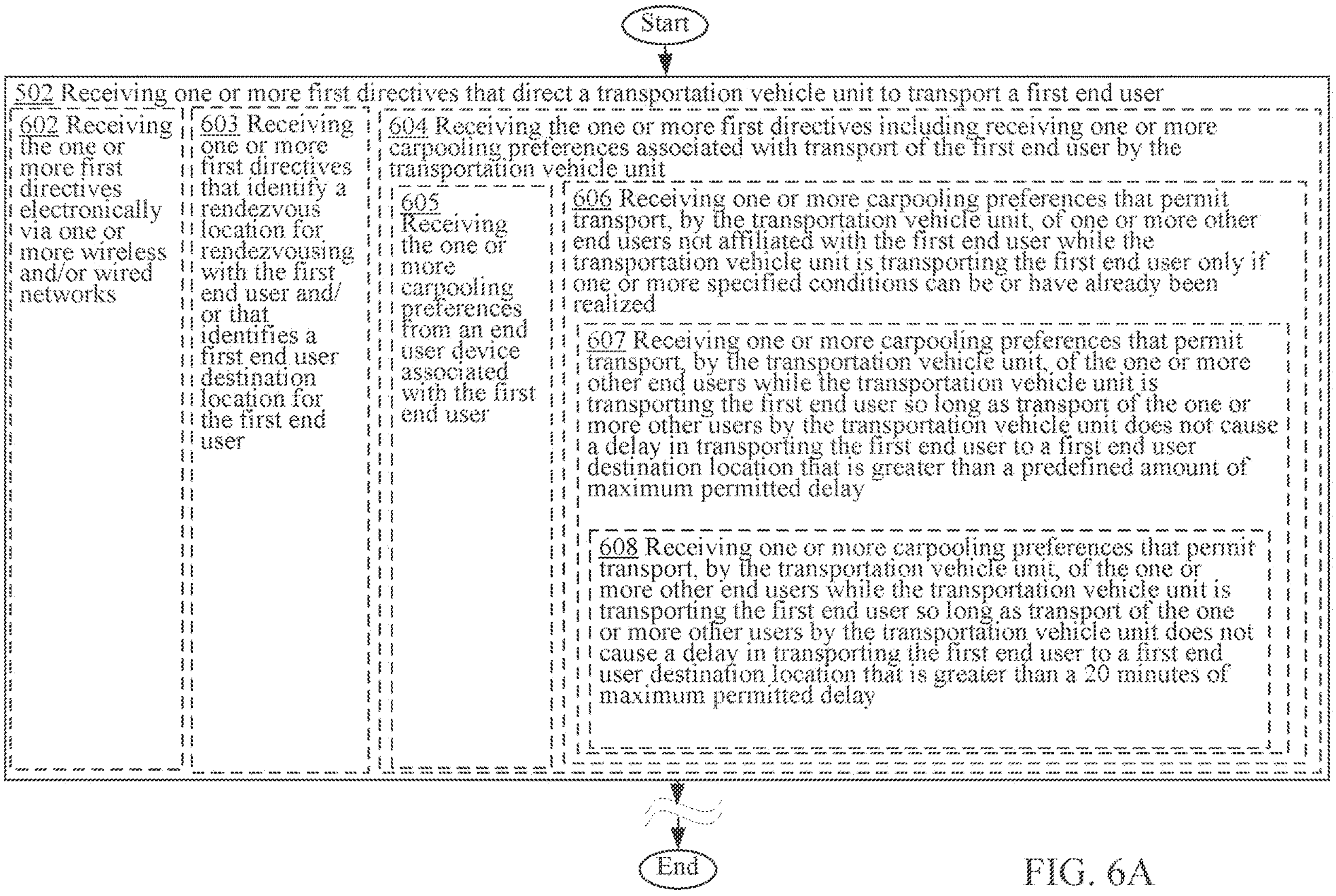
FIG. 6A is a high-level logic flowchart of a process depicting alternate implementations of the first directive receiving operation 502 of FIG. 5.

As will be described below, the first directive receiving operation 502, the second directive receiving operation 504, and the non-conflict verifying operation 506 may be executed in a variety of different ways in various alternative implementations. FIGS. 6A, 6B, 6C, and 6D, for example, illustrate at least some of the alternative ways that the first directive receiving operation 502 of FIG. 5 may be executed in various alternative implementations. In some cases, for example, the first directive receiving operation 502 may include an operation 602 for receiving the one or more first directives electronically via one or more wireless and/or wired networks as illustrated in FIG. 6A. For instance, the directive receiving module 202* of the transport computing device 10* (e.g., the transport computing device 10' of FIG. 2A or the transport computing device 10" of FIG. 2B) receiving the one or more first directives electronically via one or more wireless and/or wired networks 18 (e.g., cellular data network, WLAN, WAN, MAN (metropolitan area network), Ethernet, etc.). In some cases, the directive receiving module 202* may control a network interface 240 in order to electronically receive the one or more package delivery directives.

In various implementations, the first directive receiving operation 502 may include an operation 603 for receiving one or more first directives that identify a rendezvous location for rendezvousing with the first end user and/or that identifies a first end user destination location for the first end user. For instance, the directive receiving module 202* of the transport computing device 10* of FIG. 2A or 2B receiving one or more first directives that identify a rendezvous location (e.g., the current GPS location of the first end user 12*a* when the first directives are received) for the transportation vehicle unit to rendezvous with the first end user and/or that identifies a first end user destination location for the first end user.

In the same or alternative implementations, the first directive receiving operation 502 may alternatively or additionally include an operation 604 for receiving the one or more first directives including receiving one or more carpooling preferences associated with transport of the first end user by the transportation vehicle unit. For instance, the directive receiving module 202* including the carpooling preference receiving module 302 (see FIG. 3A) of the transport computing device 10* of FIG. 2A or 2B receiving the one or more first directives including receiving one or more carpooling preferences associated with transport of the first end user 12*a* by the transportation vehicle unit 20. For example, the one or more carpooling preferences may indicate that the transportation vehicle unit 20 will be permitted to transport other end users (not associated with the first end user 12*a*) while transporting the first end user 12*a* if transport of the end users will not cause a significant delay (e.g., more than 15 minutes delay) in the first end user 12*a* reaching his or her destination.

As further illustrated in FIG. 6A, in various implementations, operation 604 may include an operation 605 for receiving the one or more carpooling preferences from an end user device associated with the first end user. For instance, the carpooling preference receiving module 302 of the transport computing device 10* of FIG. 2A or 2B receiving the one or more carpooling preferences from an end user device 14 (e.g., a mobile device such as a Smartphone or tablet computer, a laptop computer, and so forth) associated with the first end user 12*a*.

In the same or alternative implementations, operation 604 may alternatively or additionally include an operation 606 for receiving one or more carpooling preferences that permit transport, by the transportation vehicle unit, of one or more other end users not affiliated with the first end user while the transportation vehicle unit is transporting the first end user only if one or more specified conditions can be or have already been realized. For instance, the carpooling preference receiving module 302 of the transport computing device 10* of FIG. 2A or 2B receiving one or more carpooling preferences that permit transport, by the transportation vehicle unit 20, of one or more other end users not affiliated with the first end user 12*a* while the transportation vehicle unit 20 is transporting the first end user 12*a* only if one or more specified conditions can be or have already been realized (e.g., transport of the other end users will not cause significant delays for transporting the first end user 12*a* to his/her destination or the transportation vehicle unit 20 has sufficient passenger space to accommodate the other end users).

In some implementations, operation 606 may actually involve an operation 607 for receiving one or more carpooling preferences that permit transport, by the transportation vehicle unit, of the one or more other end users while the transportation vehicle unit is transporting the first end user so long as transport of the one or more other users by the transportation vehicle unit does not cause a delay in transporting the first end user to a first end user destination location that is greater than a predefined amount of maximum permitted delay. For instance, the carpooling preference receiving module 302 of the transport computing device 10* of FIG. 2A or 2B receiving one or more carpooling preferences that permit transport, by the transportation vehicle unit 20, of the one or more other end users while the transportation vehicle unit 20 is transporting the first end user 12*a* as long as transport of the one or more other users by the transportation vehicle unit 20 does not cause a delay in transporting the first end user to a first end user destination location that is greater than a predefined amount of maximum permitted delay (e.g., maximum allowable delay of 25 minutes or less). In some cases, a delay that may be caused by transporting other end users may be calculated by, for example, first estimating the amount of time it would take to transport the first end user 12*a* to a destination location when the transportation vehicle unit 20 is not transporting other end users then estimating the amount of time it would take to transport the first end user 12*a* to the destination location when the transportation vehicle unit 20 is transporting other end users, and then determining the difference between the two estimated times in order to determine the estimated time delay that would result as a result of the transportation vehicle unit 20 transporting other end users while transporting the first end user 12*a*.

In some cases, operation 607 may further involve an operation 608 for receiving one or more carpooling preferences that permit transport, by the transportation vehicle unit, of the one or more other end users while the transportation vehicle unit is transporting the first end user so long as transport of the one or more other users by the transportation vehicle unit does not cause a delay in transporting the first end user to a first end user destination location that is greater than a 20 minutes of maximum permitted delay. For instance, the carpooling preference receiving module 302 of the transport computing device 10* of FIG. 2A or 2B receiving one or more carpooling preferences that permit (e.g., as permitted by the logic of the transport computing device 10* when the logic abides with the one or more carpooling preferences) transport, by the transportation vehicle unit 20, of the one or more other end users while the transportation vehicle unit 20 is transporting the first end user 12*a* as long as transport of the one or more other users by the transportation vehicle unit 20 does not cause a delay in transporting the first end user 12*a* to a first end user destination location that is greater than a 20 minutes of maximum permitted delay.

Figure 6B:
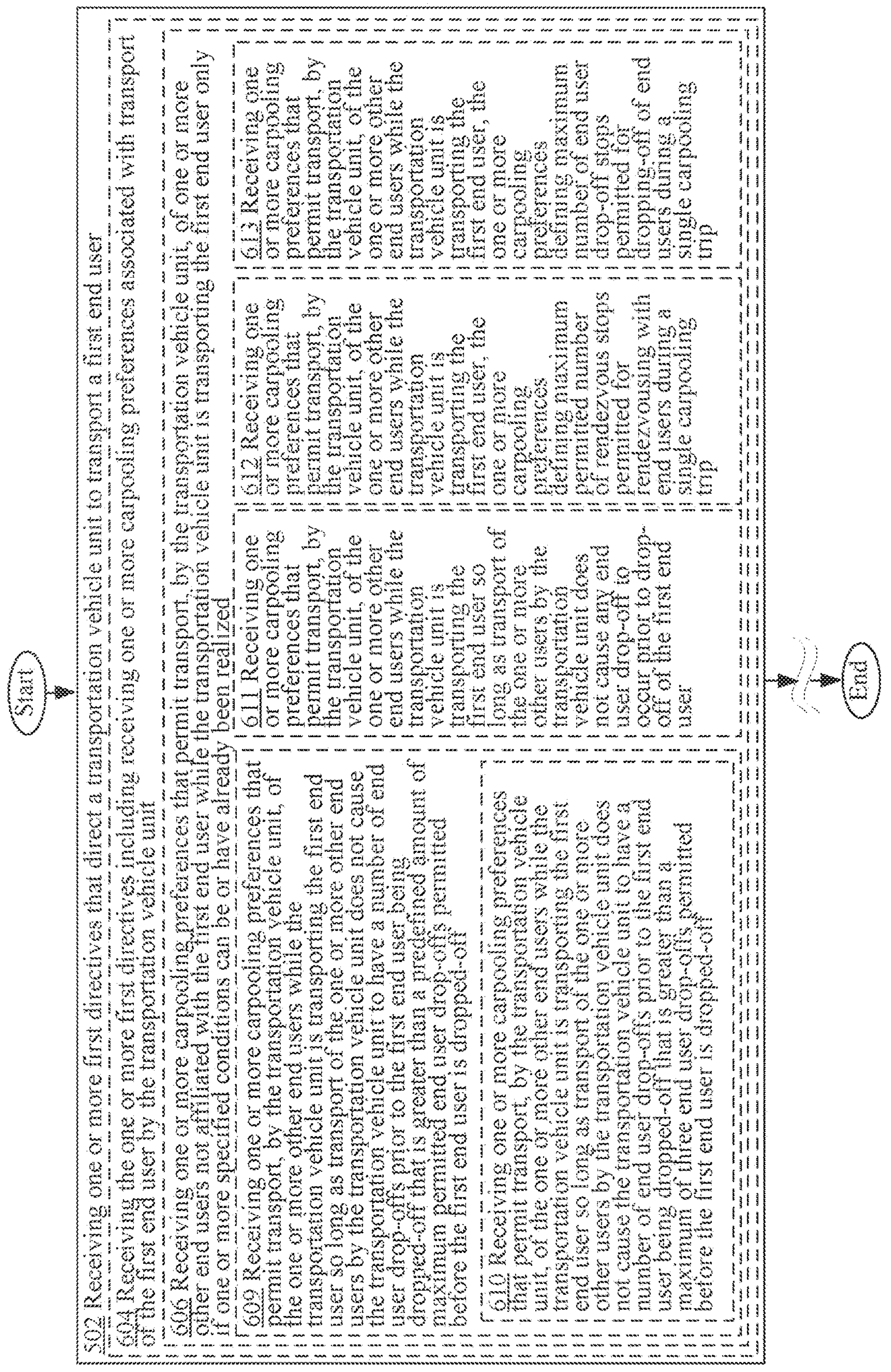
FIG. 6B is a high-level logic flowchart of a process depicting alternate implementations of the first directive receiving operation 502 of FIG. 5.

Turning to FIG. 6B, in the same or alternative implementations, operation 606 for receiving one or more carpooling preferences that permit transport, by the transportation vehicle unit, of one or more other end users not affiliated with the first end user while the transportation vehicle unit is transporting the first end user only if one or more specified conditions can be or have already been realized may additionally or alternatively include an operation 609 for receiving one or more carpooling preferences that permit transport, by the transportation vehicle unit, of the one or more other end users while the transportation vehicle unit is transporting the first end user so long as transport of the one or more other end users by the transportation vehicle unit does not cause the transportation vehicle unit to have a number of end user drop-offs prior to the first end user being dropped-off that is greater than a predefined amount of maximum permitted end user drop-offs permitted before the first end user is dropped-off. For instance, the carpooling preference receiving module 302 of the transport computing device 10* of FIG. 2A or 2B receiving one or more carpooling preferences that permit (e.g., as permitted by the logic of the transport computing device 10* when the logic complies with the one or more carpooling preferences) transport, by the transportation vehicle unit 20, of the one or more other end users while the transportation vehicle unit 20 is transporting the first end user 12*a* as long as transport of the one or more other end users by the transportation vehicle unit 20 does not cause the transportation vehicle unit 20 to have a number of end user drop-offs (e.g., the act or acts of off-loading passengers at their destination location(s)) prior to the first end user 12*a* being dropped-off that is greater than a predefined amount of maximum permitted end user drop-offs permitted before the first end user is dropped-off. For example, if the maximum number of permitted end user drop-offs prior to the first end user 12*a* is two but the addition of other end users during transport of the first end user 12*a* would result in the transportation vehicle unit 20 having three end user drop-offs prior to the first end user 12*a* being dropped-off at the first end user's destination location, then the transport of the other end users by the transportation vehicle unit 20 while transporting the first end user 12*a* will not be permitted by the logic of the transport computing device 10* (e.g., the logic of the transport computing device 10* will reject directives to transport the other end users).

In some cases, operation 609 may actually involve an operation 610 for receiving one or more carpooling preferences that permit transport, by the transportation vehicle unit, of the one or more other end users while the transportation vehicle unit is transporting the first end user so long as transport of the one or more other users by the transportation vehicle unit does not cause the transportation vehicle unit to have a number of end user drop-offs prior to the first end user being dropped-off that is greater than a maximum of three end user drop-offs permitted before the first end user is dropped-off. For instance, the carpooling preference receiving module 302 of the transport computing device 10* of FIG. 2A or 2B receiving one or more carpooling preferences that permit (e.g., as permitted by the logic of the transport computing device 10* when the logic complies with the one or more carpooling preferences) transport, by the transportation vehicle unit 20, of the one or more other end users while the transportation vehicle unit 20 is transporting the first end user 12*a* as long as transport of the one or more other users by the transportation vehicle unit 20 does not cause the transportation vehicle unit 20 to be scheduled to have a number of end user drop-offs prior to the first end user 12*a* being dropped-off that is greater than a maximum of three end user drop-offs permitted before the first end user 12*a* is dropped-off In the same or alternative implementations, operation 606 may additionally or alternatively include an operation 611 for receiving one or more carpooling preferences that permit transport, by the transportation vehicle unit, of the one or more other end users while the transportation vehicle unit is transporting the first end user so long as transport of the one or more other users by the transportation vehicle unit does not cause any end user drop-off to occur prior to drop-off of the first end user. For instance, the carpooling preference receiving module 302 of the transport computing device 10* of FIG. 2A or 2B receiving one or more carpooling preferences that permit (e.g., as permitted by the logic of the transport computing device 10* when the logic complies with the one or more carpooling preferences) transport, by the transportation vehicle unit 20, of the one or more other end users while the transportation vehicle unit 20 is transporting the first end user 12*a* as long as transport of the one or more other users by the transportation vehicle unit 20 does not cause any end user drop-off (e.g., end user offloading) to occur prior to drop of the first end user 12*a*.

In the same or alternative implementations, operation 606 may additionally or alternatively include an operation 612 for receiving one or more carpooling preferences that permit transport, by the transportation vehicle unit, of the one or more other end users while the transportation vehicle unit is transporting the first end user, the one or more carpooling preferences defining maximum permitted number of rendezvous stops permitted for rendezvousing with end users during a single carpooling trip. For instance, the carpooling preference receiving module 302 of the transport computing device 10* of FIG. 2A or 2B receiving one or more carpooling preferences that permit (e.g., as permitted by the logic of the transport computing device 10* when the logic complies with the one or more carpooling preferences) transport, by the transportation vehicle unit 20, of the one or more other end users while the transportation vehicle unit 20 is transporting the first end user 12*a*, the one or more carpooling preferences defining maximum permitted number of rendezvous stops permitted for rendezvousing with end users during a single carpooling trip (e.g., a trip route to transport a group of unaffiliated end users from one or more rendezvous locations to one or more destination locations).

In the same or alternative implementations, operation 606 may additionally or alternatively include an operation 613 for receiving one or more carpooling preferences that permit transport, by the transportation vehicle unit, of the one or more other end users while the transportation vehicle unit is transporting the first end user, the one or more carpooling preferences defining maximum number of end user drop-off stops for dropping-off of end users permitted during a single carpooling trip. For instance, the carpooling preference receiving module 302 of the transport computing device 10* of FIG. 2A or 2B receiving one or more carpooling preferences that permit (e.g., as permitted by the logic of the transport computing device 10* when the logic complies with the one or more carpooling preferences) transport, by the transportation vehicle unit 20, of the one or more other end users while the transportation vehicle unit 20 is transporting the first end user 12*a*, the one or more carpooling preferences defining maximum number of end user drop-off stops permitted for dropping-off of end users including the first end user 12*a* during a single carpooling trip.

Figure 6C:
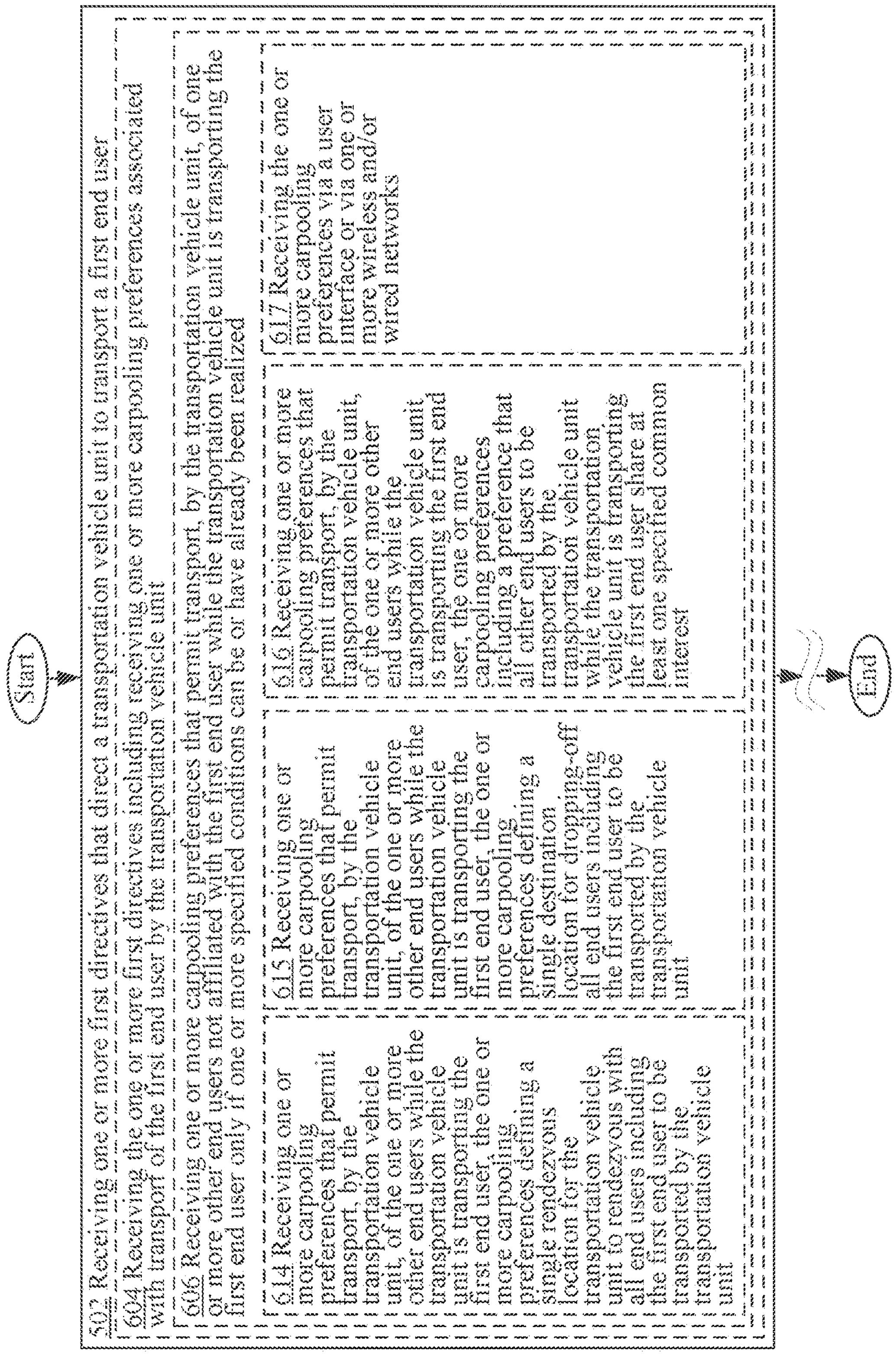
FIG. 6C is a high-level logic flowchart of a process depicting alternate implementations of the first directive receiving operation 502 of FIG. 5.

Turning now to FIG. 6C, in various implementations, operation 606 may include an operation 614 for receiving one or more carpooling preferences that permit transport, by the transportation vehicle unit, of the one or more other end users while the transportation vehicle unit is transporting the first end user, the one or more carpooling preferences defining a single rendezvous location for the transportation vehicle unit to rendezvous with all end users including the first end user to be transported by the transportation vehicle unit. For instance, the carpooling preference receiving module 302 of the transport computing device 10* of FIG. 2A or 2B receiving one or more carpooling preferences that permit transport, by the transportation vehicle unit 20, of the one or more other end users while the transportation vehicle unit 20 is transporting the first end user 12*a*, the one or more carpooling preferences defining a single rendezvous location for the transportation vehicle unit 20 to rendezvous with all end users including the first end user 12*a* to be transported by the transportation vehicle unit 20 during a single carpooling trip.

In the same or alternative implementations, operation 606 may alternatively or additionally include an operation 615 for receiving one or more carpooling preferences that permit transport, by the transportation vehicle unit, of the one or more other end users while the transportation vehicle unit is transporting the first end user, the one or more carpooling preferences defining a single destination location for dropping-off all end users including the first end user to be transported by the transportation vehicle unit. For instance, the carpooling preference receiving module 302 of the transport computing device 10* of FIG. 2A or 2B receiving one or more carpooling preferences that permit transport, by the transportation vehicle unit 20, of the one or more other end users while the transportation vehicle unit 20 is transporting the first end user 12*a*, the one or more carpooling preferences defining a single destination location for dropping-off all end users including the first end user 12*a* to be transported by the transportation vehicle unit 20 during a single carpooling trip.

In the same or alternative implementations, operation 606 may additionally or alternatively include an operation 616 for receiving one or more carpooling preferences that permit transport, by the transportation vehicle unit, of the one or more other end users while the transportation vehicle unit is transporting the first end user, the one or more carpooling preferences including a preference that all other end users to be transported by the transportation vehicle unit while the transportation vehicle unit is transporting the first end user share at least one specified common interest. For instance, the carpooling preference receiving module 302 of the transport computing device 10* of FIG. 2A or 2B receiving one or more carpooling preferences that permit transport, by the transportation vehicle unit 20, of the one or more other end users while the transportation vehicle unit 20 is transporting the first end user 12*a*, the one or more carpooling preferences including a preference that all other end users to be transported by the transportation vehicle unit 20 while the transportation vehicle unit 20 is transporting the first end user 12*a* share at least one specified common interest (e.g., all end users to be transported by the transportation vehicle unit 20 are fans of the New York Jets).

In the same or alternative implementations, operation 606 may additionally or alternatively include an operation 617 for receiving the one or more carpooling preferences via a user interface or via one or more wireless and/or wired networks. For instance, the carpooling preference receiving module 302 of the transport computing device 10* of FIG. 2A or 2B receiving the one or more carpooling preferences via a user interface 250 (e.g., a keypad or touchscreen) or via one or more wireless and/or wired networks 18 through a network interface 240. That is, in some cases, the carpooling preferences may be entered by a human driver, who may be provided with carpooling preferences from the first end user 12*a*. Alternatively, such carpooling preferences may be received wirelessly from a network device such as the realtime carpooling management system 16 or from a real-time carpooling coordinating system 15 of FIG. 1.

Figure 6D:
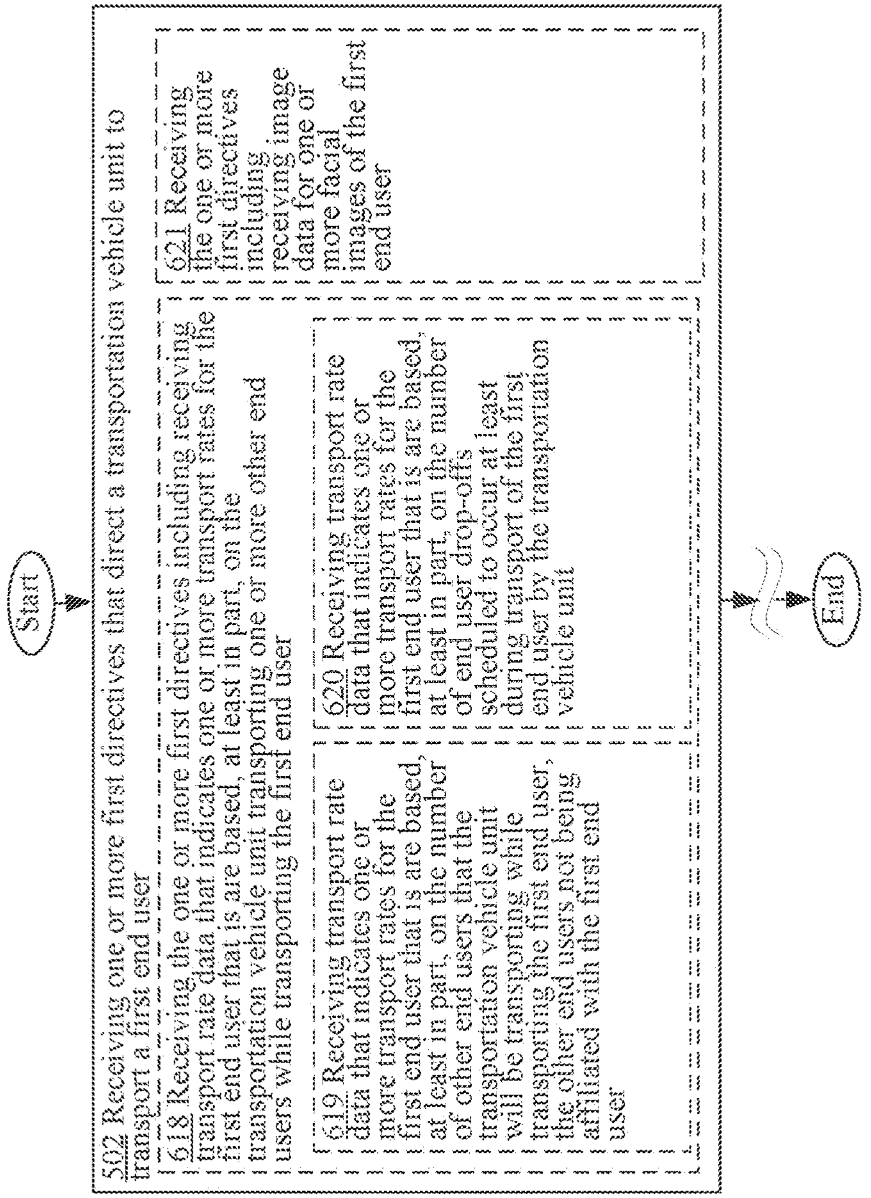
FIG. 6D is a high-level logic flowchart of a process depicting alternate implementations of the first directive receiving operation 502 of FIG. 5.

Referring now to FIG. 6D, in the same or alternative implementations, the first directive receiving operation 502 may additionally or alternatively include an operation 618 for receiving the one or more first directives including receiving transport rate data that indicates one or more transport rates for the first end user that are based, at least in part, on the transportation vehicle unit transporting one or more other end users while transporting the first end user. For instance, the carpooling preference receiving module 302 including the transport rate data receiving module 304 (see FIG. 3A) of the transport computing device 10* of FIG. 2A or 2B receiving the one or more first directives including receiving, by the transport rate data receiving module 304, transport rate data that indicates one or more transport rates for the first end user 12*a* that are based, at least in part, on the transportation vehicle unit 20 transporting one or more other end users (e.g., a second end user 12*b*) while transporting the first end user 12*a*. Note that in some cases, the one or more transport rates may be received separately from the one or more first directives.

In some implementations, operation 618 may further include an operation 619 for receiving transport rate data that indicates one or more transport rates for the first end user that are based, at least in part, on the number of other end users that the transportation vehicle unit will be transporting while transporting the first end user, the other end users not being affiliated with the first end user. For instance, the transport rate data receiving module 304 of the transport computing device 10* of FIG. 2A or 2B receiving transport rate data that indicates one or more transport rates for the first end user 12*a* that are based, at least in part, on the number of other end users that the transportation vehicle unit 20 will be transporting while transporting the first end user 12*a*, the other end users (e.g., a second end user 12*b*) not being affiliated with the first end user 12*a*.

In some cases, operation 618 may additionally or alternatively include an operation 620 for receiving transport rate data that indicates one or more transport rates for the first end user that are based, at least in part, on the number of end user drop-offs scheduled to occur at least during transport of the first end user by the transportation vehicle unit. For instance, the transport rate data receiving module 304 of the transport computing device 10* of FIG. 2A or 2B receiving transport rate data that indicates one or more transport rates for the first end user 12*a* that are based, at least in part, on the number of end user drop-offs scheduled to occur at least during transport of the first end user 12*a* by the transportation vehicle unit 20.

In some implementations, the first directive receiving operation 502 may include an operation 621 for receiving the one or more first directives including receiving image data for one or more facial images of the first end user. For instance, the directive receiving module 202* including the image data receiving module 306 (see FIG. 3A) of the transport computing device 10* of FIG. 2A or 2B receiving the one or more first directives including receiving, by the image data receiving module 306, image data for one or more facial images of the first end user 12*a*. By providing the facial image of the first end user 12*a*, a human driver may be able to quickly recognize the first end user 12*a* particularly in a crowded venue such as at a stadium exit after a football game.

Referring back to the second directive receiving operation 504 of FIG. 5, the second directive receiving operation 504 similar to the first directive receiving operation 502 of FIG. 5 may be executed in a number of different ways in various alternative embodiments as illustrated, for example, in FIGS. 7A, 7B, 7C, and 7D. In some cases, for example, the second directive receiving operation 504 may actually include an operation 722 for receiving the one or more second directives electronically via one or more wireless and/or wired networks. For instance, the directive receiving module 202* of the transport computing device 10* of FIG. 2A or 2B receiving the one or more second directives electronically using a network interface 240 via one or more wireless and/or wired networks 18.

In the same or alternative implementation, the second directive receiving operation 504 may include an operation 723 for receiving, while the transportation vehicle unit is en route to or is transporting the first end user, the one or more second directives by receiving the one or more second directives when the transportation vehicle unit is spatially moving towards a first end user rendezvous location in order to rendezvous with the first end user. For instance, the directive receiving module 202* of the transport computing device 10* of FIG. 2A or 2B receiving, while the transportation vehicle unit 20 is en route to rendezvousing with a first end user 12*a* or is transporting the first end user 12*a*, the one or more second directives by receiving the one or more second directives when the transportation vehicle unit 20 is spatially moving towards a first end user rendezvous location (e.g., first end user rendezvous location 402 of FIG. 4A) in order to rendezvous with the first end user 12*a*.

In some cases, operation 723 may actually involve an operation 724 for receiving the one or more second directives when the transportation vehicle unit is spatially moving towards the first end user rendezvous location and is within four miles from the first end user rendezvous location. For instance, the directive receiving module 202* of the transport computing device 10* of FIG. 2A or 2B receiving the one or more second directives when the transportation vehicle unit 20 is spatially moving towards the first end user rendezvous location and is within four miles from reaching the first end user rendezvous location for rendezvousing with the first end user 12*a*.

In some implementations, the second directive receiving module 504 may actually include an operation 725 for receiving, while the transportation vehicle unit is en route to or is transporting the first end user, the one or more second directives by receiving the one or more second directives when the transportation vehicle unit has already secured the first end user. For instance, the directive receiving module 202* of the transport computing device 10* of FIG. 2A or 2B receiving, while the transportation vehicle unit 20 is en route to rendezvousing with a first end user 12*a* or is transporting the first end user 12*a*, the one or more second directives by receiving the one or more second directives when the transportation vehicle unit 20 has already secured the first end user 12*a*.

In some implementations, the second directive receiving module 504 may include an operation 726 for receiving, while the transportation vehicle unit is en route to or is transporting the first end user, the one or more second directives by receiving the one or more second directives when the transportation vehicle unit is within 15 minutes or less from rendezvousing with the first end user. For instance, the directive receiving module 202* of the transport computing device 10* of FIG. 2A or 2B receiving, while the transportation vehicle unit 20 is en route to rendezvousing with a first end user 12*a* or is transporting the first end user 12*a*, the one or more second directives by receiving the one or more second directives when the transportation vehicle unit 20 is within 15 minutes or less from rendezvousing with the first end user 12*a*.

In some implementations, the second directive receiving operation 504 may include an operation 727 for receiving the one or more second directives by receiving one or more second directives that identify a second end user rendezvous location for rendezvousing with the second end user. For instance, the directive receiving module 202* of the transport computing device 10* of FIG. 2A or 2B receiving the one or more second directives by receiving one or more second directives that identify a second end user rendezvous location (e.g., GPS data indicating current location of the second end user 12*b*) for rendezvousing (by the transportation vehicle unit 20) with the second end user 12*b*.

Figure 7A:
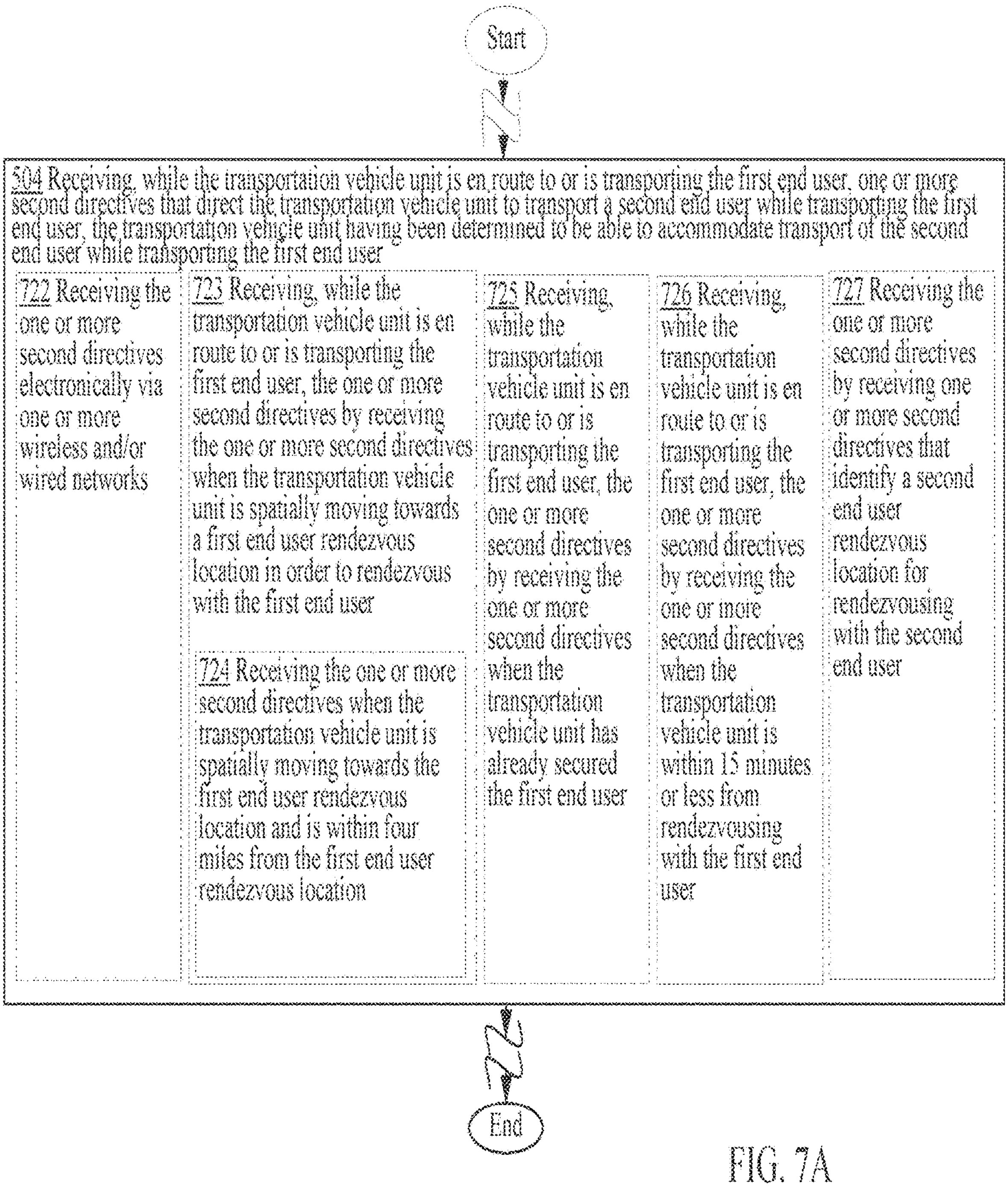
FIG. 7A is a high-level logic flowchart of a process depicting alternate implementations of the second directive receiving operation 504 of FIG. 5.
Figure 7B:
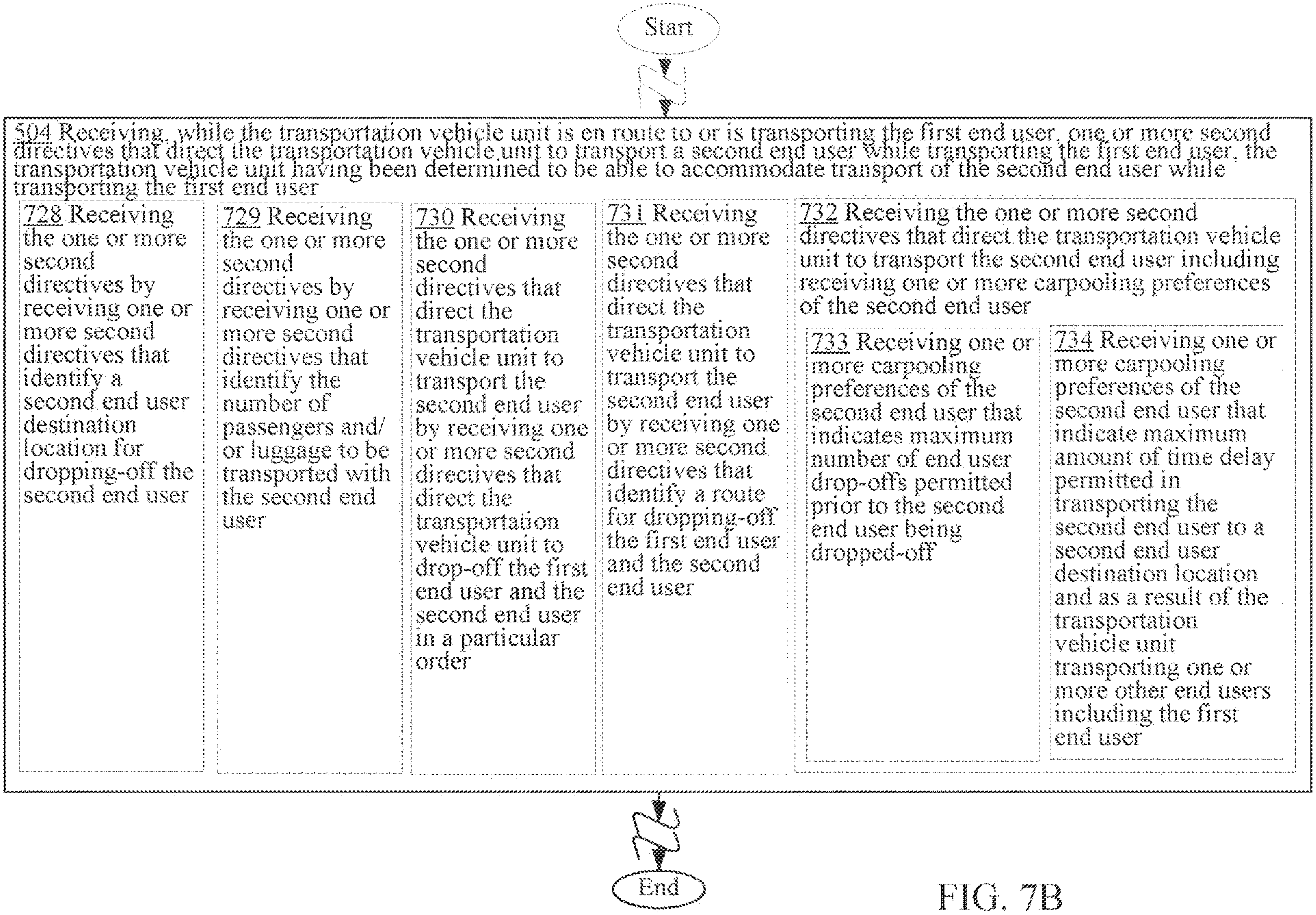
FIG. 7B is a high-level logic flowchart of a process depicting alternate implementations of the second directive receiving operation 504 of FIG. 5.

In some implementations, the second directive receiving operation 504 may include an operation 728 for receiving the one or more second directives by receiving one or more second directives that identify a second end user destination location for dropping-off the second end user as illustrated in FIG. 7B. For instance, the directive receiving module 202* of the transport computing device 10* of FIG. 2A or 2B receiving the one or more second directives by receiving one or more second directives that identify a second end user destination location for dropping-off (e.g., the act of offloading one or more passengers or end users) the second end user 12*b*.

In some implementations, the second directive receiving operation 504 may include an operation 729 for receiving the one or more second directives by receiving one or more second directives that identify the number of passengers and/or luggage to be transported with the second end user. For instance, the directive receiving module 202* of the transport computing device 10* of FIG. 2A or 2B receiving the one or more second directives by receiving one or more second directives that identify the number of passengers and/or luggage to be transported with the second end user 12*b*.

In some implementations, the second directive receiving operation 504 may include an operation 730 for receiving the one or more second directives that direct the transportation vehicle unit to transport the second end user by receiving one or more second directives that direct the transportation vehicle unit to drop-off the first end user and the second end user in a particular order. For instance, the directive receiving module 202* of the transport computing device 10* of FIG. 2A or 2B receiving the one or more second directives that direct the transportation vehicle unit 20 to transport the second end user 12*b* by receiving one or more second directives that direct (e.g., instruct) the transportation vehicle unit 20 to drop-off the first end user 12*a* and the second end user 12*b* in a particular order.

In some implementations, the second directive receiving operation 504 may include an operation 731 for receiving the one or more second directives that direct the transportation vehicle unit to transport the second end user by receiving one or more second directives that identify a route for dropping-off the first end user and the second end user. For instance, the directive receiving module 202* of the transport computing device 10* of FIG. 2A or 2B receiving the one or more second directives that direct the transportation vehicle unit 20 to transport the second end user 12*b* by receiving one or more second directives that identify a route (e.g., street-by-street/turn-by-turn route) for dropping-off the first end user 12*a* and the second end user 12*b*.

In various implementations, the second directive receiving operation 504 may include an operation 732 for receiving the one or more second directives that direct the transportation vehicle unit to transport the second end user including receiving one or more carpooling preferences of the second end user. For instance, the directive receiving module 202* including the carpooling preference receiving module 302 (see FIG. 3A) of the transport computing device 10* of FIG. 2A or 2B receiving the one or more second directives that direct the transportation vehicle unit 20 to transport the second end user 12*b* including receiving one or more carpooling preferences of the second end user 12*b*. In various implementations, the one or more carpooling preferences may be received separately from the one or more second directives. In some cases, the one or more carpooling preferences may be provided by the second end user 12*b*, while in other cases, the one or more carpooling preferences may be provided by a third party such as by a ridesharing company that is administrating the carpooling services.

In some implementations, operation 732 may further include an operation 733 for receiving one or more carpooling preferences of the second end user that indicates maximum number of end user drop-offs permitted prior to the second end user being dropped-off. For instance, the carpooling preference receiving module 302 of the transport computing device 10* of FIG. 2A or 2B receiving one or more carpooling preferences of the second end user 12*b* that indicates maximum number of end user drop-offs permitted prior to the second end user 12*b* being dropped-off.

As In the same or alternative implementations, operation 732 may additionally or alternatively include an operation 734 for receiving one or more carpooling preferences of the second end user that indicate maximum amount of time delay permitted in transporting the second end user to a second end user destination location and as a result of the transportation vehicle unit transporting one or more other end users including the first end user. For instance, the carpooling preference receiving module 302 of the transport computing device 10* of FIG. 2A or 2B receiving one or more carpooling preferences of the second end user 12*b* that indicate maximum amount of time delay permitted in transporting the second end user 12*b* to a second end user destination location and as a result of the transportation vehicle unit 20 transporting one or more other end users including the first end user 12*a*.

In the same or alternative implementations, the second directive receiving operation 504 may include an operation 735 for receiving the one or more second directives that direct the transportation vehicle unit to transport the second end user including receiving transport rate data that indicates a transport rate for transporting the second end user by the transportation vehicle unit. For instance, the directive receiving module 202* including the transport rate data receiving module 304 (see FIG. 3A) of the transport computing device 10* of FIG. 2A or 2B receiving the one or more second directives that direct the transportation vehicle unit 20 to transport the second end user 12*b* including receiving, by the transport rate data receiving module 304, transport rate data that indicates a transport rate (e.g., a fare or fee) for transporting the second end user 12*b* by the transportation vehicle unit 20.

Figure 7C:
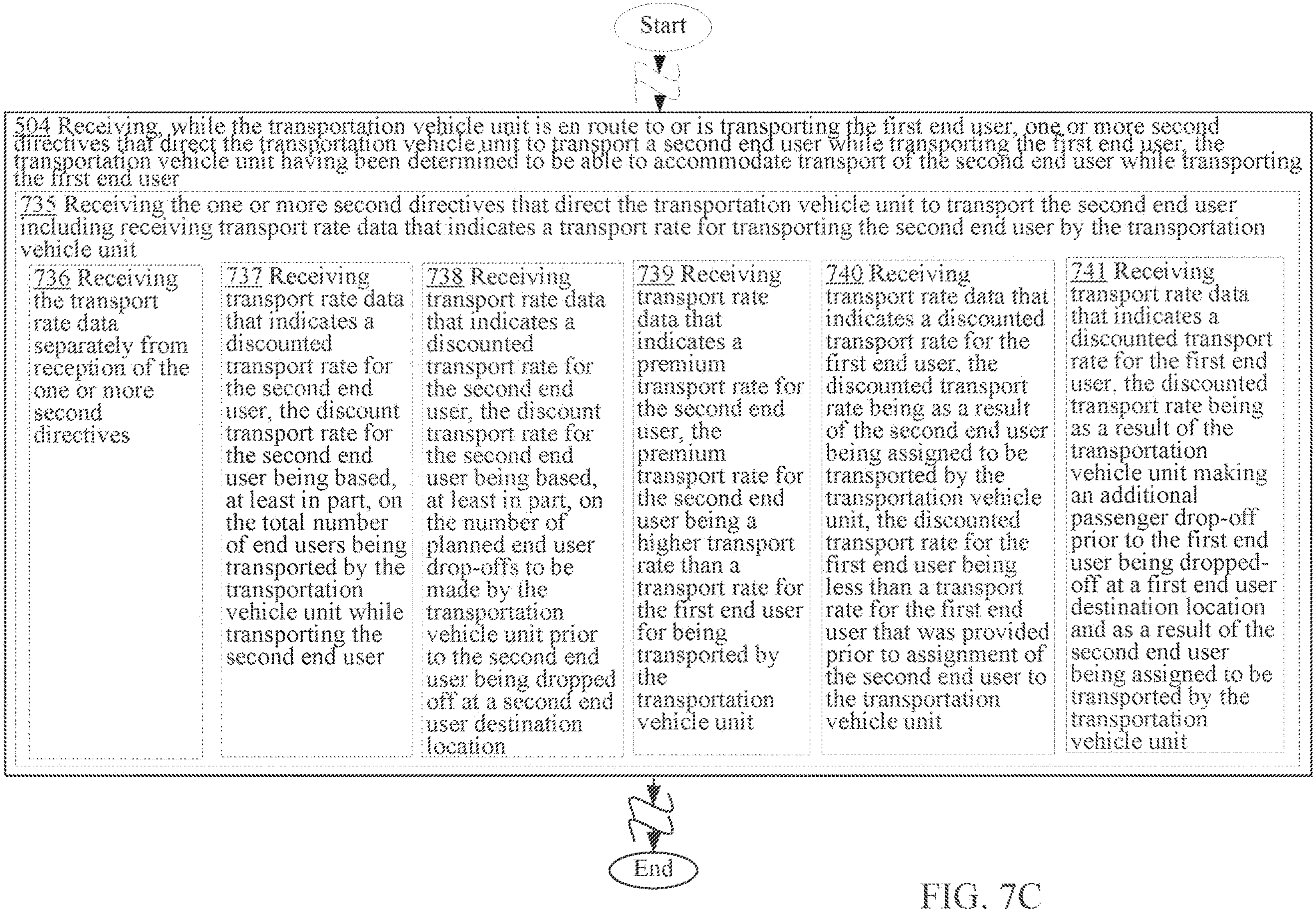
FIG. 7C is a high-level logic flowchart of a process depicting alternate implementations of the second directive receiving operation 504 of FIG. 5.

As further illustrated in FIG. 7C, in various implementations, operation 735 may actually include one or more additional operations including, in some cases, an operation 736 for receiving the transport rate data separately from reception of the one or more second directives. For instance, the transport rate data receiving module 304 of the transport computing device 10* of FIG. 2A or 2B receiving (e.g., receiving electronically) the transport rate data separately from reception of the one or more second directives.

In the same or alternative implementations, operation 735 may additionally or alternatively include an operation 737 for receiving transport rate data that indicates a discounted transport rate for the second end user, the discount transport rate for the second end user being based, at least in part, on the total number of end users being transported by the transportation vehicle unit while transporting the second end user. For instance, the transport rate data receiving module 304 of the transport computing device 10* of FIG. 2A or 2B receiving transport rate data that indicates a discounted transport rate for the second end user 12*b*, the discount transport rate for the second end user 12*b* being based, at least in part, on the total number of end users (including the first end user 12*a*) being transported by the transportation vehicle unit 20 while transporting the second end user 12*b*.

In some implementations, operation 735 may include an operation 738 for receiving transport rate data that indicates a discounted transport rate for the second end user, the discount transport rate for the second end user being based, at least in part, on the number of planned end user drop-offs to be made by the transportation vehicle unit prior to the second end user being dropped-off at a second end user destination location. For instance, the transport rate data receiving module 304 of the transport computing device 10* of FIG. 2A or 2B receiving transport rate data that indicates a discounted transport rate for the second end user 12*b*, the discount transport rate for the second end user 12*b* being based, at least in part, on the number of planned end user drop-offs to be made by the transportation vehicle unit 20 prior to the second end user 12*b* being dropped-off at a second end user destination location.

In some implementations, operation 735 may include an operation 739 for receiving transport rate data that indicates a premium transport rate for the second end user, the premium transport rate for the second end user being a higher transport rate than a transport rate for the first end user for being transported by the transportation vehicle unit. For instance, the transport rate data receiving module 304 of the transport computing device 10* of FIG. 2A or 2B receiving transport rate data that indicates a premium transport rate for the second end user 12*b*, the premium transport rate for the second end user 12*b* being a higher transport rate than a transport rate for the first end user 12*a* for being transported by the transportation vehicle unit 20. For example, if the first end user 12*a* is being charged 12 dollars then the second end user 12*b* may be charged in the amount greater than 12 dollars such as 16 dollars. This may be done in some cases to provide an incentive for the first end user 12*a* to permit other end users (e.g., the second end user 12*b*) to join the first end user 12*a* in being transported by the transportation vehicle unit 20. That is, by making the second end user 12*b* pay a larger portion of the total fare (and having the first end user 12*a* pay a smaller share of the total fare), the first end user 12*a* may be provided an incentive to accept other end users.

In some implementations, operation 735 may include an operation 740 for receiving transport rate data that indicates a discounted transport rate for the first end user, the discounted transport rate being as a result of the second end user being assigned to be transported by the transportation vehicle unit, the discounted transport rate for the first end user being less than a transport rate for the first end user that was provided prior to assignment of the second end user to the transportation vehicle unit. For instance, the transport rate data receiving module 304 of the transport computing device 10* of FIG. 2A or 2B receiving transport rate data that indicates a discounted transport rate for the first end user 12*a*, the discounted transport rate being as a result of or based on the second end user 12*b* being assigned to be transported by the transportation vehicle unit 20, the discounted transport rate for the first end user 12*a* being less than a transport rate for the first end user 12*a* that was provided prior to assignment of the second end user 12*b* to the transportation vehicle unit 20.

In some implementations, operation 735 may include an operation 741 for receiving transport rate data that indicates a discounted transport rate for the first end user, the discounted transport rate being as a result of the transportation vehicle unit making an additional passenger drop-off prior to the first end user being dropped-off at a first end user destination location and as a result of the second end user being assigned to be transported by the transportation vehicle unit. For instance, the transport rate data receiving module 304 of the transport computing device 10* of FIG. 2A or 2B receiving transport rate data that indicates a discounted transport rate for the first end user 12*a*, the discounted transport rate being as a result of the transportation vehicle unit 20 making an additional passenger drop-off prior to the first end user 12*a* being dropped-off at a first end user destination location and as a result of the second end user 12*b* being assigned to be transported by the transportation vehicle unit 20.

Figure 7D:
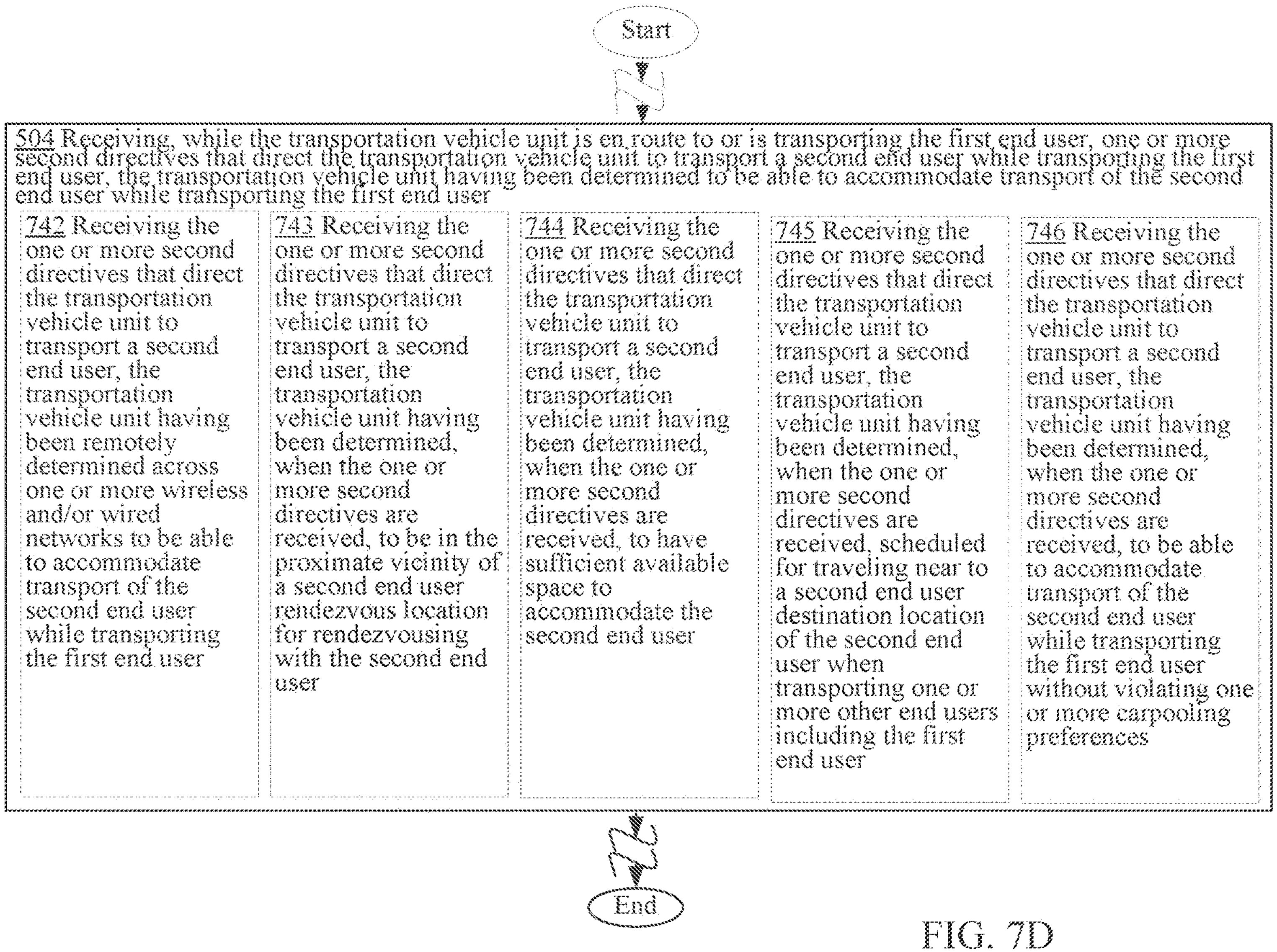
FIG. 7D is a high-level logic flowchart of a process depicting alternate implementations of the second directive receiving operation 504 of FIG. 5.

In various implementations, the second directive receiving operation 504 may include an operation 742 for receiving the one or more second directives that direct the transportation vehicle unit to transport a second end user, the transportation vehicle unit having been remotely determined across one or more wireless and/or wired networks to be able to accommodate transport of the second end user while transporting the first end user as illustrated in FIG. 7D. For instance, the directive receiving module 202* of the transport computing device 10* of FIG. 2A or 2B receiving the one or more second directives that direct the transportation vehicle unit 20 to transport a second end user 12*b*, the transportation vehicle unit 20 having been remotely determined (e.g., determined by the real-time carpooling management system 16 of FIG. 1) across one or more wireless and/or wired networks 18 to be able to accommodate (e.g., having sufficient cabin space and/or is located in the proximate vicinity of the second end user 12*b*) transport of the second end user 12*b* while transporting the first end user 12*a*.

In the same or alternative implementations, the second directive receiving operation 504 may include an operation 743 for receiving the one or more second directives that direct the transportation vehicle unit to transport a second end user, the transportation vehicle unit having been determined, when the one or more second directives are received, to be in the proximate vicinity of a second end user rendezvous location for rendezvousing with the second end user. For instance, the directive receiving module 202* of the transport computing device 10* of FIG. 2A or 2B receiving the one or more second directives that direct the transportation vehicle unit 20 to transport a second end user 12*b*, the transportation vehicle unit 20 having been determined (e.g., by the real-time carpooling management system 16), when the one or more second directives are received by the transport computing device 10*, to be in the proximate vicinity (e.g., within 5 miles) of a second end user rendezvous location (e.g., current location of the second end user 12*b*) for rendezvousing with the second end user 12*b*. Note that in various embodiments the phrase "when the one or more second directives are received by the transport computing device 10*," as used herein, may be in reference to a time span that includes at least when the one or more second directives are transmitted by the real-time carpooling management system 16 to when the transport computing device 10* receives the one or more second directives.

In the same or alternative implementations, the second directive receiving operation 504 may include an operation 744 for receiving the one or more second directives that direct the transportation vehicle unit to transport a second end user, the transportation vehicle unit having been determined, when the one or more second directives are received, to have sufficient available space to accommodate the second end user. For instance, the directive receiving module 202* of the transport computing device 10* of FIG. 2A or 2B receiving the one or more second directives that direct the transportation vehicle unit 20 to transport a second end user 12*b*, the transportation vehicle unit 20 having been determined (e.g., by the real-time carpooling management system 16), when the one or more second directives are received by the transport computing device 10*, to have sufficient available space to accommodate the second end user 12*b*.

In the same or alternative implementations, the second directive receiving operation 504 may include an operation 745 for receiving the one or more second directives that direct the transportation vehicle unit to transport a second end user, the transportation vehicle unit having been determined, when the one or more second directives are received, scheduled for traveling near to a second end user destination location of the second end user when transporting one or more other end users including the first end user. For instance, the directive receiving module 202* of the transport computing device 10* of FIG. 2A or 2B receiving the one or more second directives that direct the transportation vehicle unit 20 to transport a second end user 12*b*, the transportation vehicle unit 20 having been determined (e.g., by the real-time carpooling management system 16), when the one or more second directives are received by the transport computing device 10*, scheduled for traveling near to (e.g., within 3 miles) a second end user destination location of the second end user 12*b* when transporting one or more other end users including the first end user 12*a*.

In the same or alternative implementations, the second directive receiving operation 504 may include an operation 746 for receiving the one or more second directives that direct the transportation vehicle unit to transport a second end user, the transportation vehicle unit having been determined, when the one or more second directives are received, to be able to accommodate transport of the second end user while transporting the first end user without violating one or more carpooling preferences. For instance, the directive receiving module 202* of the transport computing device 10* of FIG. 2A or 2B receiving the one or more second directives that direct the transportation vehicle unit to transport a second end user 12*b*, the transportation vehicle unit 20 having been determined (e.g., by the real-time carpooling management system 16), when the one or more second directives are received, to be able to accommodate transport of the second end user 12*b* while transporting the first end user 12*a* without violating one or more carpooling preferences (e.g., carpooling preferences of the first end user 12*a*, the second end user 12*b*, and/or a third party-preferences related to permitted number of end user drop-offs, permitted delays in transporting each of the end users, etc.).

Referring back to the non-conflict verifying operation 506 of FIG. 5, the non-conflict verifying operation 506, similar to the first directive receiving operation 502 and the second directive receiving operation 504 of FIG. 5, may be executed in a number of different ways in various alternative embodiments as illustrated, for example, in FIGS. 8A, 8B, 8C, 8D, 8E, 8F, and 8G. In some cases, for example, the non-conflict verifying operation 506 may actually include an operation 847 for verifying that compliance with the one or more second directives will not conflict with one or more obligations to transport the first end user by the transportation vehicle unit, the one or more obligations being based, at least in part, on the received one or more first directives. For instance, the non-conflict confirming module 204* of the transport computing device 10* of FIG. 2A or 2B verifying or confirming that compliance with the one or more second directives will not conflict with (e.g., will not violate) one or more obligations to transport the first end user 12*a* by the transportation vehicle unit 20, the one or more obligations being based, at least in part, on the received one or more first directives.

In the same or alternative implementations, the non-conflict verifying operation 506 may include an operation 848 for verifying that compliance with the one or more second directives will not conflict with one or more obligations to transport the first end user by the transportation vehicle unit, the one or more obligations defining one or more conditional directives that permit the transportation vehicle unit to transport one or more other end users while the transportation vehicle unit is transporting the first end user only if one or more specified conditions can be or have already been realized as illustrated in FIGS. 8A, 8B, 8C, and 8D. For instance, the non-conflict confirming module 204* of the transport computing device 10* of FIG. 2A or 2B verifying (e.g., confirming) verifying that compliance with the one or more second directives will not conflict with one or more obligations to transport the first end user 12*a* by the transportation vehicle unit 20, the one or more obligations defining one or more conditional directives that permit the transportation vehicle unit 20 to transport one or more other end users (who are not affiliated with the first end user 12*a*), such as the second end user 12*b*, while the transportation vehicle unit 20 is transporting the first end user 12*a* only if one or more specified conditions can be or have already been realized (e.g., the one or more specified conditions can be met by transporting the one or more other end users and while transporting the first end user 12*a* or the one or more specified conditions have already been met). In some cases, the logic of the transport computing device 10* may, upon determining that the one or more specified have been or can be met, permit the transport of a second end user 12*b* by the transportation vehicle unit 20 by simply presenting (e.g., presenting to a human driver or a robotic driver) the one or more second directives.

Figure 8A:
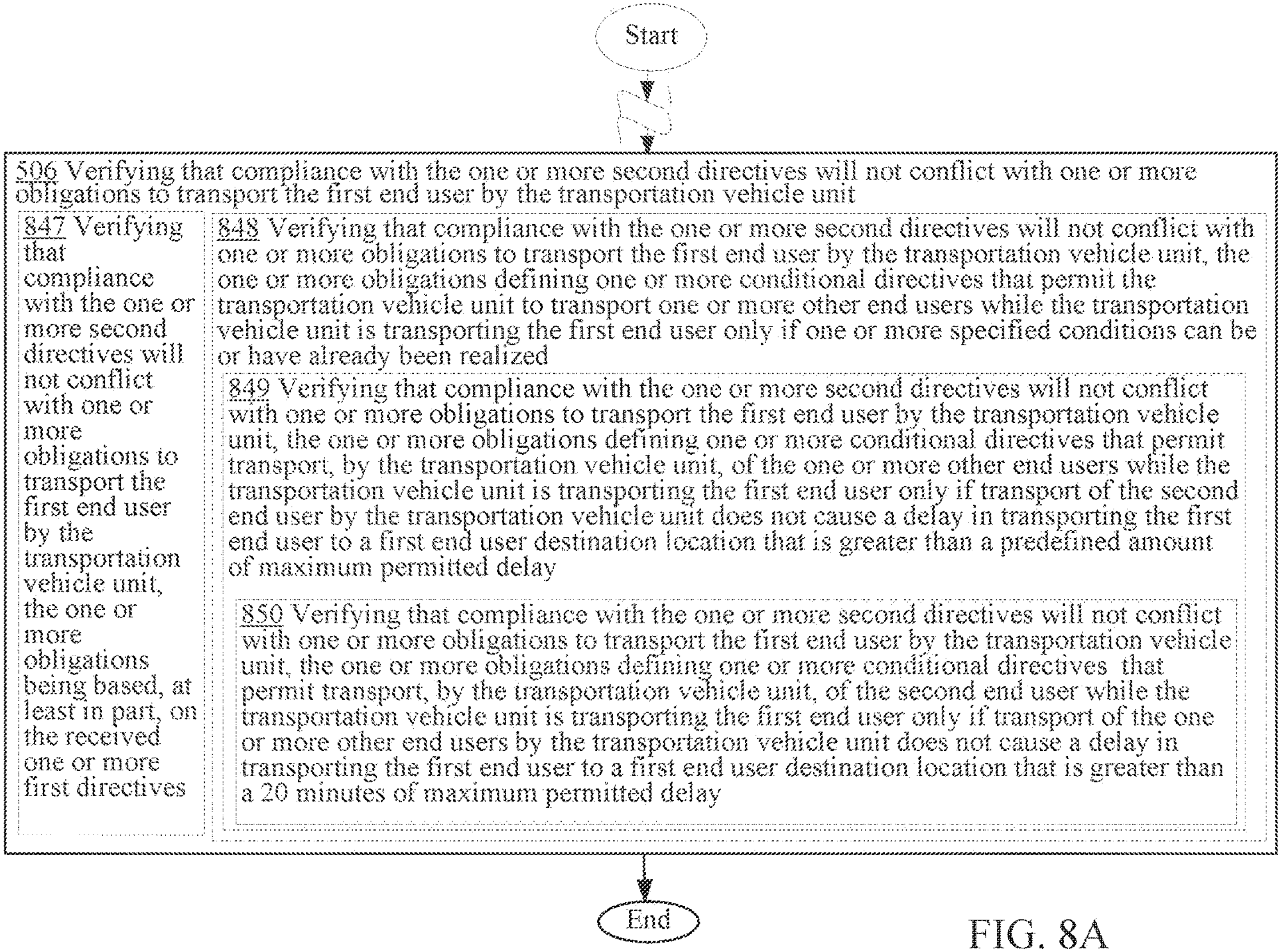
FIG. 8A is a high-level logic flowchart of a process depicting alternate implementations of the non-conflict verifying operation 506 of FIG. 5.

As further illustrated in FIGS. 8A, 8B, 8C, and 8D, in various alternative implementations, operation 848 may include one or more additional operations including, in some cases, an operation 849 for verifying that compliance with the one or more second directives will not conflict with one or more obligations to transport the first end user by the transportation vehicle unit, the one or more obligations defining one or more conditional directives that permit transport, by the transportation vehicle unit, of the second end user while the transportation vehicle unit is transporting the first end user only if transport of the one or more other end users by the transportation vehicle unit does not cause a delay in transporting the first end user to a first end user destination location that is greater than a predefined amount of maximum permitted delay as illustrated in FIG. 8A. For instance, the non-conflict confirming module 204* of the transport computing device 10* of FIG. 2A or 2B verifying (e.g., confirming) that compliance with the one or more second directives will not conflict with one or more obligations to transport the first end user 12*a* by the transportation vehicle unit 20, the one or more obligations defining one or more conditional directives that permit transport, by the transportation vehicle unit 20, of the one or more other end users while the transportation vehicle unit 20 is transporting the first end user 12*a* only if transport of the second end user (e.g., the second end user 12*b*) by the transportation vehicle unit 20 does not cause a delay in transporting the first end user 12*a* to a first end user destination location that is greater than a predefined amount of maximum permitted delay (e.g., 15 minutes of maximum delay).

In some implementations, operation 849 may further include an operation 850 for verifying that compliance with the one or more second directives will not conflict with one or more obligations to transport the first end user by the transportation vehicle unit, the one or more obligations defining one or more conditional directives that permit transport, by the transportation vehicle unit, of the second end user while the transportation vehicle unit is transporting the first end user only if transport of the one or more other end users by the transportation vehicle unit does not cause a delay in transporting the first end user to a first end user destination location that is greater than a 20 minutes of maximum permitted delay. For instance, the non-conflict confirming module 204* of the transport computing device 10* of FIG. 2A or 2B verifying (e.g., confirming) that compliance with the one or more second directives will not conflict with one or more obligations to transport the first end user 12*a* by the transportation vehicle unit 20, the one or more obligations defining one or more conditional directives that permit transport, by the transportation vehicle unit 20, of the second end user 12*b* while the transportation vehicle unit 20 is transporting the first end user 12*a* only if transport of the one or more other end users (e.g., second end user 12*b*) by the transportation vehicle unit 20 does not cause a delay in transporting the first end user 12*a* to a first end user destination location that is greater than a 20 minutes of maximum permitted delay.

Figure 8B:
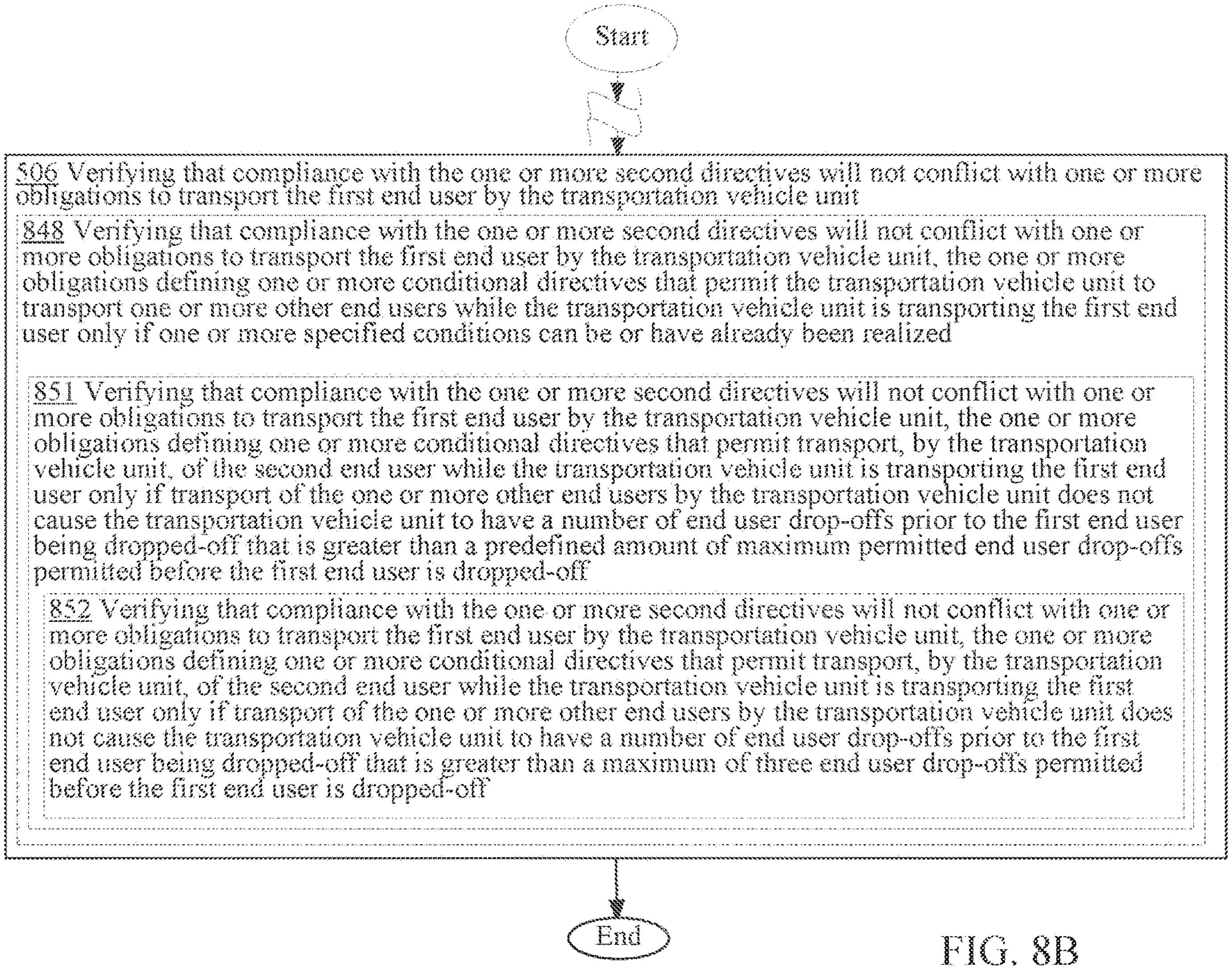
FIG. 8B is a high-level logic flowchart of a process depicting alternate implementations of the non-conflict verifying operation 506 of FIG. 5.

In the same or alternative implementations, operation 848 may include an operation 851 for verifying that compliance with the one or more second directives will not conflict with one or more obligations to transport the first end user by the transportation vehicle unit, the one or more obligations defining one or more conditional directives that permit transport, by the transportation vehicle unit, of the second end user while the transportation vehicle unit is transporting the first end user only if transport of the one or more other end users by the transportation vehicle unit does not cause the transportation vehicle unit to have a number of end user drop-offs prior to the first end user being dropped-off that is greater than a predefined amount of maximum permitted end user drop-offs permitted before the first end user is dropped-off as illustrated in FIG. 8B. For instance, the non-conflict confirming module 204* of the transport computing device 10* of FIG. 2A or 2B verifying or confirming that compliance with the one or more second directives will not conflict with one or more obligations to transport the first end user 12*a* by the transportation vehicle unit 20, the one or more obligations defining one or more conditional directives that permit transport, by the transportation vehicle unit 20, of the second end user 12*b* while the transportation vehicle unit 20 is transporting the first end user 12*a* only if transport of the one or more other end users (e.g., the second end user 12*b*) by the transportation vehicle unit 20 does not cause the transportation vehicle unit 20 to have a number of end user drop-offs prior to the first end user 12*a* being dropped-off that is greater than a predefined amount of maximum permitted end user drop-offs (e.g., four drop-offs or passenger offloading stops) permitted before the first end user 12*a* is dropped-off.

In some cases, operation 851 may further include an operation 852 for verifying that compliance with the one or more second directives will not conflict with one or more obligations to transport the first end user by the transportation vehicle unit, the one or more obligations defining one or more conditional directives that permit transport, by the transportation vehicle unit, of the one or more other end users while the transportation vehicle unit is transporting the first end user only if transport of the one or more other end users by the transportation vehicle unit does not cause the transportation vehicle unit to have a number of end user drop-offs prior to the first end user being dropped-off that is greater than a maximum of three end user drop-offs permitted before the first end user is dropped-off. For instance, the non-conflict confirming module 204* of the transport computing device 10* of FIG. 2A or 2B verifying (e.g., confirming) that compliance with the one or more second directives will not conflict with one or more obligations to transport the first end user 12*a* by the transportation vehicle unit 20, the one or more obligations defining one or more conditional directives that permit transport, by the transportation vehicle unit 20, of the second end user 12*b* while the transportation vehicle unit 20 is transporting the first end user 12*a* only if transport of the one or more other end users (e.g., second end user 12*b*) by the transportation vehicle unit 20 does not cause the transportation vehicle unit 20 to have a number of end user drop-offs prior to the first end user 12*a* being dropped-off that is greater than a maximum of three end user drop-offs (e.g., passenger offloading stops) permitted before the first end user 12*a* is dropped-off.

Figure 8C:
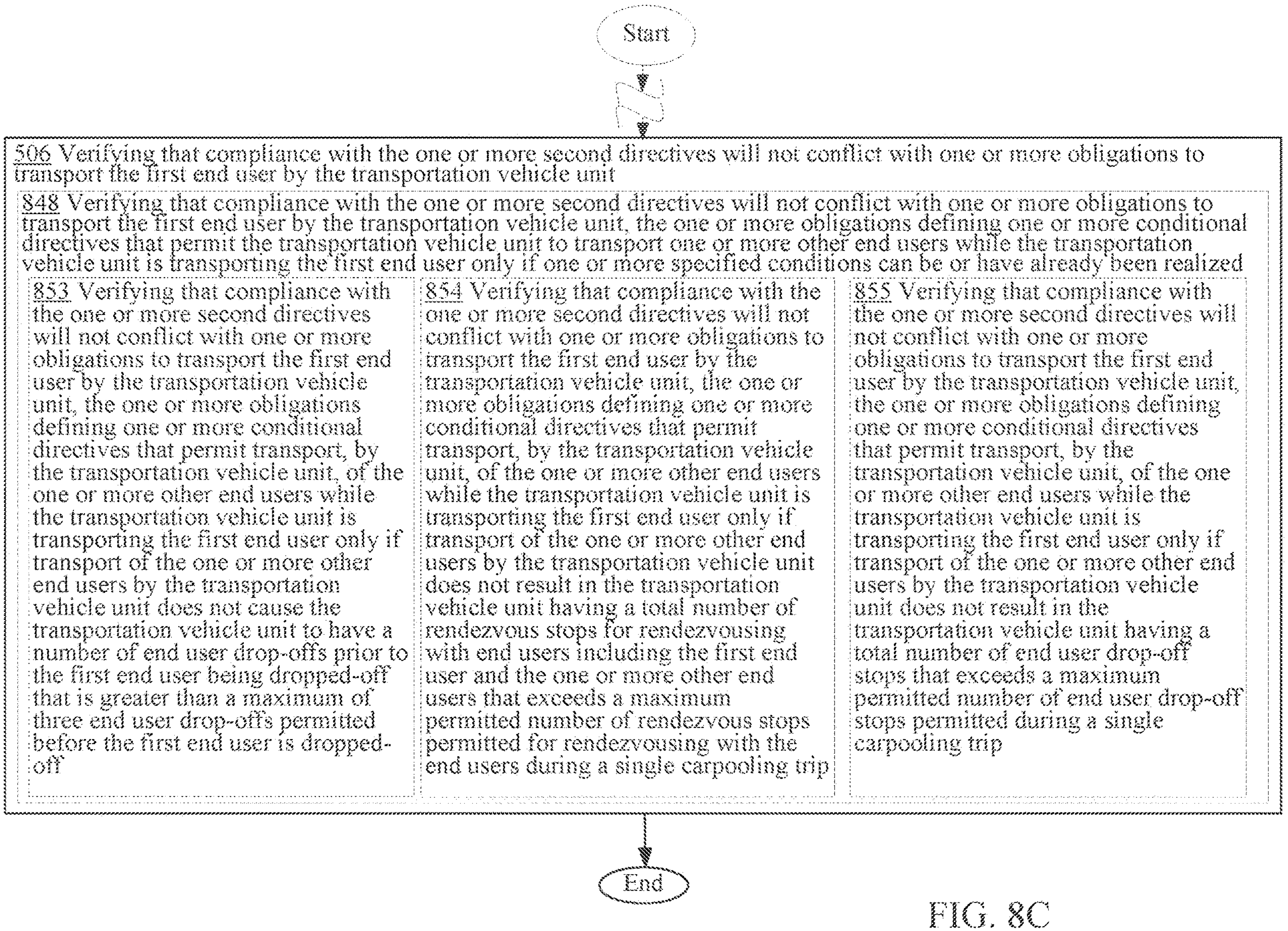
FIG. 8C is a high-level logic flowchart of a process depicting alternate implementations of the non-conflict verifying operation 506 of FIG. 5.

In the same or alternative implementations, operation 848 may include an operation 853 for verifying that compliance with the one or more second directives will not conflict with one or more obligations to transport the first end user by the transportation vehicle unit, the one or more obligations defining one or more conditional directives that permit transport, by the transportation vehicle unit, of the one or more other end users while the transportation vehicle unit is transporting the first end user only if transport of the one or more other end users by the transportation vehicle unit does not cause any end user drop-off to occur prior to drop of the first end user being dropped-off that is greater than a maximum of three end user drop-offs permitted before the first end user is dropped-off as illustrated in FIG. 8C. For instance, the non-conflict confirming module 204* of the transport computing device 10* of FIG. 2A or 2B verifying (e.g., confirming) that compliance with the one or more second directives will not conflict with one or more obligations to transport the first end user 12*a* by the transportation vehicle unit 20, the one or more obligations defining one or more conditional directives that permit transport, by the transportation vehicle unit 20, of the one or more other end users (e.g., the second end user 12*b*) while the transportation vehicle unit 20 is transporting the first end user 12*a* only if transport of the one or more other end users (e.g., the second end user 12*b*) by the transportation vehicle unit 20 does not cause the transportation vehicle unit to have a number of end user drop-offs prior first end user 12*a* being dropped-off that is greater than a maximum of three end user drop-offs permitted before the first end user 12*a* is dropped-off.

In the same or alternative implementations, operation 848 may include an operation 854 for verifying that compliance with the one or more second directives will not conflict with one or more obligations to transport the first end user by the transportation vehicle unit, the one or more obligations defining one or more conditional directives that permit transport, by the transportation vehicle unit, of the one or more other end users while the transportation vehicle unit is transporting the first end user only if transport of the one or more other end users by the transportation vehicle unit does not result in the transportation vehicle unit having a total number of rendezvous stops for rendezvousing with end users including the first end user and the one or more other end users that exceed a maximum permitted number of rendezvous stops permitted for rendezvousing with the end users during a single carpooling trip. For instance, the non-conflict confirming module 204* of the transport computing device 10* of FIG. 2A or 2B verifying (e.g., confirming) that compliance with the one or more second directives will not conflict with one or more obligations to transport the first end user 12*a* by the transportation vehicle unit 20, the one or more obligations defining one or more conditional directives that permit transport, by the transportation vehicle unit 20, of the one or more other end users (e.g., the second end user 12*b*) while the transportation vehicle unit 20 is transporting the first end user 12*a* only if transport of the one or more other end users (e.g., the second end user 12*b*) by the transportation vehicle unit 20 does not result in the transportation vehicle unit 20 having a total number of rendezvous stops for rendezvousing with end users including the first end user 12*a* and the one or more other end users that exceed a maximum permitted number of rendezvous stops permitted for rendezvousing with end users during a single carpooling trip.

In the same or alternative implementations, operation 848 may include an operation 855 for verifying that compliance with the one or more second directives will not conflict with one or more obligations to transport the first end user by the transportation vehicle unit, the one or more obligations defining one or more conditional directives that permit transport, by the transportation vehicle unit, of the one or more other end users while the transportation vehicle unit is transporting the first end user only if transport of the one or more other end users by the transportation vehicle unit does not result in the transportation vehicle unit having a total number of end user drop-off stops that exceeds a maximum permitted number of end user drop-off stops permitted during a single carpooling trip. For instance, the non-conflict confirming module 204* of the transport computing device 10* of FIG. 2A or 2B verifying (e.g., confirming) that compliance with the one or more second directives will not conflict with one or more obligations to transport the first end user 12*a* by the transportation vehicle unit 20, the one or more obligations defining one or more conditional directives that permit transport, by the transportation vehicle unit 20, of the one or more other end users (e.g., the second end user 12*b*) while the transportation vehicle unit 20 is transporting the first end user 12*a* only if transport of the one or more other end users (e.g., the second end user 12*b*) by the transportation vehicle unit 20 does not result in the transportation vehicle unit 20 having a total number of end user drop-off stops that exceeds a maximum permitted number of end user drop-off stops permitted during a single carpooling trip.

Figure 8D:
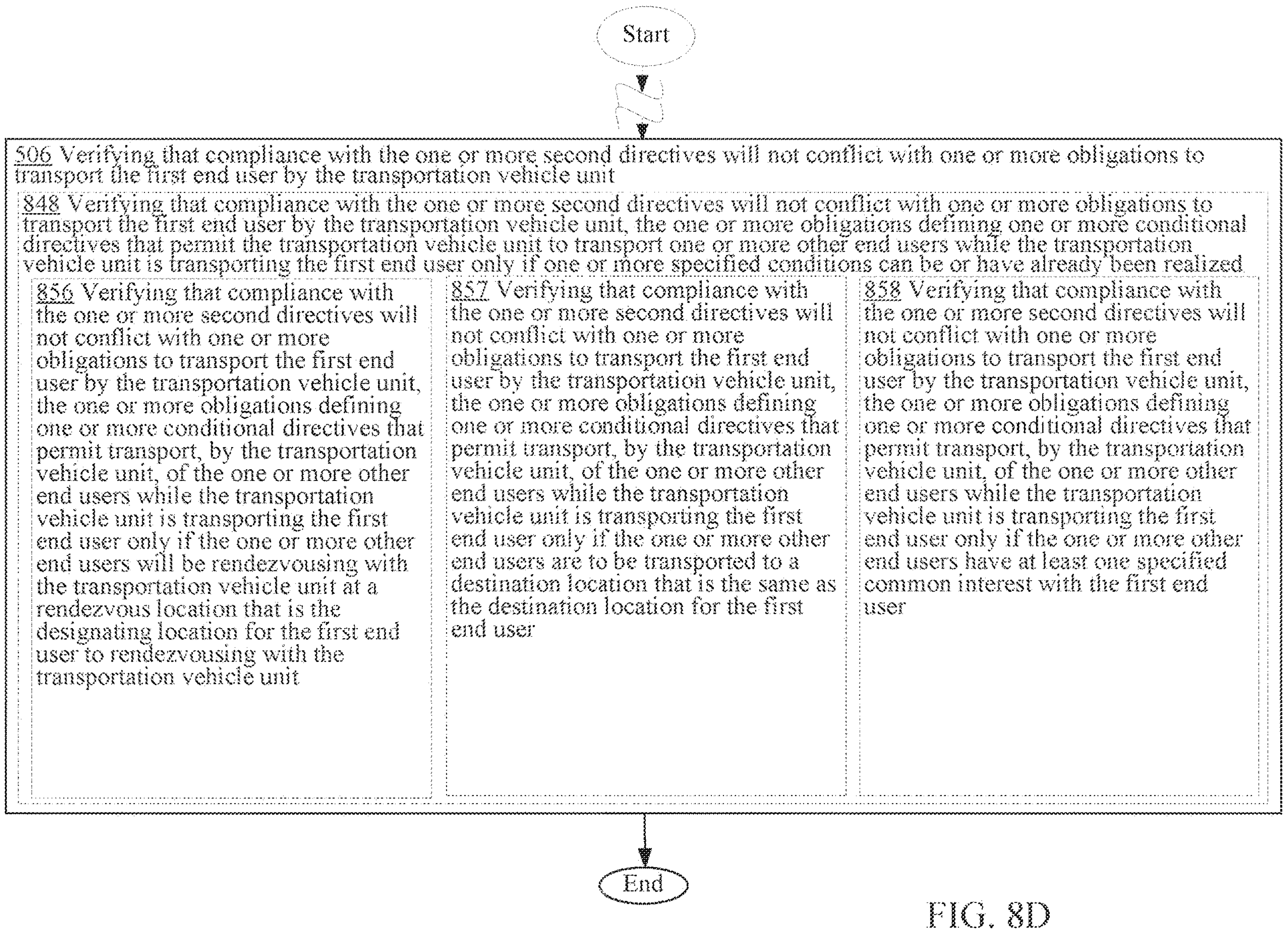
FIG. 8D is a high-level logic flowchart of a process depicting alternate implementations of the non-conflict verifying operation 506 of FIG. 5.

In the same or alternative implementations, operation 848 may include an operation 856 for verifying that compliance with the one or more second directives will not conflict with one or more obligations to transport the first end user by the transportation vehicle unit, the one or more obligations defining one or more conditional directives that permit transport, by the transportation vehicle unit, of the one or more other end users while the transportation vehicle unit is transporting the first end user only if the one or more other end users will be rendezvousing with the transportation vehicle unit at a rendezvous location that is the designating location for the first end user to rendezvousing with the transportation vehicle unit as illustrated in FIG. 8D. For instance, the non-conflict confirming module 204* of the transport computing device 10* of FIG. 2A or 2B verifying (e.g., confirming) that compliance with the one or more second directives will not conflict with one or more obligations to transport the first end user 12*a* by the transportation vehicle unit 20, the one or more obligations defining one or more conditional directives that permit transport, by the transportation vehicle unit 20, of the one or more other end users (e.g., the second end user 12*b*) while the transportation vehicle unit 20 is transporting the first end user 12*a* only if the one or more other end users (e.g., the second end user 12*b*) will be rendezvousing with the transportation vehicle unit 20 at a rendezvous location that is the designating location for the first end user 12*a* to rendezvousing with the transportation vehicle unit 20.

In the same or alternative implementations, operation 848 may include an operation 857 for verifying that compliance with the one or more second directives will not conflict with one or more obligations to transport the first end user by the transportation vehicle unit, the one or more obligations defining one or more conditional directives that permit transport, by the transportation vehicle unit, of the one or more other end users while the transportation vehicle unit is transporting the first end user only if the one or more other end users are to be transported to a destination location that is the same as the destination location for the first end user. For instance, the non-conflict confirming module 204* of the transport computing device 10* of FIG. 2A or 2B verifying (e.g., confirming) that compliance with the one or more second directives will not conflict with one or more obligations to transport the first end user 12*a* by the transportation vehicle unit 20, the one or more obligations defining one or more conditional directives that permit transport, by the transportation vehicle unit 20, of the one or more other end users (e.g., the second end user 12*b*) while the transportation vehicle unit 20 is transporting the first end user 12*a* only if the one or more other end users (e.g., the second end user 12*b*) are to be transported to a destination location that is the same as the destination location for the first end user 12*a*.

In the same or alternative implementations, operation 848 may include an operation 858 for verifying that compliance with the one or more second directives will not conflict with one or more obligations to transport the first end user by the transportation vehicle unit, the one or more obligations defining one or more conditional directives that permit transport, by the transportation vehicle unit, of the one or more other end users while the transportation vehicle unit is transporting the first end user only if the one or more other end users have at least one specified common interest with the first end user. For instance, the non-conflict confirming module 204* of the transport computing device 10* of FIG. 2A or 2B verifying (e.g., confirming) that compliance with the one or more second directives will not conflict with one or more obligations to transport the first end user 12*a* by the transportation vehicle unit 20, the one or more obligations defining one or more conditional directives that permit transport, by the transportation vehicle unit 20, of the one or more other end users (e.g., the second end user 12*b*) while the transportation vehicle unit 20 is transporting the first end user 12*a* only if the one or more other end users (e.g., the second end user 12*b*) have at least one specified common interest (e.g., New York Yankees) with the first end user 12*a*.

Figure 8E:
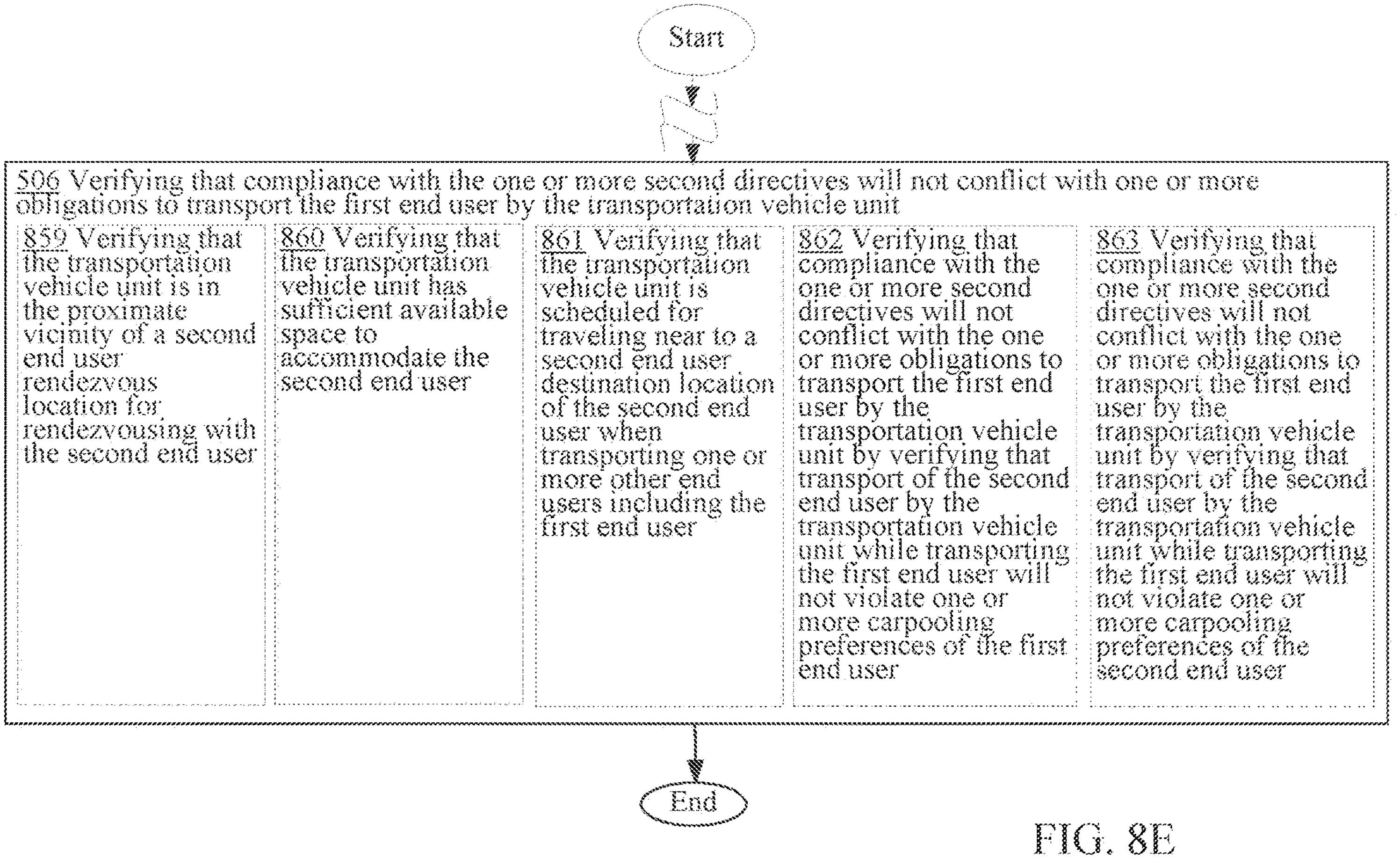
FIG. 8E is a high-level logic flowchart of a process depicting alternate implementations of the non-conflict verifying operation 506 of FIG. 5.

Referring now to FIG. 8E, in various implementations, the non-conflict verifying operation 506 may include an operation 859 for verifying that the transportation vehicle unit is in the proximate vicinity of a second end user rendezvous location for rendezvousing with the second end user. For instance, the rendezvous location proximity confirming module 308 (see FIG. 3B) of the transport computing device 10* of FIG. 2A or 2B verifying (e.g., confirming) that the transportation vehicle unit 20 is in the proximate vicinity (e.g., within 5 miles) of a second end user rendezvous location for rendezvousing with the second end user 12*b*.

In the same or alternative implementations, the non-conflict verifying operation 506 may include an operation 860 for verifying that the transportation vehicle unit has sufficient available space to accommodate the second end user. For instance, the spatial availability confirming module 310 (see FIG. 3B) of the transport computing device 10* of FIG. 2A or 2B verifying (e.g., confirming) that the transportation vehicle unit 20 has sufficient available passenger space (as well as luggage space) to accommodate the second end user 12*b*.

In the same or alternative implementations, the non-conflict verifying operation 506 may include an operation 861 for verifying that the transportation vehicle unit is scheduled for traveling near to a second end user destination location of the second end user when transporting one or more other end users including the first end user. For instance, the spatial availability confirming module 310 (see FIG. 3B) of the transport computing device 10* of FIG. 2A or 2B verifying (e.g., confirming) that the transportation vehicle unit 20 is scheduled for traveling near to (e.g., in the vicinity—within 3 miles) a second end user destination location of the second end user 12*b* when transporting one or more other end users including the first end user 12*a*.

In the same or alternative implementations, the non-conflict verifying operation 506 may include an operation 862 for verifying that compliance with the one or more second directives will not conflict with the one or more obligations to transport the first end user by the transportation vehicle unit by verifying that transport of the second end user by the transportation vehicle unit while transporting the first end user will not violate one or more carpooling preferences of the first end user. For instance, the non-conflict confirming module 204* including the carpooling preference non-conflict confirming module 314 (see FIG. 3B) of the transport computing device 10* of FIG. 2A or 2B verifying (e.g., confirming) that compliance with the one or more second directives will not conflict with the one or more obligations to transport the first end user 12*a* by the transportation vehicle unit 20 by having the carpooling preference non-conflict confirming module 314 verify or confirm that transport of the second end user 12*b* by the transportation vehicle unit 20 while transporting the first end user 12*a* will not violate one or more carpooling preferences (e.g., no significant delay, such as a 15 minute delay, in being transported with other end users, being transported with other end users who are New York Jets fans, preference for being dropped-off first, and so forth) of the first end user 12*a*.

In the same or alternative implementations, the non-conflict verifying operation 506 may include an operation 863 for verifying that compliance with the one or more second directives will not conflict with the one or more obligations to transport the first end user by the transportation vehicle unit by verifying that transport of the second end user by the transportation vehicle unit while transporting the first end user will not violate one or more carpooling preferences of the second end user. For instance, the non-conflict confirming module 204* including the carpooling preference non-conflict confirming module 314 of the transport computing device 10* of FIG. 2A or 2B verifying (confirming) that compliance with the one or more second directives will not conflict with the one or more obligations to transport the first end user 12*a* by the transportation vehicle unit 20 by having the carpooling preference non-conflict confirming module 314 verify or confirm that transport of the second end user 12*b* by the transportation vehicle unit 20 while transporting the first end user 12*a* will not violate one or more carpooling preferences of the second end user 12*b*.

Figure 8F:
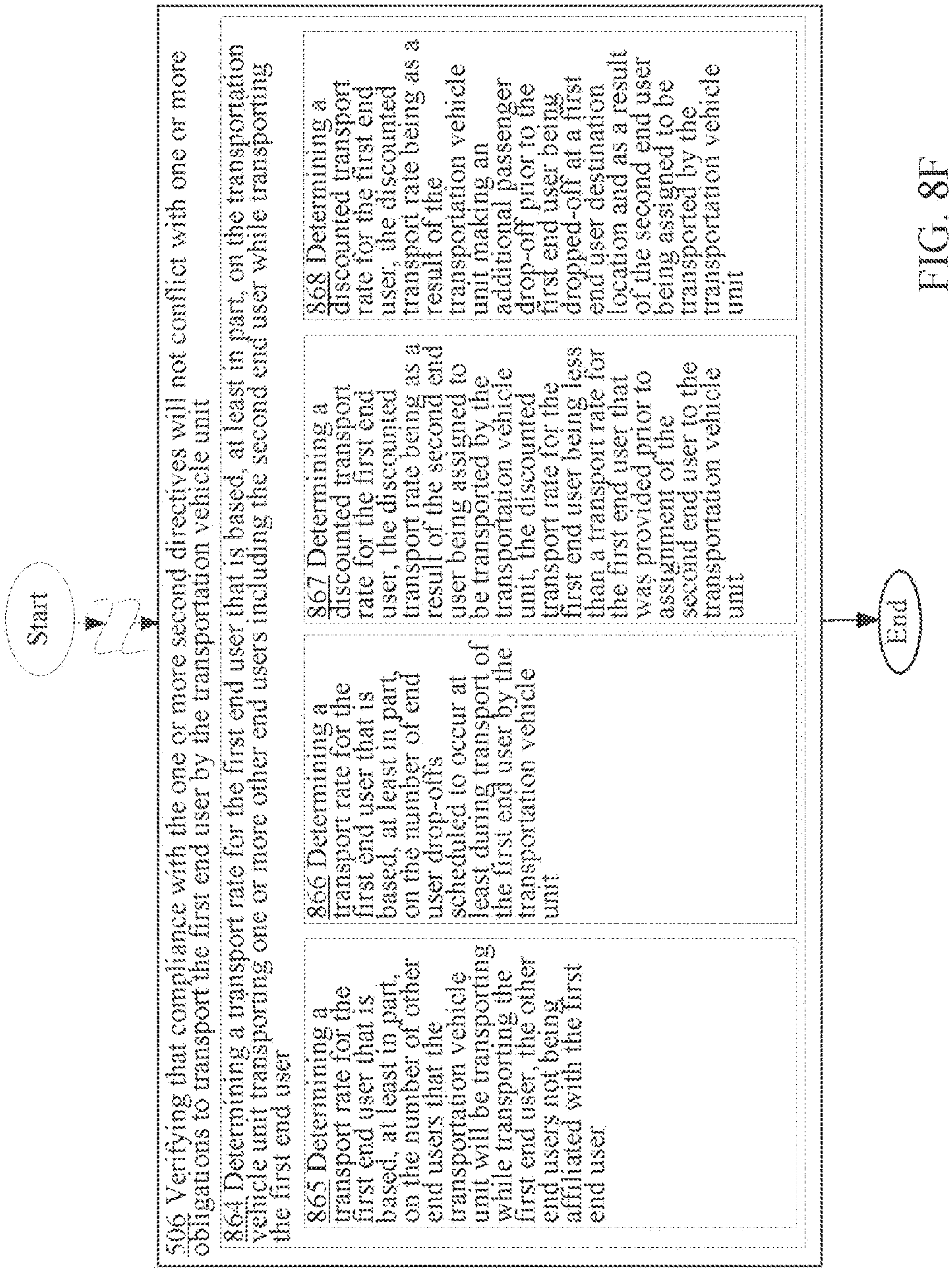
FIG. 8F is a high-level logic flowchart of a process depicting alternate implementations of the non-conflict verifying operation 506 of FIG. 5.

Turning now to FIG. 8F, in various implementations, the non-conflict verifying operation 506 may include an operation 864 for determining a transport rate for the first end user that is based, at least in part, on the transportation vehicle unit transporting one or more other end users including the second end user while transporting the first end user. For instance, the transport rate ascertaining module 316 (see FIG. 3B) of the transport computing device 10* of FIG. 2A or 2B determining or ascertaining a transport rate for the first end user 12*a* (e.g., a fee for transporting the first end user 12*a*) that is based, at least in part, on the transportation vehicle unit 20 transporting one or more other end users including the second end user 12*b* while transporting the first end user 12*a*. In some cases, the determined transport rate may be used to verify a transport rate for the first end user 12*a* that was provided by a network entity (e.g., the real-time carpooling management system 16 of FIG. 1).

As further illustrated in FIG. 8F, in various implementations, operation 864 may involve an operation 865 for determining a transport rate for the first end user that is based, at least in part, on the number of other end users that the transportation vehicle unit will be transporting while transporting the first end user, the other end users not being affiliated with the first end user. For instance, the transport rate ascertaining module 316 of the transport computing device 10* of FIG. 2A or 2B determining (e.g., ascertaining) a transport rate for the first end user 12*a* that is based, at least in part, on the number of other end users including the second end user 12*b* that the transportation vehicle unit 12*b* will be transporting while transporting the first end user 12*a*, the other end users not being affiliated with (e.g., having no business and/or personal relationship with) the first end user 12*a*.

In some implementations, operation 864 may involve an operation 866 for determining a transport rate for the first end user that is based, at least in part, on the number of end user drop-offs scheduled to occur at least during transport of the first end user by the transportation vehicle unit. For instance, the transport rate ascertaining module 316 of the transport computing device 10* of FIG. 2A or 2B determining (e.g., ascertaining) a transport rate for the first end user 12*a* that is based, at least in part, on the number of end user drop-offs scheduled to occur at least during transport of the first end user 12*a* by the transportation vehicle unit 20.

In some implementations, operation 864 may involve an operation 867 for determining a discounted transport rate for the first end user, the discounted transport rate being as a result of the second end user being assigned to be transported by the transportation vehicle unit, the discounted transport rate for the first end user being less than a transport rate for the first end user that was provided prior to assignment of the second end user to the transportation vehicle unit. For instance, the transport rate ascertaining module 316 of the transport computing device 10* of FIG. 2A or 2B determining (e.g., ascertaining) a discounted transport rate for the first end user 12*a*, the discounted transport rate being as a result of the second end user 12*b* being assigned to be transported by the transportation vehicle unit 20, the discounted transport rate for the first end user 12*a* being less than a transport rate for the first end user 12*a* that was provided prior to assignment of the second end user 12*b* to the transportation vehicle unit 20, the discounted transport rate being as a result of the second end user 12*b* being assigned to be transported by the transportation vehicle unit 20 while transporting the first end user 12*a*.

In some implementations, operation 864 may involve an operation 868 for determining a discounted transport rate for the first end user, the discounted transport rate being as a result of the transportation vehicle unit making an additional passenger drop-off prior to the first end user being dropped-off at a first end user destination location and as a result of the second end user being assigned to be transported by the transportation vehicle unit. For instance, the transport rate ascertaining module 316 of the transport computing device 10* of FIG. 2A or 2B determining (e.g., ascertaining) a discounted transport rate for the first end user 12*a*, the discounted transport rate being as a result of the transportation vehicle unit 20 making an additional passenger drop-off prior to the first end user 12*a* being dropped-off (e.g., offloaded) at a first end user destination location and as a result of the second end user 12*b* being assigned to be transported by the transportation vehicle unit 20.

Figure 8G:
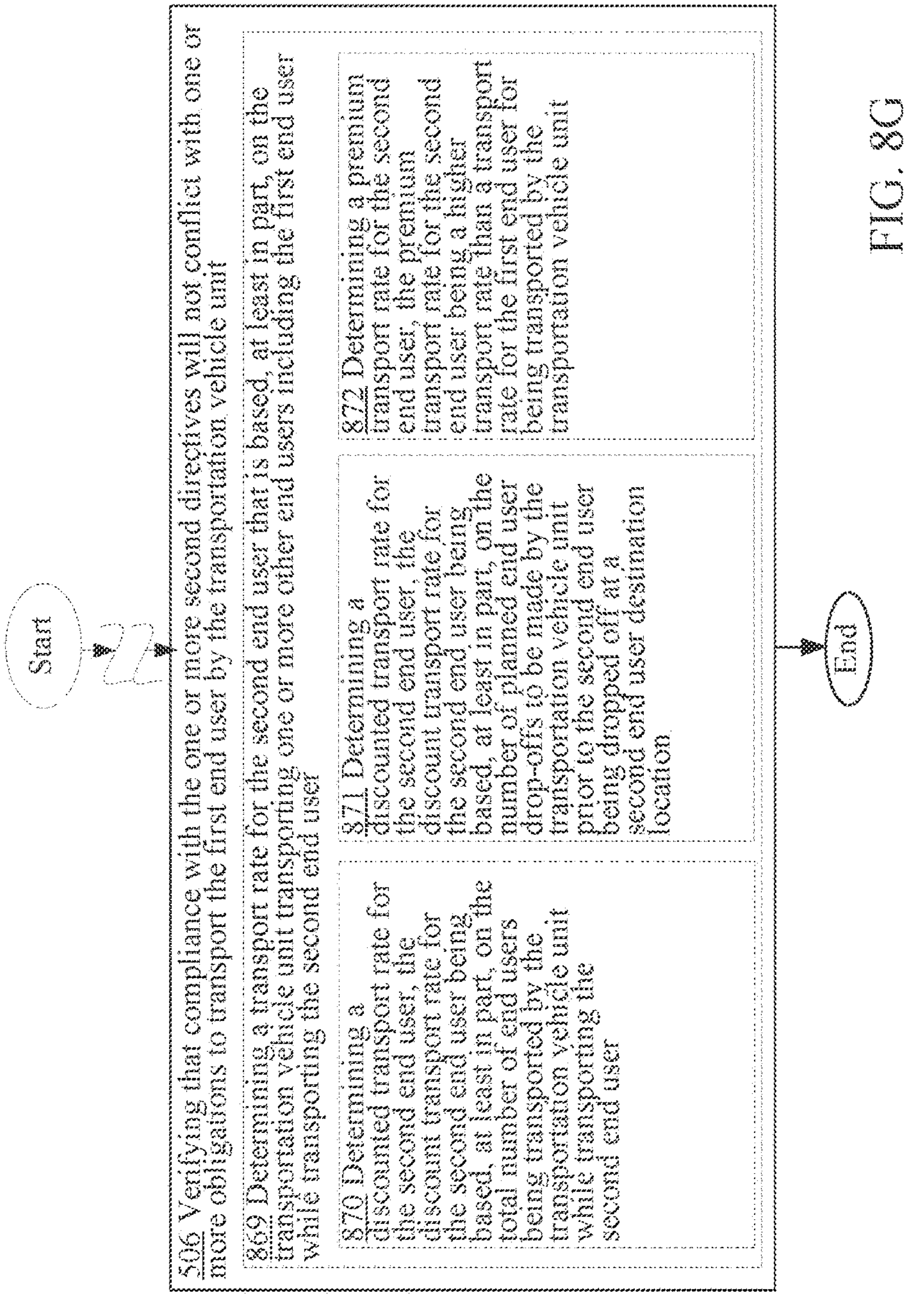
FIG. 8G is a high-level logic flowchart of a process depicting alternate implementations of the non-conflict verifying operation 506 of FIG. 5.

Referring now to FIG. 8G, in various implementations, the non-conflict verifying operation 506 may include an operation 869 for determining a transport rate for the second end user that is based, at least in part, on the transportation vehicle unit transporting one or more other end users including the first end user while transporting the second end user. For instance, the transport rate ascertaining module 316 of the transport computing device 10* of FIG. 2A or 2B determining or ascertaining a transport rate for the second end user 12*b* (e.g., a fare for transporting the second end user 12*b*) that is based, at least in part, on the transportation vehicle unit 20 transporting one or more other end users including the first end user 12*a* while transporting the second end user 12*b*. In some cases, the determined transport rate may be used to verify a transport rate for the second end user 12*b* that was provided by a network entity (e.g., the real-time carpooling management system 16 of FIG. 1).

As further illustrated in FIG. 8G, in some implementations, operation 869 may involve an operation 870 for determining a discounted transport rate for the second end user, the discount transport rate for the second end user being based, at least in part, on the total number of end users being transported by the transportation vehicle unit while transporting the second end user. For instance, the transport rate ascertaining module 316 of the transport computing device 10* of FIG. 2A or 2B determining (e.g., ascertaining)

a discounted transport rate for the second end user 12*b*, the discount transport rate for the second end user 12*b* being based, at least in part, on the total number of end users (including the first end user 12*a*) being transported by the transportation vehicle unit 20 while transporting the second end user 12*b*.

In some implementations, operation 869 may involve an operation 871 for determining a discounted transport rate for the second end user, the discount transport rate for the second end user being based, at least in part, on the number of planned end user drop-offs to be made by the transportation vehicle unit prior to the second end user being dropped off at a second end user destination location. For instance, the transport rate ascertaining module 316 of the transport computing device 10* of FIG. 2A or 2B determining (e.g., ascertaining) a discounted transport rate for the second end user 12*b*, the discount transport rate for the second end user 12*b* being based, at least in part, on the number of planned end user drop-offs to be made by the transportation vehicle unit 20 prior to the second end user 12*b* being dropped off at a second end user destination location and during the carpooling trip that results in the second end user 12*b* and the first end user 12*a* being transported to their destination locations.

In some implementations, operation 869 may involve an operation 872 for determining a premium transport rate for the second end user, the premium transport rate for the second end user being a higher transport rate than a transport rate for the first end user for being transported by the transportation vehicle unit. For instance, the transport rate ascertaining module 316 of the transport computing device 10* of FIG. 2A or 2B determining (e.g., ascertaining) a premium transport rate for the second end user 12*b*, the premium transport rate for the second end user 12*b* being a higher transport rate than a transport rate for the first end user 12*a* for being transported by the transportation vehicle unit 20.

Figure 9:
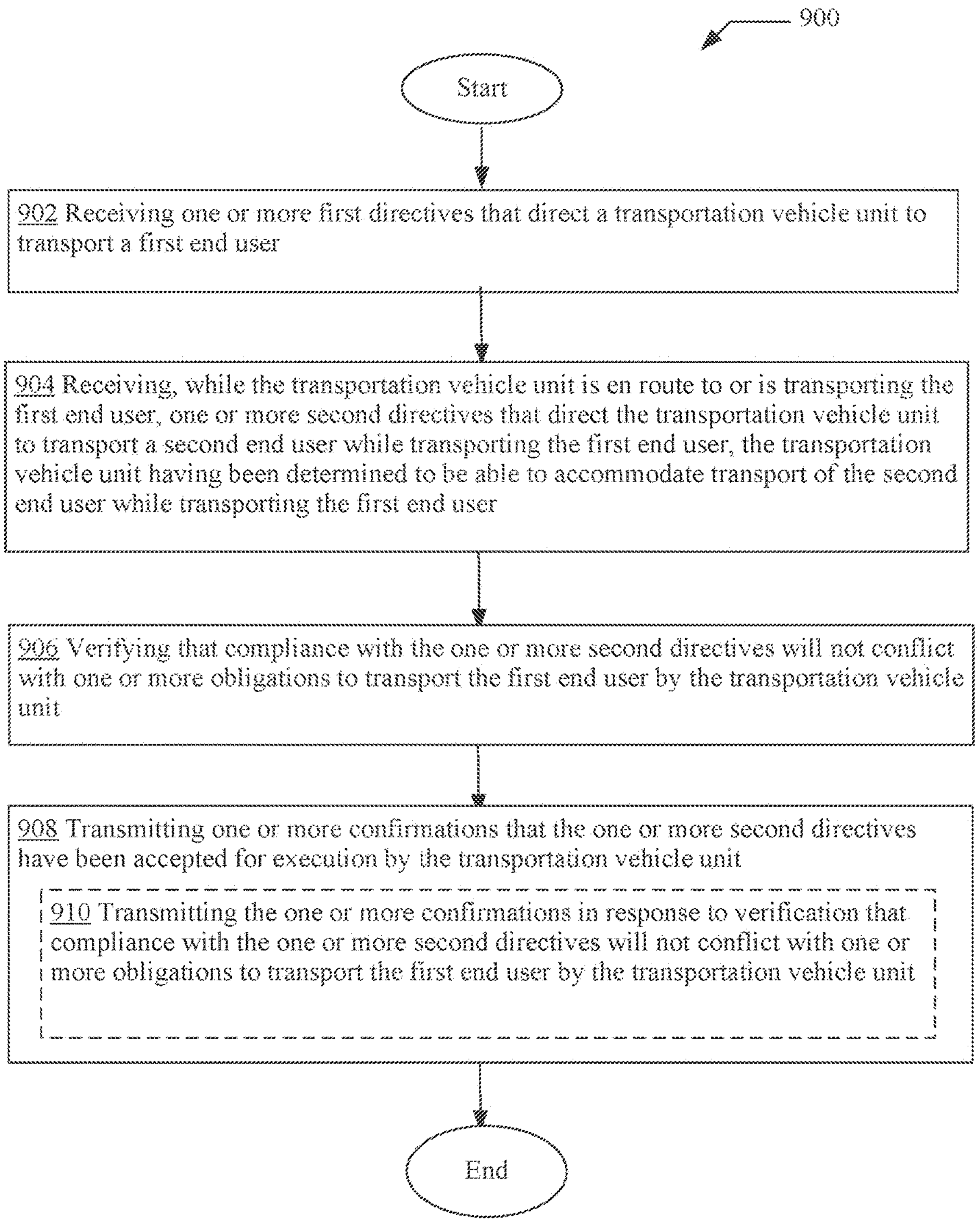
FIG. 9 is a high-level logic flowchart of another process, e.g., operational flow 900, according to some embodiments.

Turning now to FIG. 9 illustrating another operational flow 900. Operational flow 900 includes certain operations that mirror the operations included in operational flow 500 of FIG. 5. These operations include a first directive receiving operation 902, a second directive receiving operation 904, and a non-conflict verifying operation 906 that corresponds to and mirrors the first directive receiving operation 502, the second directive receiving operation 504, and the non-conflict verifying operation 506, respectively, of FIG. 5.

In addition, operational flow 900 further include a confirmation transmitting operation 908 for transmitting one or more confirmations that the one or more second directives have been accepted for execution by the transportation vehicle unit. For instance, the confirmation transmitting module 206* of the transport computing device 10* of FIG. 2A or 2B transmitting electronically, via one or more wireless and/or wired networks 18, one or more confirmations that the one or more second directives have been accepted for execution by the transportation vehicle unit 20. In some cases, the one or more confirmations may be transmitted to a real-time carpooling management system 16.

As further illustrated in FIG. 9, in some implementations, the confirmation transmitting operation 908 may actually involve an operation 910 for transmitting the one or more confirmations in response to verification that compliance with the one or more second directives will not conflict with one or more obligations to transport the first end user by the transportation vehicle unit. For instance, the confirmation transmitting module 206* of the transport computing device 10* of FIG. 2A or 2B transmitting the one or more confirmations in response to verification that compliance with the one or more second directives will not conflict with one or more obligations to transport the first end user 12*a* by the transportation vehicle unit 20.

Figure 10:
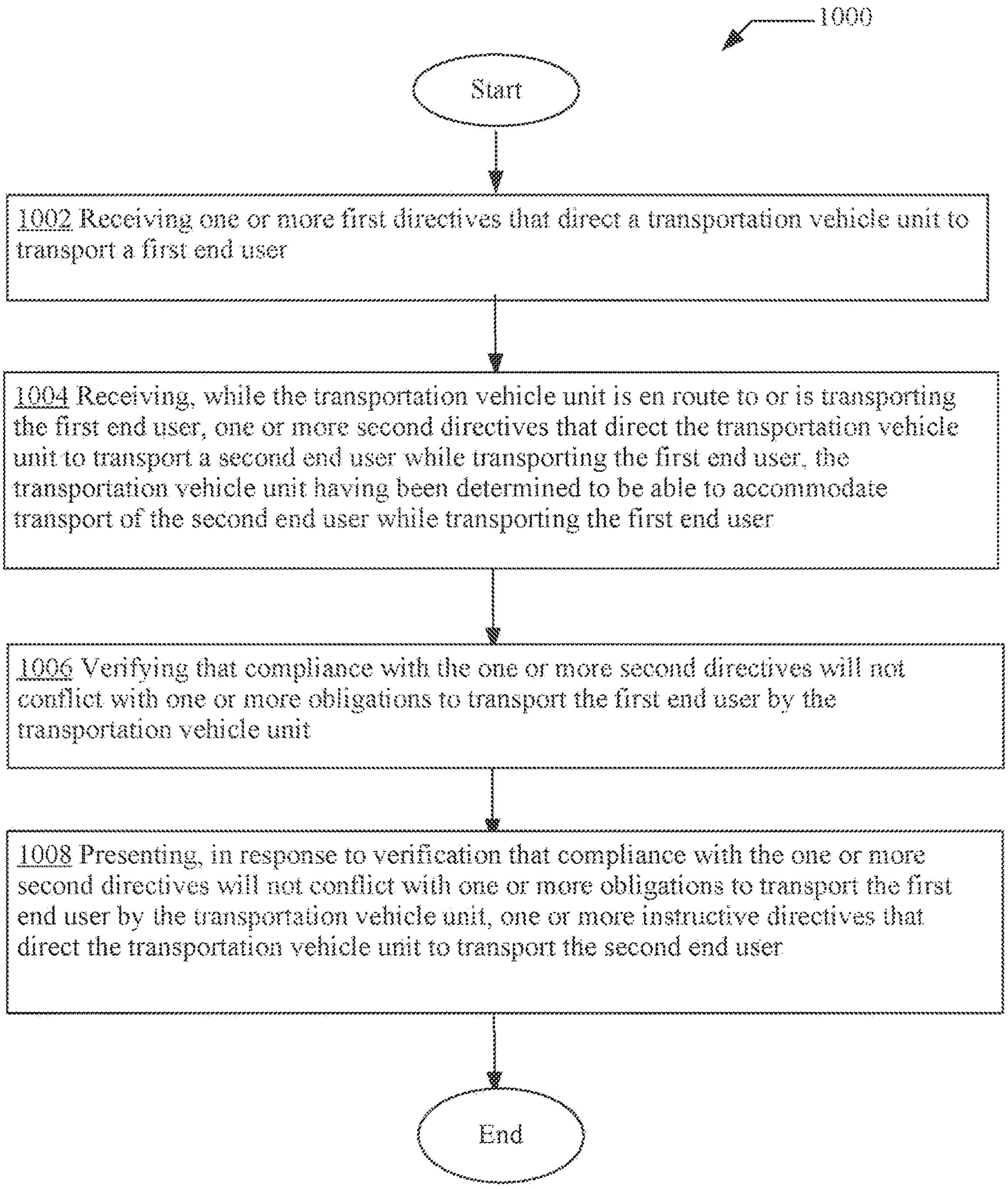
FIG. 10 is a high-level logic flowchart of yet another process, e.g., operational flow 1000, according to some embodiments.

Turning now to FIG. 10 illustrating another operational flow 1000. Operational flow 1000 includes certain operations that mirror the operations included in operational flow 500 of FIG. 5. These operations include a first directive receiving operation 1002, a second directive receiving operation 1004, and a non-conflict verifying operation 1006 that corresponds to and mirrors the first directive receiving operation 502, the second directive receiving operation 504, and the non-conflict verifying operation 506, respectively, of FIG. 5.

In addition, operation 1000 further includes an instructive directive presenting operation 1008 for presenting, in response to verification that compliance with the one or more second directives will not conflict with one or more obligations to transport the first end user by the transportation vehicle unit, one or more instructive directives that direct the transportation vehicle unit to transport the second end user. For instance, the instructive directive presenting module 208* of the transport computing device 10* of FIG. 2A or 2B presenting, in response to verification that compliance with the one or more second directives will not conflict with one or more obligations to transport the first end user 12*a* by the transportation vehicle unit 20, one or more instructive directives that direct the transportation vehicle unit 20 to transport the second end user 12*b*.

Figure 11:
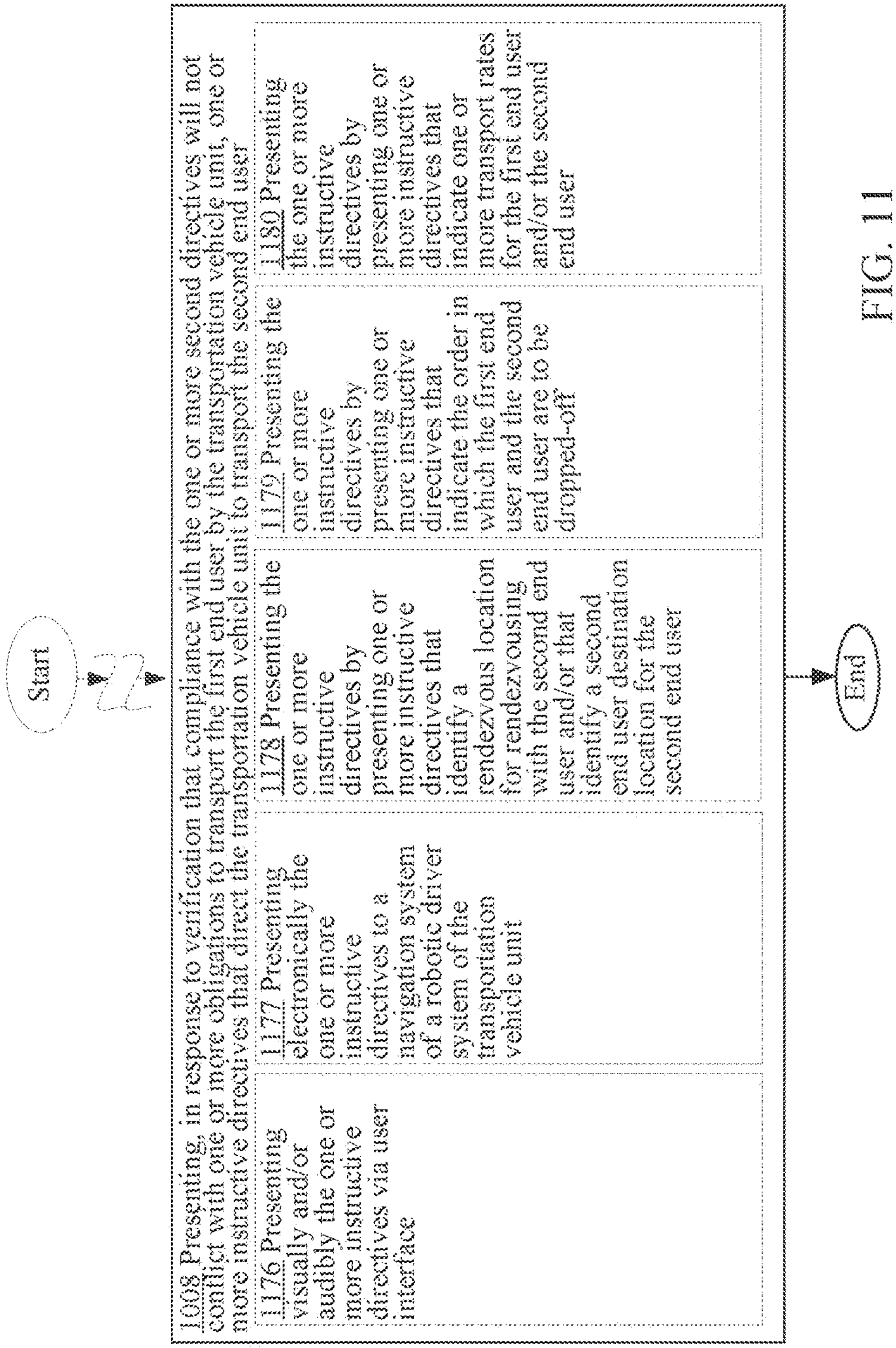
FIG. 11 is a high-level logic flowchart of a process depicting alternate implementations of the instructive directive presenting operation 1008 of FIG. 10.

As further illustrated in FIG. 11, the instructive directive presenting operation 1008 may be implemented in a variety of different ways in various alternative implementations. For example, in some implementations, the instructive directive presenting operation 1008 may involve an operation 1176 for presenting visually and/or audibly the one or more instructive directives via user interface. For instance, the visual/audible instructive directive presenting module 320 (see FIG. 3C) of the transport computing device 10* of FIG. 2A or 2B presenting visually and/or audibly the one or more instructive directives via user interface 250 (e.g., a display screen and/or one or more speakers)

In the same or alternative implementations, the instructive directive presenting operation 1008 may involve an operation 1177 for presenting electronically the one or more instructive directives to a navigation system of a robotic driver system of the transportation vehicle unit. For instance, the electronic instructive directive presenting module 322 (see FIG. 3C) of the transport computing device 10* of FIG. 2A or 2B presenting electronically the one or more instructive directives to a navigation system 452 of a robotic driver system 450 of the transportation vehicle unit 20.

In the same or alternative implementations, the instructive directive presenting operation 1008 may involve an operation 1178 for presenting the one or more instructive directives by presenting one or more instructive directives that identify a rendezvous location for rendezvousing with the second end user and/or that identify a second end user destination location for the second end user. For instance, the instructive directive presenting module 208* of the transport computing device 10* of FIG. 2A or 2B presenting the one or more instructive directives by presenting one or more instructive directives that identify a rendezvous location for rendezvousing with the second end user 12*b* and/or that identify a second end user destination location for the second end user 12*b*.

In the same or alternative implementations, the instructive directive presenting operation 1008 may involve an operation 1179 for presenting the one or more instructive directives by presenting one or more instructive directives that indicate the order in which the first end user and the second end user are to be dropped-off. For instance, the instructive directive presenting module 208* of the transport computing device 10* of FIG. 2A or 2B presenting the one or more instructive directives by presenting one or more instructive directives that indicate the order in which the first end user 12*a* and the second end user 12*b* are to be dropped-off. In some cases, the one or more instructive directives may provide a specific route for dropping-off (e.g., offloading) the first end user 12*a* and the second end user 12*b*.

In the same or alternative implementations, the instructive directive presenting operation 1008 may involve an operation 1180 for presenting the one or more instructive directives by presenting one or more instructive directives that indicate one or more transport rates for the first end user and/or the second end user. For instance, the instructive directive presenting module 208* of the transport computing device 10* of FIG. 2A or 2B presenting the one or more instructive directives by presenting one or more instructive directives that indicate one or more transport rates (e.g., transport fares or fees) for the first end user 12*a* and/or the second end user 12*b*.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," 'in one embodiment," "in some embodiments," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The invention claimed is:

1. A computing system comprising:
- one or more processors; and
- a memory storing instructions that, when executed by the one or more processors, cause the computing system to perform operations that include:
  - receiving a first transport request from an end user device of a first end user, and a second transport request from an end user device of a second end user;
  - matching each of the first transport request and the second transport request with a transportation vehicle based at least in part on a determination that the transportation vehicle is able to concurrently fulfill the first transport request and the second transport request; and
  - based at least in part on the determination, transmitting one or more directives to a computing system associated with the transportation vehicle, the directives directing a human driver or a robotic driver system of the matched transportation vehicle to travel to a second rendezvous location to rendezvous with the second end user while transporting the first end user to a destination location of the first transport request.

2. The computing system of claim 1, wherein matching at least one of the first transport request or the second transport request to the matched transportation vehicle is based at least in part on a preference of the respective first end user or second end user.

3. The computing system of claim 1, wherein transmitting the one or more directives includes directing a navigation system of the robotic driver system to travel to the second rendezvous location.

4. The computing system of claim 1, wherein transmitting the one or more directives includes transmitting, over one or more networks, the one or more directives to a carpool management system that communicates with the robotic driver system.

5. The computing system of claim 1, wherein the determination includes determining that the matched transportation vehicle is able to fulfill each of the first transport request and the second transport request within an estimated time that is acceptable.

6. The computing system of claim 1, wherein the determination includes determining that one or more specified conditions are met by the matched transportation vehicle fulfilling the first transport request and the second transport request.

7. The computing system of claim 1, wherein matching each of the first transport request and the second transport request includes determining that the matched transportation vehicle has sufficient passenger space for each of the first end user and the second end user.

8. A non-transitory computer-readable medium that stores instructions that, when executed by one or more processors of a computer system, cause the computer system to perform operations that include:
- receiving a first transport request from an end user device of a first end user, and a second transport request from an end user device of a second end user;
- matching each of the first transport request and the second transport request with a transportation vehicle based at least in part on a determination that the transportation vehicle is able to concurrently fulfill the first transport request and the second transport request; and
- based at least in part on the determination, transmitting one or more directives to a computing system associated with a transportation vehicle, the directives directing a human driver or a robotic driver system of the matched transportation vehicle to travel to a second rendezvous location to rendezvous with the second end user while transporting the first end user to a destination location of the first transport request.

9. The non-transitory computer-readable medium of claim 8, wherein matching at least one of the first transport request or the second transport request to the matched transportation vehicle is based at least in part on a preference of the respective first end user or second end user.

10. The non-transitory computer-readable medium of claim 8, wherein transmitting the one or more directives includes directing a navigation system of the robotic driver system to travel to the second rendezvous location.

11. The non-transitory computer-readable medium of claim 8, wherein transmitting the one or more directives includes transmitting, over one or more networks, the one or more directives to a carpool management system that communicates with the matched transportation vehicle.

12. The non-transitory computer-readable medium of claim 8, wherein the determination includes determining that the matched transportation vehicle is able to fulfill each of the first transport request and the second transport request within an estimated time that is acceptable.

13. The non-transitory computer-readable medium of claim 8, wherein the determination includes determining that one or more specified conditions are met by the matched transportation vehicle fulfilling the first transport request and the second transport request.

14. A computer-implemented method comprising:
- receiving a first transport request from an end user device of a first end user, and a second transport request from an end user device of a second end user;
- matching each of the first transport request and the second transport request with a transportation vehicle based at least in part on a determination that the transportation vehicle is able to concurrently fulfill the first transport request and the second transport request; and
- based at least in part on the determination, transmitting one or more directives to a computing system associated with the transportation vehicle, the directives directing a human driver or a robotic driver system of the matched transportation vehicle to travel to a second rendezvous location to rendezvous with the second end user while transporting the first end user to a destination location of the first transport request.

15. The computer-implemented method of claim 14, wherein matching at least one of the first transport request or the second transport request to the matched transportation vehicle is based at least in part on a preference of the respective first end user or second end user.

16. The computer-implemented method of claim 14, wherein transmitting the one or more directives includes directing a navigation system of the robotic driver system to travel to the second rendezvous location.

17. The computer-implemented method of claim 14, wherein transmitting the one or more directives includes transmitting, over one or more networks, the one or more directives to a carpool management system that communicates with the matched transportation vehicle.

18. The computer-implemented method of claim 14, wherein the determination includes determining that the matched transportation vehicle is able to fulfill each of the first transport request and the second transport request within an estimated time that is acceptable.

19. The computer-implemented method of claim 14, wherein the determination includes determining that one or more specified conditions are met by the matched transportation vehicle fulfilling the first transport request and the second transport request, the one or more specified conditions including a determination as to whether the matched transportation vehicle is able to fulfill each of the first transport request and the second transport request within an estimated time that is acceptable.

* * * * *